United States Patent
Carney

(10) Patent No.: US 11,282,410 B2
(45) Date of Patent: *Mar. 22, 2022

(54) COMPUTERIZED SYSTEM AND METHOD FOR ENABLING A REAL TIME SHARED WORK SPACE FOR SOLVING, RECORDING, PLAYING BACK, AND ASSESSING A STUDENT'S STEM PROBLEM SOLVING SKILLS

(71) Applicant: Fluidity Software, Inc., Somerville, MA (US)

(72) Inventor: Donald P. Carney, Somerville, MA (US)

(73) Assignee: Fluidity Software, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,318

(22) Filed: Aug. 30, 2019

(65) Prior Publication Data
US 2019/0385479 A1   Dec. 19, 2019

Related U.S. Application Data

(63) Continuation-in-part of application No. 15/353,827, filed on Nov. 17, 2016, now Pat. No. 10,431,110.
(Continued)

(51) Int. Cl.
*G09B 19/02* (2006.01)
*G06F 3/14* (2006.01)
(Continued)

(52) U.S. Cl.
CPC ......... *G09B 19/025* (2013.01); *G06F 3/0488* (2013.01); *G06F 3/04886* (2013.01);
(Continued)

(58) Field of Classification Search
None
See application file for complete search history.

(56) References Cited

U.S. PATENT DOCUMENTS

| | | | |
|---|---|---|---|
| 5,176,520 A | 1/1993 | Hamilton | 434/350 |
| 5,596,698 A | 1/1997 | Morgan | 715/863 |

(Continued)

OTHER PUBLICATIONS

Salman Khan, 25 Best Free Online Whiteboard Websites With Real-Time Collaboration, Jun. 24, 2015, List Of Freeware, https://listoffreeware.com/list-of-best-free-online-whiteboard-real-time-collaboration/.*

*Primary Examiner* — Jason T Yen
(74) *Attorney, Agent, or Firm* — Bodner & O'Rourke, LLP; Gerald T. Bodner; Christian P. Bodner

(57) ABSTRACT

A computerized system enables teachers and students to collaborate in the solutions of STEM problems. The system includes a communications network linking a teacher computer, one or more student computers, and at least one computer-readable storage medium. Each of the computers includes an input device for receiving input via the input device and a screen for displaying the input. The computers are operatively linked and each of their screens forms a virtual shared whiteboard defining a common work page upon which input from each computer is received and displayed. Input received from each computer interacts mathematically with input received from each other computer in the network and the interactions are displayed on each screen. The input and interactions form a collaborative solution to STEM problems. When prompted, the storage medium records and plays back the solutions to the STEM problems on each screen for subsequent assessment of student performance.

61 Claims, 30 Drawing Sheets

Related U.S. Application Data

(60) Provisional application No. 62/257,766, filed on Nov. 20, 2015.

(51) Int. Cl.

| | | |
|---|---|---|
| *G09B 7/02* | (2006.01) | |
| *G06F 3/04886* | (2022.01) | |
| *G09B 5/02* | (2006.01) | |
| *G06F 3/0488* | (2022.01) | |
| *G09B 5/06* | (2006.01) | |
| *G09B 5/12* | (2006.01) | |
| *G06F 3/04883* | (2022.01) | |

(52) U.S. Cl.
CPC ............. *G06F 3/14* (2013.01); *G06F 3/1454* (2013.01); *G09B 5/02* (2013.01); *G09B 5/06* (2013.01); *G09B 5/125* (2013.01); *G09B 7/02* (2013.01); *G06F 3/04883* (2013.01)

(56) References Cited

U.S. PATENT DOCUMENTS

| | | | |
|---|---|---|---|
| 6,760,748 B1 | 7/2004 | Hakim .......................... 709/204 |
| 7,213,211 B1 | 5/2007 | Sanders et al. ............... 715/753 |
| 7,466,958 B2 | 12/2008 | Dunk et al. .................... 434/362 |
| 7,752,148 B2 | 7/2010 | Yu et al. ......................... 706/12 |
| 9,576,495 B2 | 2/2017 | Carney et al. |
| 9,691,294 B2 | 6/2017 | Carney et al. |
| 9,773,428 B2 | 9/2017 | Carney et al. |
| 2004/0054701 A1* | 3/2004 | Garst .................. G06F 3/04883 708/131 |
| 2004/0157203 A1 | 8/2004 | Dunk et al. .................... 434/350 |
| 2004/0191746 A1 | 9/2004 | Maron et al. .................. 434/323 |
| 2004/0267607 A1 | 12/2004 | Maddux ....................... 705/7.42 |
| 2005/0273700 A1* | 12/2005 | Champion .......... G06F 3/04883 715/233 |
| 2006/0001656 A1 | 1/2006 | LaViola, Jr. et al. ......... 345/179 |
| 2006/0001667 A1* | 1/2006 | LaViola .................. G06T 13/80 345/473 |
| 2006/0024649 A1 | 2/2006 | Vernon ......................... 434/201 |
| 2006/0062466 A1* | 3/2006 | Zou ........................ G06K 9/222 382/186 |
| 2008/0108035 A1 | 5/2008 | Warda ........................... 434/335 |
| 2009/0018979 A1 | 1/2009 | Yu et al. ......................... 706/12 |
| 2010/0225602 A1 | 9/2010 | Fujimura ...................... 345/173 |
| 2010/0279266 A1 | 11/2010 | Laine et al. ................... 434/350 |
| 2011/0159465 A1 | 6/2011 | Gutridge ....................... 434/154 |
| 2011/0169756 A1* | 7/2011 | Ogawa .................... G06F 3/044 345/173 |
| 2011/0225494 A1 | 9/2011 | Shmuylovich et al. ....... 715/705 |
| 2011/0234516 A1 | 9/2011 | Nakajima et al. ............. 345/173 |
| 2011/0244434 A1 | 10/2011 | Livne et al. ................... 434/188 |
| 2011/0257973 A1 | 10/2011 | Chutorash et al. ............ 704/235 |
| 2011/0307535 A1 | 12/2011 | Vukosavljevic et al. ..... 708/142 |
| 2012/0231441 A1* | 9/2012 | Parthasarathy .......... G09B 7/02 434/362 |
| 2012/0254773 A1* | 10/2012 | Viswanathan ........... G09B 5/02 715/753 |
| 2013/0067531 A1 | 3/2013 | Morris et al. ...................... 726/1 |
| 2013/0164726 A1 | 6/2013 | Michalowski et al. ........ 434/362 |
| 2013/0244218 A1 | 9/2013 | Cook et al. .................... 434/350 |
| 2014/0162239 A1* | 6/2014 | Roach .................... G09B 5/125 434/350 |
| 2015/0104778 A1* | 4/2015 | Liu .......................... G09B 5/08 434/335 |
| 2015/0199598 A1 | 7/2015 | Iams ............................. 434/358 |
| 2015/0269859 A1 | 9/2015 | Michalowski et al. ........ 434/362 |
| 2015/0339051 A1* | 11/2015 | Yang ..................... G06F 3/0482 382/189 |

\* cited by examiner

FIG. 16 — $2x-\cancel{3}=4$ — 2x-3=4 — 74 — 11

FIG. 17 — $2x-\square=4$ — 2x- =4 — 75 — 11

COMPUTERIZED SYSTEM AND METHOD FOR ENABLING A REAL TIME SHARED WORK SPACE FOR SOLVING, RECORDING, PLAYING BACK, AND ASSESSING A STUDENT'S STEM PROBLEM SOLVING SKILLS

CROSS-REFERENCE TO RELATED APPLICATIONS

This application is a continuation-in-part of U.S. application Ser. No. 15/353,827, filed on Nov. 17, 2016, and entitled "COMPUTERIZED SYSTEM AND METHOD FOR ENABLING A REAL-TIME SHARED WORKSPACE FOR COLLABORATION IN EXPLORING STEM SUBJECT MATTER", the disclosure of which is incorporated herein by reference and on which priority is hereby claimed, which prior application is based on U.S. Provisional Patent Application Ser. No. 62/257,766, filed on Nov. 20, 2015, and entitled "COMPUTERIZED SYSTEM AND METHOD FOR ENABLING A REAL-TIME SHARED WORKSPACE FOR COLLABORATION IN EXPLORING STEM SUBJECT MATTER", the disclosure of which is incorporated herein by reference and on which priority is hereby claimed.

BACKGROUND OF THE INVENTION

Field of the Invention

This invention relates to the collaborative exploration of STEM (Science, Technology, Engineering, and Mathematics) subject matter and more particularly to tools using mobile tablet devices in the collaboration. This invention further relates to the solution of STEM (Science, Technology, Engineering, and Mathematics) problems and more particularly to computer systems and methods for use on networked computers to solve, record, play back, and assess the solutions to STEM problems solved by students in order to teach and assess their STEM CPS (Collaborative Problem Solving) skills.

Description of Related Art

Currently, various tools or interventions, as they are called in the art, are used to collaborate in the exploration of mathematical and physical concepts. These tools include chalkboard, whiteboard, graphing calculator, personal computers, pen-enabled tablet computers, Interactive Whiteboards (IWB), computational mathematics engines, concept visualization software tools, and the experimental laboratory.

Recently, mobile tablets with touch sensitive screens (for example, iPad™ devices, Android™ devices, Microsoft™ Surface™, and similar devices), because of their low cost, are becoming ubiquitous for use wherein handwritten math notation is an important requirement. For example, entering a math notation such as $$x = \frac{-b \pm \sqrt{b^2 - 4ac}}{2a}$$

into a computer is more difficult and time consuming using a keyboard and mouse compared to entering it using the touch sensitive screen of a tablet with a stylus or fingertip, as if using paper and pencil.

In the field of education, devices or systems of cooperating devices which are used to enhance teaching and learning are commonly referred to as either teaching tools or teaching interventions. Furthermore, the evaluations of students' skills and knowledge learned as part of the education process are commonly referred to as assessments.

Currently, various tools or interventions, as they are called in the art, are used by teachers and students to collaborate in the exploration of mathematical and physical concepts. These tools include, but are not limited to, chalkboards, whiteboards, graphing calculators, personal computers, pen-enabled tablet computers, and Interactive Whiteboards (IWB).

Until recently, teachers and students have used their respective computers equipped with a physical keyboard and a physical mouse as input devices to teach and learn STEM subjects. Recently, mobile tablets with pen enabled touch sensitive screens (for example, iPad™ devices, Android™ devices, Microsoft™ Surface™, and similar devices), because of their low cost, are becoming ubiquitous for use wherein handwritten math notation is an important requirement when solving STEM problems. For example, entering a math notation such as $$x = \frac{-b \pm \sqrt{b^2 - 4ac}}{2a}$$

into a computer is more difficult and time consuming using a keyboard and mouse compared to entering it using the touch sensitive screen of a tablet with a stylus or fingertip, as if using paper and pencil. The present invention is a computer application which enables the real-time recording and the subsequent playing back of collaborative efforts used to teach and assess a student's collaborative problem solving skills not only on emerging tablet computers but also on the embedded base of keyboard and mouse personal computers.

How we live, work, play and learn has been dramatically transformed by technology over the past 20 years. We need different skills today than we did in the 20th century. Increasingly, in a wide range of workplaces, employees work in groups, face-to-face and with peers around the country and around the globe to solve problems through what is commonly known as Collaborative Problem Solving (CPS). Data on the need for CPS competency comes from numerous surveys, reports, and research studies over the past two decades. In 2017, the Programme for International Student Assessment (PISA) released its findings from a first study of its kind administered in 60 nations which examined students' ability to work in groups to solve problems. The United States ranked 15th in the world. One of the many findings of the study was that collaboration skills can be taught, practiced, and assessed in cognitive subjects such as science, reading and math.

When students are in a teaching environment and are divided into several teams to collaboratively solve problems using their computers, it is very difficult for a teacher to simultaneously observe, in real-time, their collaborative interaction as a member of a team so that the teacher can assess each student's CPS skills.

The present invention provides a unique system and method for users to participate in a real-time shared workspace collaborative effort in the exploration of STEM concepts using handwritten math notation input on mobile tablet devices. The instant invention further enables teachers to record the actual math notation input on each participant's personal computer as they collaborate as part of a team and subsequently play it back in order to evaluate each of the participant's CPS skills.

OBJECTS AND SUMMARY OF THE INVENTION

It is an object of the present invention to provide a computerized system for enabling teachers and students to collaborate in the solutions of STEM problems.

It is another object of the present invention to provide a computerized teaching system which provides a teaching tool for presenting and teaching collaborative solutions to STEM questions.

It is still another object of the present invention to provide a computerized teaching system having at least one teacher computer and at least one student computer in which handwritten inputs on the computers and computer interactions result in a collaborative solution to a STEM problem.

It is a further object of the present invention to provide a computerized system enabling teachers and students to collaborate in the solutions of STEM problems in which the system includes at least one teacher computer and at least one student computer, each of which has a touch sensitive screen, the system having a computer-readable storage medium that contains program instructions that transform each touch sensitive screen into a virtual shared whiteboard that defines a common work page upon which handwritten inputs from each computer are received and displayed.

It is yet a further object of the present invention to provide a computerized system for enabling teachers and students to collaborate in the solutions of STEM problems.

It is another object of the present invention to provide a computerized teaching system which provides a teaching tool for presenting and teaching collaborative solutions to STEM questions.

It is still another object of the present invention to provide a computerized teaching system having at least one teacher computer and at least one student computer in which inputs on the computers and participant interactions result in a collaborative solution to a STEM problem.

It is a further object of the present invention to provide a computerized system enabling teachers and students to collaborate in the solutions of STEM problems in which the system includes at least one teacher computer and at least one student computer, each of which has a touch sensitive screen, the system having a computer-readable storage medium that contains program instructions that transform each touch sensitive screen into a virtual common work page upon which handwritten inputs from each computer are received and displayed.

In accordance with one form of the present invention, a computerized system enabling teachers and students to collaborate in the solution of STEM (Science, Technology, Engineering and Mathematics) problems includes a communications network, at least one teacher computer operable by a respective teacher, at least one student computer operable by a respective student, and at least one computer-readable storage medium. The at least one student computer is operably connected to the at least one teacher computer by the communications network. The at least one computer-readable storage medium is operably connected to the communications network.

Each of the at least one teacher computer and the at least one student computer includes an input device and a touch sensitive screen for receiving handwritten input via the input device. The at least one teacher computer and the at least one student computer are operably connected to the at least one computer-readable storage medium. The at least one computer-readable storage medium contains program instructions that transform each touch sensitive screen of the at least one teacher computer and the at least one student computer operably connected by the communications network into a virtual shared whiteboard. This whiteboard defines a common work page upon which handwritten input from each of the at least one teacher computer and the at least one student computer is received and displayed. The handwritten input received from the at least one teacher computer interacts mathematically with the handwritten input received from the at least one student computer operably connected together by the communications network to generate computer interactions. The computer interactions are displayed on each touch sensitive screen of the at least one teacher computer and the at least one student computer. Thus, the handwritten inputs and computer interactions result in a collaborative solution to a STEM problem.

In accordance with another form of the invention, a computerized system and method enables teachers and students to collaborate in solving, recording, replaying, and assessing a collaborative solution to a STEM (Science, Technology, Engineering, and Mathematics) question. The system includes a communications network in which at least one teacher tablet computer, operable by a respective teacher and at least one student tablet computer, operable by a respective student, are operably connected via the communications network and the at least one computer-readable storage medium is also operably connected to the communications network. The at least one teacher tablet computer and the at least one student tablet computer each include a stylus for inputting handwritten math notation, a touch sensitive screen for receiving the handwritten math notation input and a digitizer for converting the input to digital input data.

The system reads and understands the handwritten math notation input and the at least one computer-readable storage medium contains program instructions transforming each touch sensitive screen of the at least one teacher tablet computer and the at least one student tablet computer operably connected via the communications network into a virtual common work page upon which handwritten math notation input from the at least one teacher tablet computer and the at least one student tablet computer is received and displayed. When prompted, in real-time by the respective teacher or the respective student, the system spontaneously generates math representations of the respective teacher's and the respective student's handwritten math notation input.

The system enables collaboration between the respective teacher and the respective student by each inputting handwritten math notation to create a collaborative solution to the STEM problem by annotating each other's input including the math representations spontaneously generated by each respective teacher and respective student which are displayed on the common work page.

The handwritten inputs result in the respective teacher's and the respective student's collaborative solution to the STEM problem. When prompted by the respective teacher or the respective student, the at least one computer readable storage medium records the digital input data created by the handwritten input of the respective teacher and the respective student and when prompted by the respective teacher or the respective student, the system plays back the recording for the teacher or the student to asynchronously assess the collaborative solution of the STEM problem.

These and other objects, features and advantages of the present invention will be apparent from the following detailed description of illustrative embodiments thereof, which is to be read in connection with the accompanying drawings.

BRIEF DESCRIPTION OF THE DRAWINGS

The drawings described below illustrate an embodiment of the present invention which exemplifies a teaching intervention wherein the participants and users of the intervention are teachers and students collaborating in a teaching environment via the use of handwritten math notation input on the touch sensitive screens of mobile tablet devices.

FIG. 14 is a simplified pictorial illustration of a GUI display of a teacher's computer of the system of the present invention showing the first step of a teacher-student collaboration in the exploration of a fourth example wherein the teacher and the students collaborate to simplify a math expression using the distributive principle of Algebra.

FIG. 15 is a simplified pictorial illustration of a GUI display showing the second step of the teacher-student collaboration in the exploration of the fourth example wherein the student enters an incorrect equation in answer to the problem presented in FIG. 14.

FIG. 16 is a simplified pictorial illustration of a GUI display showing the third step of the teacher-student collaboration in the exploration of the fourth example wherein the teacher erases an incorrect term in the equation of FIG. 15.

FIG. 17 is a simplified pictorial illustration of a GUI display showing the fourth step of the teacher-student collaboration in the exploration of the fourth example wherein the student is presented with an equation in which to enter a correct term.

FIG. 18 is a simplified pictorial illustration of a GUI display showing the fifth step of the teacher-student collaboration in the exploration of the fourth example wherein the student completes the correction of the equation of FIG. 17.

FIG. 19 is a simplified pictorial illustration of a GUI display showing the sixth step of the teacher-student collaboration in the exploration of the fourth example wherein the student enters the correct answer to the problem presented in FIG. 14.

DETAILED DESCRIPTION OF THE
PREFERRED EMBODIMENTS

The following disclosure describes teacher-student collaborations in an education environment as examples of embodiments of the present invention.

Figure 1:
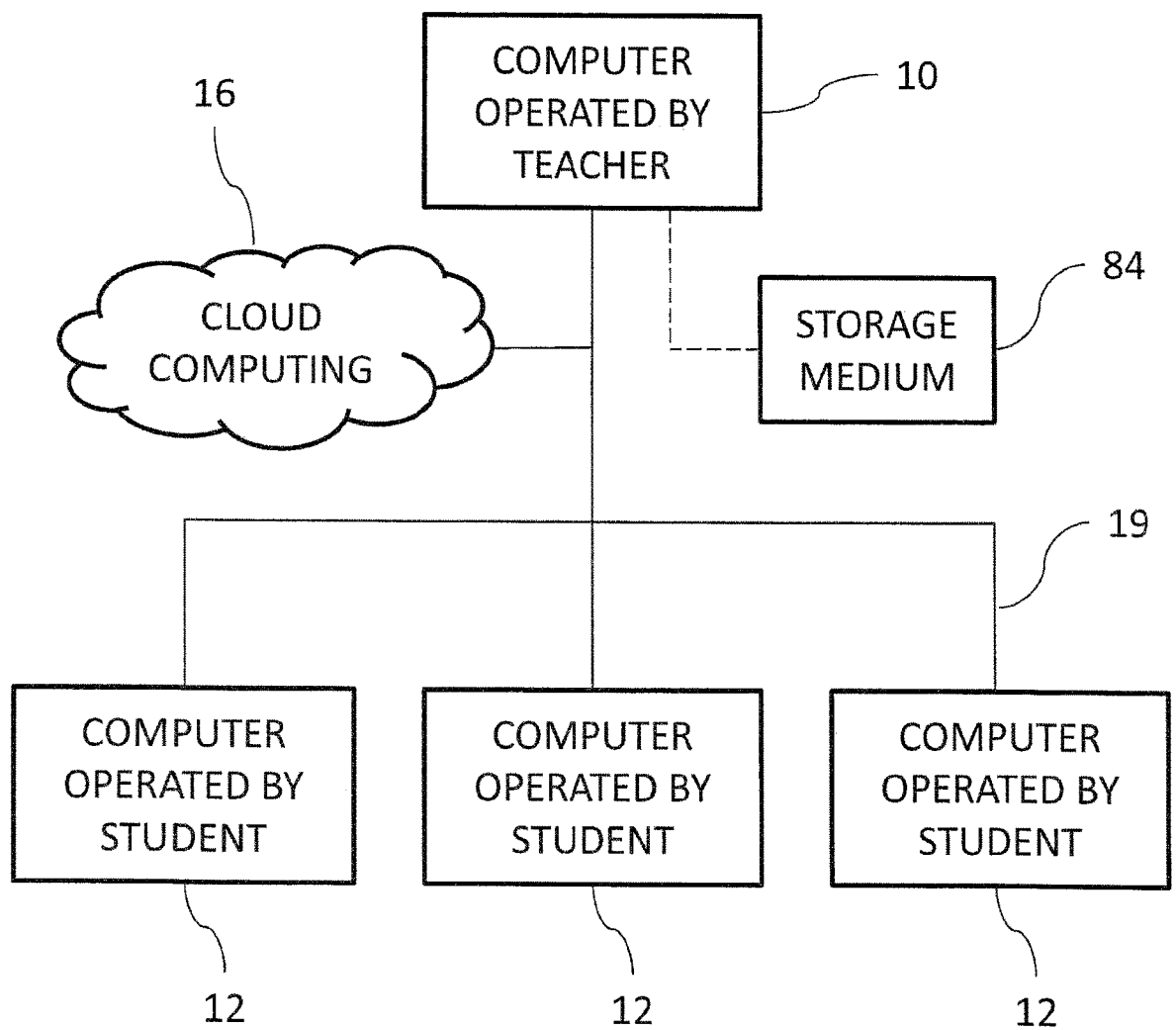
FIG. 1 is a block diagram of a computerized teaching system formed in accordance with the present invention and having a network of computers.

Turning now to the figures, there is shown in FIG. 1 a computerized teaching system formed in accordance with the present invention comprising a network of pen-enabled computers used for the teaching and assessing of STEM subjects. At least one pen-enabled computer 10 operated by a teacher is networked with at least one pen-enabled computer 12 operated by at least one student. The computers are connected by a communications network 19 including any one of, but not limited to, a combination of: a local area network (LAN), a wide area network (WAN), or the World Wide Web (WWW) which includes networking to cloud computing 16. The pen-enabled computers 10 and 12 may be located in one classroom or in remote locations for remote tutoring and learning. As is well known in the art, cloud computing 16 refers to the delivery of computing and storage capacity as a service to a heterogeneous community of end users. Its name comes from a cloud-shaped symbol which is often used to designate the complex infrastructure it contains in system diagrams such as FIG. 1. Also, shown in FIG. 1 is a computer readable storage medium 84. Its use, in combination with the other elements of the present invention, is described in more detail below.

Figure 2:
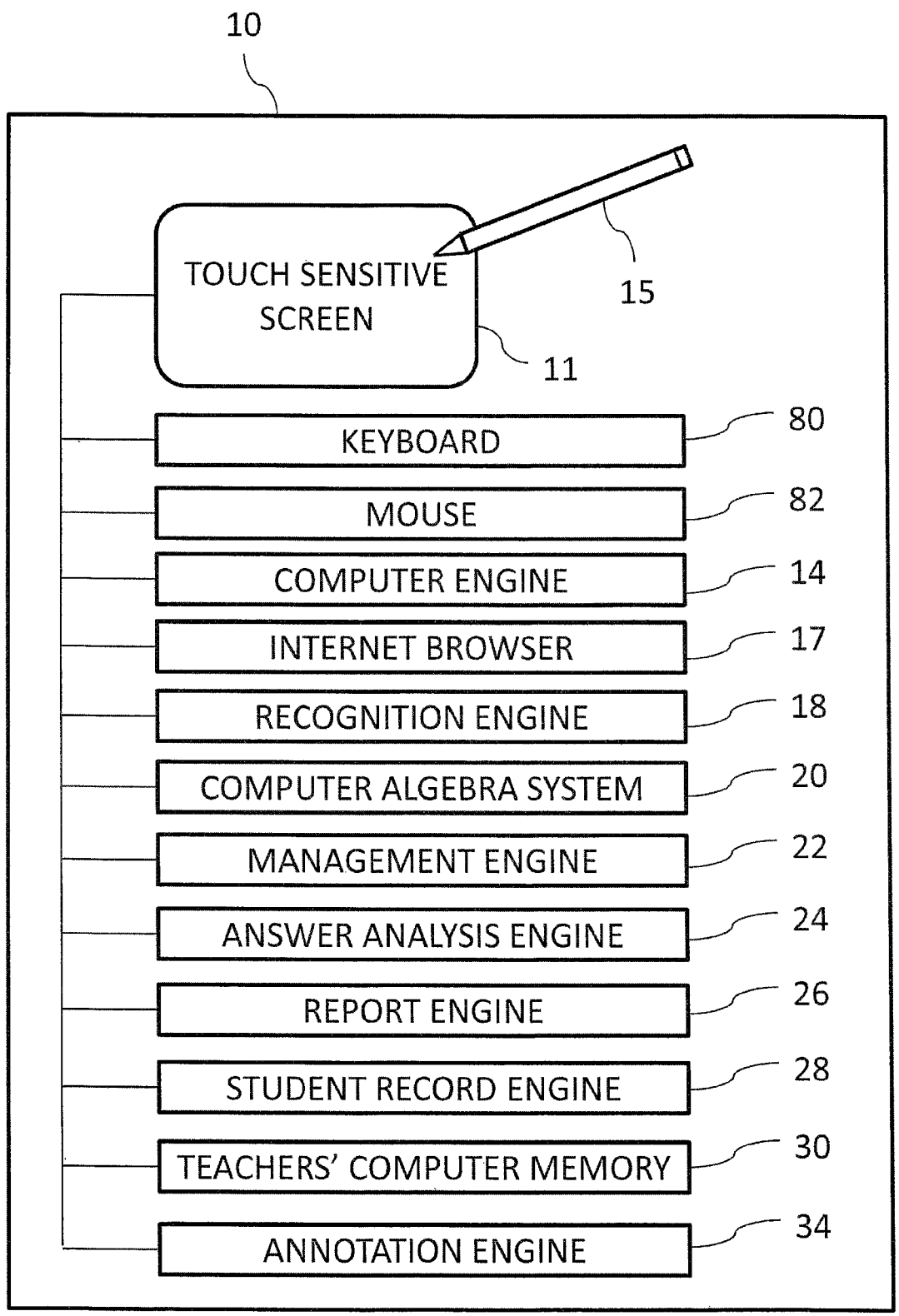
FIG. 2 is a block diagram of the teacher's computer forming part of the system of the present invention.

FIG. 2 is a block diagram of elements included in the pen-enabled computer 10 operated by the teacher. Pen-enabled computers are common in the industry and are commercially available from Hewlett Packard Company of Palo Alto, Calif., Fujitsu of Tokyo, Japan and Dell, Inc. of Round Rock, Tex., to name a few suppliers. These computers are equipped with a keyboard 80 and a mouse 82, a touch-sensitive graphical user interface (GUI), such as a touch sensitive screen 11, and a stylus 15 to provide input from a user. Computers such as these have a built-in computer engine 14 and a computer memory 30 for storing information. There are also commercially available tablet pen-enabled computers which do not have an integral keyboard and mouse and rely solely on their touch sensitive screen for user input. These tablets may be purchased from Apple, Inc. of Cupertino, Calif. (e.g., the iPhone™ device or the iPad™ device) and Dell, Inc. of Round Rock, Tex. (e.g., the various Android™ models), two of many suppliers. This type of tablet is less expensive than the computers mentioned above which have an integral keyboard and mouse. Tablet computers 10 and 12 are typically supplied with a web browser 17. Web browsers are built to well-known industry standards, and the functionality of the computers in which they are installed, as will be described below, may be augmented by cloud computing 16 via their internet browsers 17.

A software platform comprising a recognition engine 18 and a Computer Algebra System (CAS) 20 is installed in the pen-enabled computer 10 operated by the teacher. Software platforms such as these are commercially available, e.g., FluidMath™ provided by Fluidity Software, Inc., of Somerville, Mass. Either FluidMath™, or another similar software application, enables the user of a pen-enabled computer to create, solve, graph and animate math and science problems and sketches on the screen of their pen-enabled computer. The recognition engine 18 can read handwritten math formulae and sketches drawn on the screen of the computer, understand the formulae, associate the formulae with the sketches, and create solutions, graphs and dynamic animations.

The recognition engine 18 is also embodied in the student computer 12 and interprets the handwritten input on the screens of the students' tablets linked in the network and creates digitally enhanced versions of not only handwritten text input but also hand-drawn figures. Digital enhancement converts handwritten text to typeface text and hand-drawn sketches and diagrams to textbook-like figures. The enhancement process does not change the technical content of what is being enhanced. For example, handwritten text is displayed as printed typeface and hand-sketched figures are displayed as scale drawings with straight lines, perfect circles, and measured angles. The system of the present invention spontaneously generates the digitally enhanced versions and transmits them for display on each of the computers in the network.

The software platform also includes the general-purpose CAS 20. Mathematical computation, graphing and animation are accomplished with the user interfacing with the CAS 20 through handwritten input via the graphical user interface (GUI) screen 11 of the computer. As is known in the art, pen-enabled computers include features which are advantageous for the teaching and learning of STEM principles.

As shown in FIG. 2, the software of the present invention provides the teacher's tablet computer 10 with the following additional functionality included in the present invention: a network management engine 22, an answer analysis engine 24, a report engine 26, a student record engine 28, a teacher's computer memory 30 and an annotation engine 34. As described below, each of these engines cooperates with the other elements of the pen-enabled computer 10 operated by the teacher. The present invention enables spontaneous collaboration among the participants linked in the network 19.

The network management engine 22 enables the teacher to control and administer the computers 10 and 12 in the network 19 to perform the following functions:

a) Store example problems and solutions in the teacher's computer memory 30.

b) Store assessment quiz questions and their solutions in the teacher's computer memory 30.

c) Select and transmit stored material to the pen-enabled computers 12 operated by the students.

d) Transmit handwritten notation input into the pen-enabled computer 10 operated by the teacher to the pen-enabled computers 12 operated by the students.

e) Enable and disable functionality provided by the pen-enabled computers 12 operated by the students. During an assessment in accordance with the present invention, the teacher transmits over the network an instruction to the students' computers 12 to disable their problem solving capability so that the student solves the assessment, not his/her computer.

f) Store and evaluate the answers transmitted by the students from their computers 12 to the teacher's computer 10.

g) Provide collaborative math interactivity via handwritten math notation among participants linked by the network 19 as if writing on a whiteboard.

The annotation engine 34 enables any participant to annotate (add to, change, or delete, or interact mathematically with) the content of another participant's input by inputting their own computer with the annotation. The annotation is input and displayed on the computer of the participant making the change and is displayed on the respective computer of the participant whose input is being annotated as well as appearing simultaneously on all the computers linked in the network 19.

The annotation engine 34 enables the operator of any computer linked on the network 19 to transmit handwritten math notation instructing any other computer on the network 19 to perform a math calculation. For example, annotations input by a teacher can include math notation and geometric figures which interact mathematically with input displayed on a student computer and vice versa.

The answer analysis engine 24 provides the pen-enabled computer 10 operated by the teacher with the functionality to compare answers provided by the students to correct answers stored in the memory 30 of the teacher's computer 10 and/or generated by the CAS 20. The report engine 26 provides the computer 10 operated by the teacher with the functionality to present reports regarding the students' performance. The student record engine 28 provides the computer 10 operated by the teacher with the functionality to create individual student performance records for each student in the teacher's classes. The results of the assessments can be downloaded to a spreadsheet and stored therein.

Figure 3:
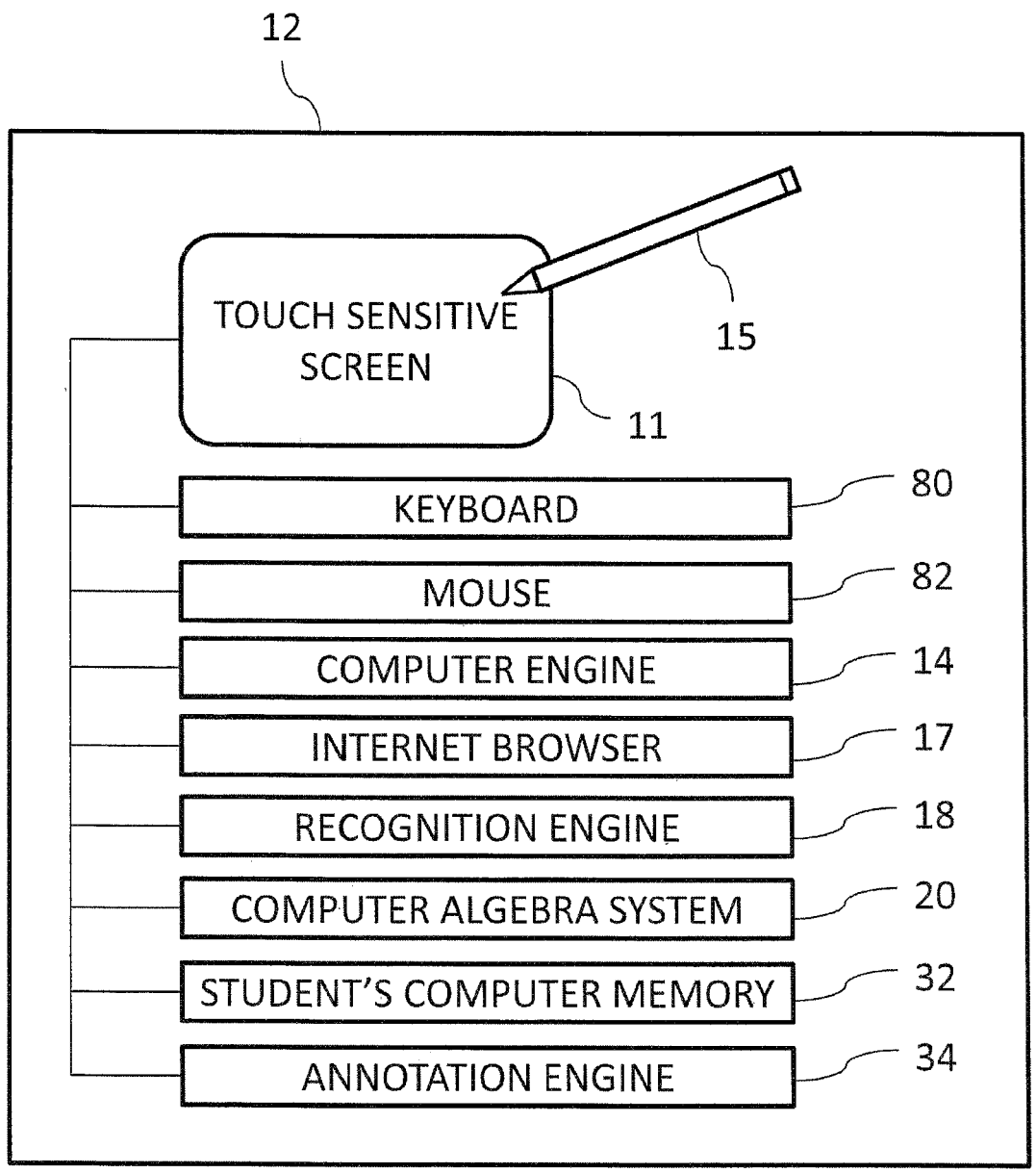
FIG. 3 is a block diagram of the student's computer forming part of the system of the present invention.

As shown in FIG. 3, the pen-enabled computer 12 operated by the student is a commercially available computer similar to the computer 10 (FIG. 2) operated by the teacher having the touch-sensitive screen 11 and the built-in computing engine 14. The student's computer 12 also includes the internet browser 17, the recognition engine 18, the CAS 20 and a student's computer memory 32. The functionality of the student's computer can be augmented by cloud computing 16. The functionalities of the elements in the student's computer 12 have been described above in the description of the teacher's computer 10 and, for the sake of brevity, are not repeated here.

The recognition engine 18, the CAS 20, and the answer analysis engine 24 enable the teacher to use the teachers' computer 10 to spontaneously create and solve example problems while teaching a lesson which can be transmitted to the students' computers 12 for presenting the problem. The teacher can also create pre-designed example problems while preparing for a lesson and store them in the teacher's computer 10 for retrieval when teaching a future lesson. In like manner, the teacher can also either spontaneously create assessment quiz problems in class or pre-design them for use in a future lesson. In each case, the teacher's computer stores the answers in STEM notation in the memory 30 of the teacher's computer 10. During an assessment process, the teacher can disable the problem solving functionality on the student's computer 12 to make sure the student is not using his/her computer to solve the problem.

The current explosive growth of tablet PCs with touch sensitive screens has led to a broad range of commercially available tablets along with a variety of operating systems provided in these tablets. Some of these operating systems may not support the software platform (the recognition engine 18 and the CAS 20) of the system of the present invention. However, most commercially available tablets are supplied with an internet browser 17 (FIG. 2). In the present invention, the cloud computer 16 has installed therein the software platform necessary to support the functionality of the present invention. The internet browser 17 communicates with the cloud computer 16 to access the internet platform stored therein, thereby providing the functionality required in the system and method of the present invention. Regardless of what operating system with which the tablet computer is supplied, as long as it has a web browser, it will be operable in accordance with the method and system of the present invention and as described herein. Accessing the cloud 16 and the calculations performed therein are entirely transparent to the users.

The logic and software for carrying out the functions of the teacher computer 10 and/or the student computers 12, and to create the various engines described above, may be embodied on the computer-readable storage medium 84, which is received by, interfaces with, or forms part of, the teacher computer 10 and/or the student computers 12. It should be understood that such computer-readable storage medium 84 includes, and may be realized as, a computer/compact disc (CD), a digital versatile/video disc (DVD), a read only memory (ROM), a programmable read only memory (PROM), an electrically erasable programmable read only memory (EEPROM), a random access memory (RAM) and like devices.

Although it is disclosed herein that the computer-readable storage medium 84 (FIG. 1) preferably resides on or is received by the at least one teacher computer 10, it is envisioned to be within the scope of the present invention to have the storage medium 84 residing on or being received by one or more student computers 12, or on the servers or computers which are associated with or perform the function of the cloud computing 16. Furthermore, one or more of the student computers 12 or the cloud computers or remote computers may be structured to include the same features and functionality of the teacher computer 10, including a keyboard 80, mouse 82, or a touch sensitive screen 11 and stylus 15, a management engine 22, an answer analysis engine 24, a report engine 26 and a student record engine 28, such that the functions of the teacher computer 10 may be performed by the one or more student computers 12, and any reports may be generated by the one or more student computers 12 and communicated to, and displayed on the display of, the teacher computer 10.

What follows are four examples of how the instant invention may be used by teachers and students to collaborate with each other via handwritten math notation and geometric figures to explore STEM principles. Teachers of STEM subjects are familiar with the lesson content typically employed to teach STEM principles through the use of example problems and therefore the details of such lessons are not included herein.

Rather, described below, by way of example, are the didactic features of the computerized system of the present invention embodied in the teacher's computer 10 and the student's computer 12 and how they enable handwritten collaboration.

A first example problem (FIG. 4) shown on the display of a student's computer relates to the teaching of basic algebra. In this first example, the teacher is presenting an algebra lesson covering the graphing of a straight line. The teacher is using a teacher's tablet PC 10 and the students are using student tablet PCs 12. The tablet PCs are of the type described above in FIG. 2 and FIG. 3 and are networked together as shown in FIG. 1.

In this example, at least one teacher and at least one student are not collocated. However, the present invention transforms each of their GUI screens to function as a virtual shared whiteboard which can be used by the teacher and the student simultaneously, as if they were next to each other. Furthermore, the present invention enables the virtual whiteboard to recognize and understand handwritten math notation. Whatever is input on the GUI 11 of the teacher's computer 10 is displayed and retained thereon and is simultaneously displayed and retained on the GUI 11 of the student's computer 12, and vice versa. The teacher and the student share written math notation via their respective GUI screens 11 as if they were standing side by side writing on an intelligent whiteboard located in front of them.

As noted above, the recognition engine 18 enables teachers and students to spontaneously create enhanced textbook grade illustrations of math problems without having to painstakingly draw them. The present invention spontaneously enhances each handwritten input and integrates the enhanced version into the system. Participants on the network can also be colleagues solving a STEM problem. The system of the present invention forms a common work page upon which participants collaborate using handwritten input. Their handwritten input is digitally enhanced for presentation on all the computers in the network. Also, as noted above, the system of the present invention enables a teacher to disable the problem solving functionality of the students' computers 12. During an assessment, their problem solving capabilities are disabled to ensure that the students' answers have not been automatically generated by their respective tablet computers 12.

Figure 4:
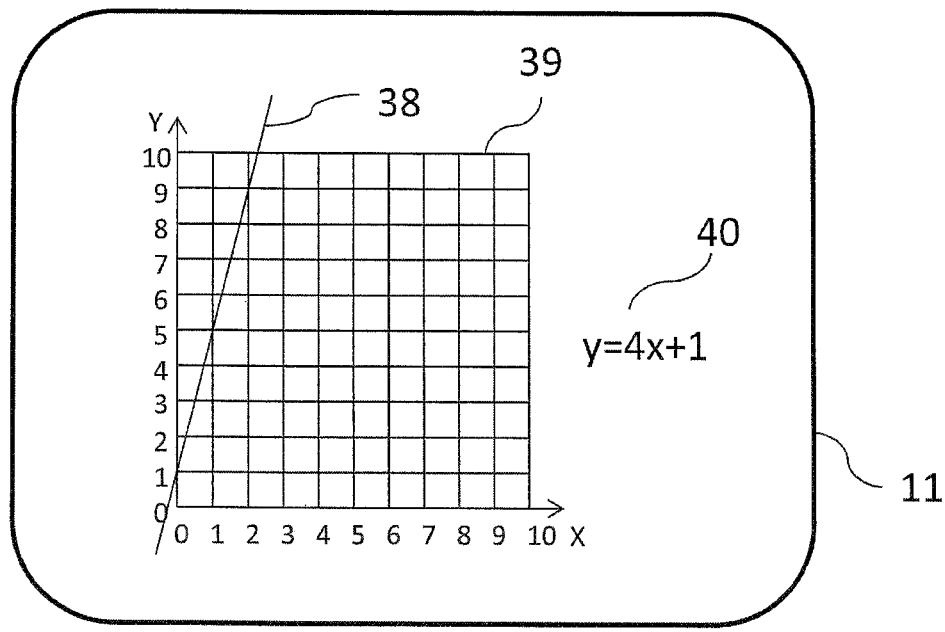
FIG. 4 is a simplified pictorial illustration of the graphical user interface (GUI) display of a student's computer of the system of the present invention showing a graph and an equation to illustrate a first example of a teacher-student collaboration in accordance with the method of the present invention.

In FIG. 4, the teacher presents the concept of an equation representing a first straight line 38. The graph of the line 38 can either be spontaneously drawn on the screen 11 of the teacher's computer 10 by the teacher or retrieved by the teacher from the memory 30 in the teacher's computer 10 as an example having been previously stored therein by the teacher. In FIG. 4, the teacher has retrieved the first example, including a set of Cartesian coordinates 39, from the teacher's computer memory 30. The example is transmitted by the teacher's computer 10 for presentation on the student computers 12. An equation, $y=4x+1$, reference No. 40, of the first straight line 38, is presented as part of the lesson. The teacher may use other examples and diagrams to define the line 38. Whatever examples the teacher selects, the pen-centric presentation process of the present invention is easy to use and does not interrupt the teaching flow in the class.

Figure 11:
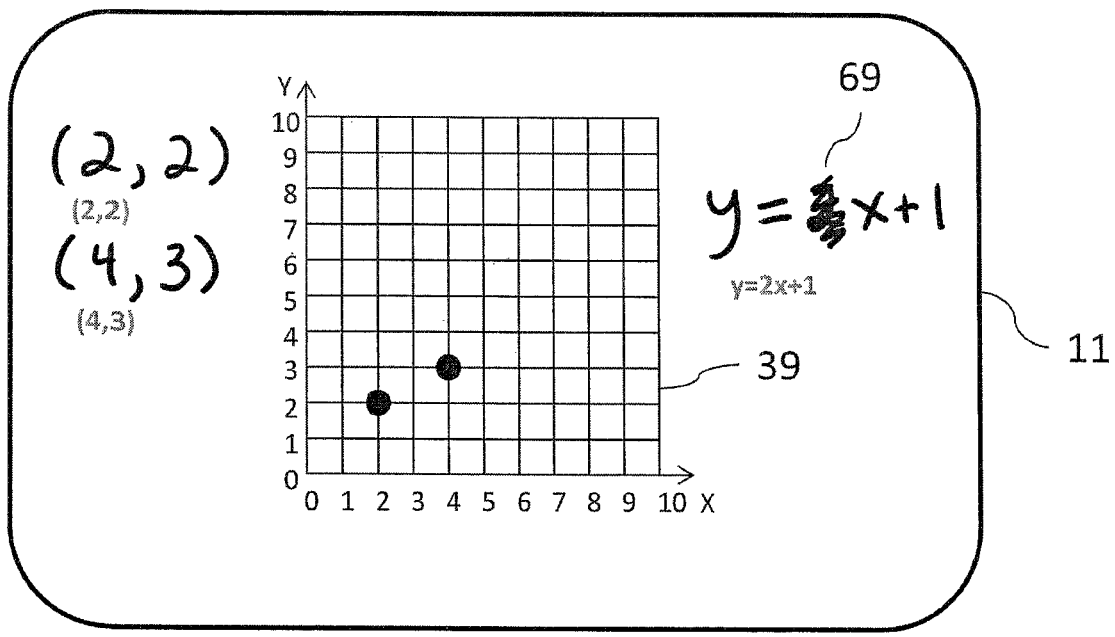
FIG. 11 is a simplified pictorial illustration of a GUI display showing the fourth step of the teacher-student collaboration in the exploration of the third example wherein the teacher erases an incorrect coefficient in the incorrect answer.

The annotation engine 34 of the present invention enables each participant to interact mathematically to modify the equation 40 and thereby change the characteristics of the graph displayed on each computer in the network 19. For example, any student can change the equation, $y=4x+1$, reference No. 40, displayed on his/her computer 12 to $y=2x+1$ and thereby change the slope of the line 38. As shown in FIGS. 11 and 16, changes are made by using either the stylus 15 (FIG. 1) or a fingertip to input a scribble gesture 69 to erase and change an inked input. Student interactive collaboration enables teachers to engage students, monitor their online responses and compare their learning progress to what the teacher expected in his/her lesson plan.

Figure 5:
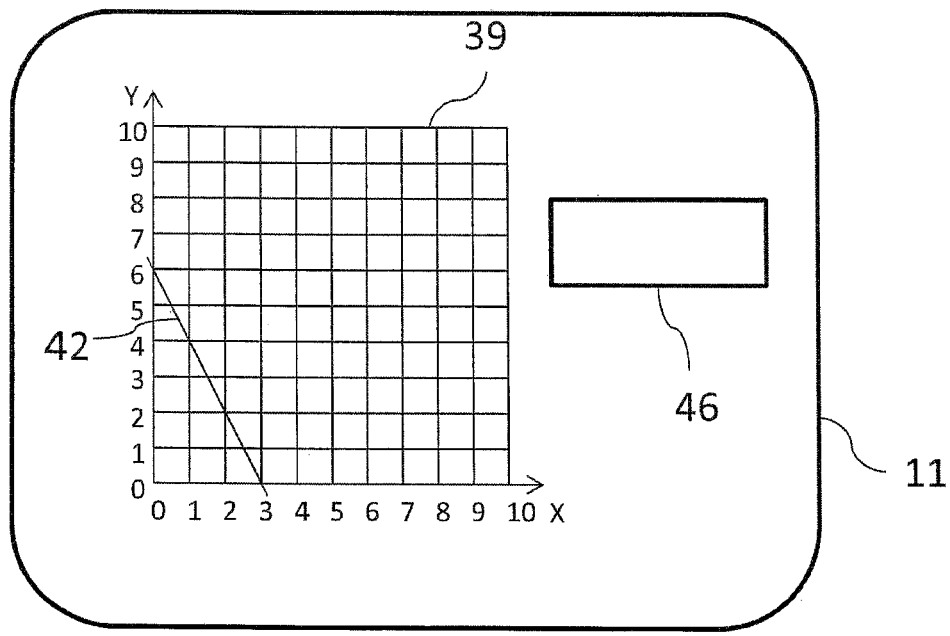
FIG. 5 is a simplified pictorial illustration of the GUI display of a student's computer of the system of the present invention showing a second example of a teacher-student collaboration using the method of the present invention.

At any time during the lesson, by employing the system and method of the present invention, the teacher can collaborate with the students in his/her class to evaluate whether the students are mastering the principles as they are being taught. The teacher assesses all of the students by presenting to the class a second example problem, a graph of a second straight line 42, as shown in FIG. 5. As noted above, the quiz problem can either be spontaneously drawn on the display screen 11 of the teacher's computer 10 by the teacher or accessed from its memory 30, by the teacher and presented on the student's computer 12. The assessment process does not interrupt the flow of teaching. The assessment presented on the student's computer 12 has an empty answer box 46 in which the teacher asks the students to write, in mathematical notation, the equation of the line 42 as show in FIG. 5.

Figure 6:
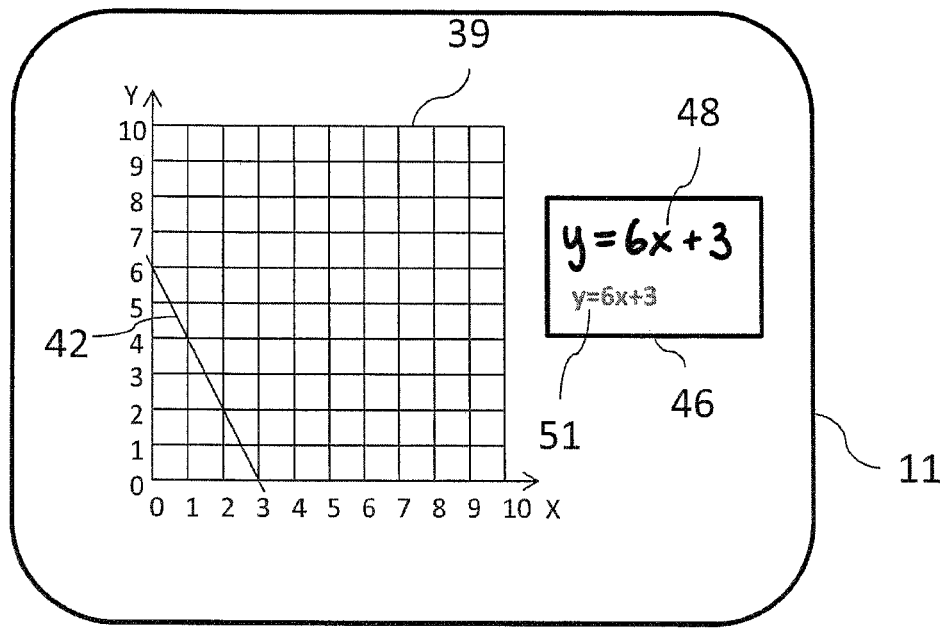
FIG. 6 is a simplified pictorial illustration of the GUI display of a student's computer of the system of the present invention illustrating a student's entry of an incorrect answer to the problem presented in FIG. 5.

Each student responds to the question by entering a handwritten answer, defined by math notation, in the answer box 46 displayed on their respective computers 12. The present invention enables the teacher to scroll through the answers and pick a response which he or she believes is appropriate to be the basis for a collaborative discussion aimed at exploring the math concept embodied in the assessment in order to correct students' misconceptions. The selected response is shown in FIG. 6 and includes, for the purposes of this example, an incorrect answer, $y=6x+3$, reference No. 48, handwritten by a student in the answer box 46 on his or her respective student's computer 12. Also, shown in the answer box 46 is a typeface version 51 of the handwritten input 48 indicating that the computer 12 upon which it is entered has received and understood the handwritten input. In the figures which follow, for the sake of brevity, the typeface versions do not include a reference number and their purpose is not described again. In FIG. 6, the student's answer includes an incorrect slope, 6, rather than the correct slope, −2.

Figure 7:
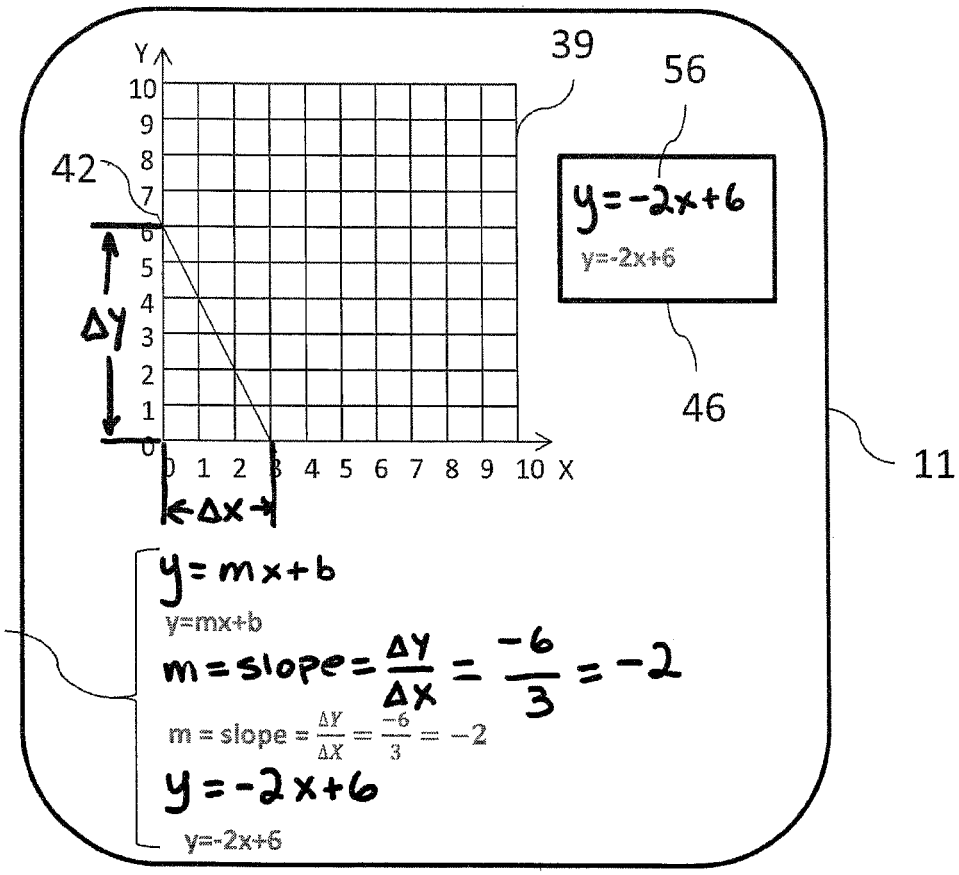
FIG. 7 is a simplified pictorial illustration of the GUI display of a student's computer of the system of the present invention showing a teacher's annotations to the correct answer to the problem presented in FIG. 5.

FIG. 7 illustrates the teacher's response to the student's incorrect answer. The teacher's response includes the following handwritten annotations, reference No. 59:

a) Dimensions labeled $\Delta Y$ and $\Delta X$ defining the slope of the line 42.

b) A correct answer 56 in the answer box 46.

c) Annotations defining the concept of slope embodied in the example.

The hand drawn dimensions labeled ΔY and ΔX on the graph define the coordinate dimensions which determine the slope of the line 42. The correct answer, y=−2x+6, reference No. 56, includes the correct slope, −2, of the equation entered in the answer box 46. Annotations written below the graph define aspects of the graph which the teacher has entered as part of the collaboration to correct students' misconceptions.

Figure 8:
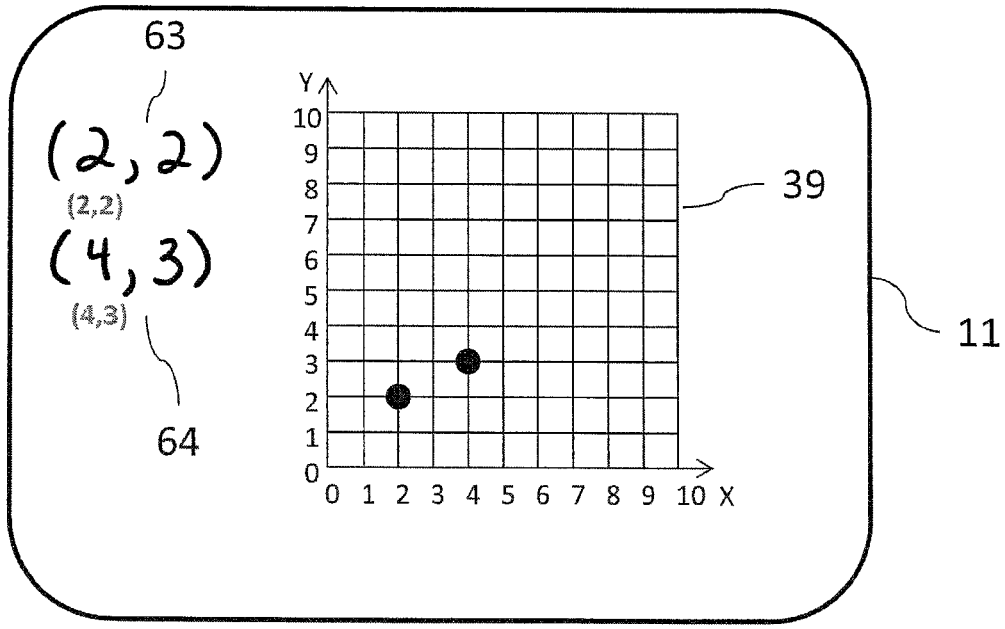
FIG. 8 is a simplified pictorial illustration of a GUI display of a teacher's computer of the system of the present invention showing the first step of a step by step teacher-student collaboration in the exploration of a third example wherein the teacher and students collaborate to plot a line which passes through two points on Cartesian coordinates.

FIG. 8 is a simplified pictorial illustration of the GUI 11 of a teacher's computer 10 displaying the teacher's input in Step 1 of a teacher-student step by step collaboration to create the equation of a straight line passing through the points (2,2), reference No. 63, and (4,3), reference No. 64, in a third example problem.

In Step 1, the teacher retrieves from his/her computer memory 30 a set of Cartesian coordinates 39 and plots the two points (2,2) and (4,3) thereon. The GUIs 11 of each step in the example are displayed on all the GUIs 11 linked by the network 19.

Figure 9:
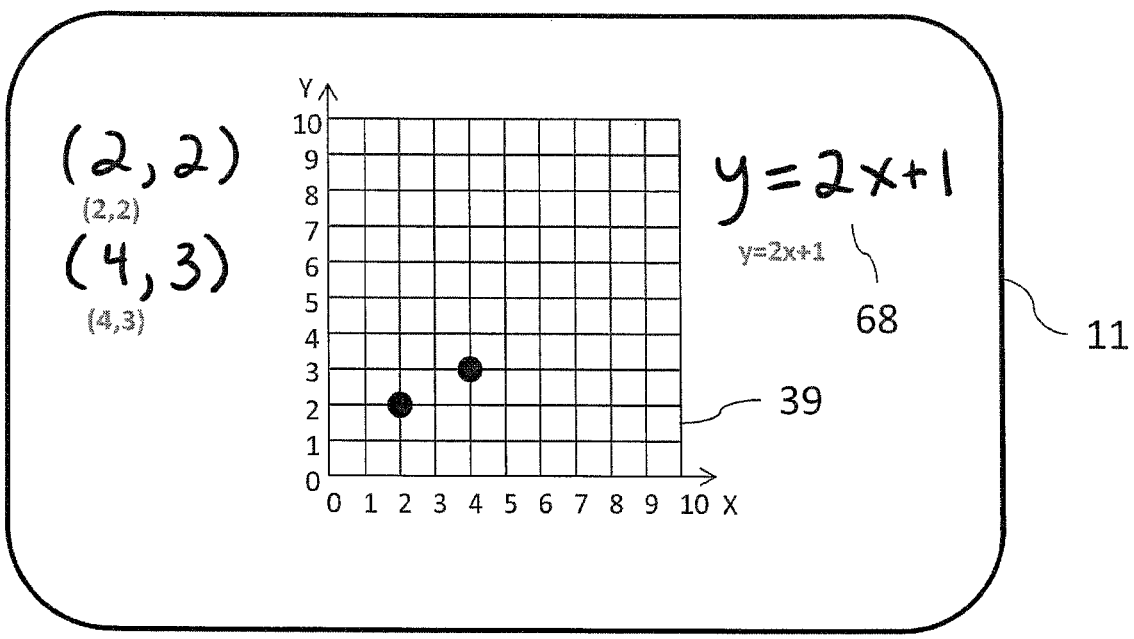
FIG. 9 is a simplified pictorial illustration of a GUI display showing the second step of the teacher-student collaboration in the exploration of the third example wherein the student enters an incorrect equation in answer to the problem presented in FIG. 8.

FIG. 9 is a simplified pictorial illustration of Step 2 in the collaboration. In Step 2, the teacher asks the student to write the equation of the line passing through the points (2,2) and (4,3). In response, the student writes an incorrect answer, y=2x+1, reference No. 68, in the answer box 46.

Figure 10:
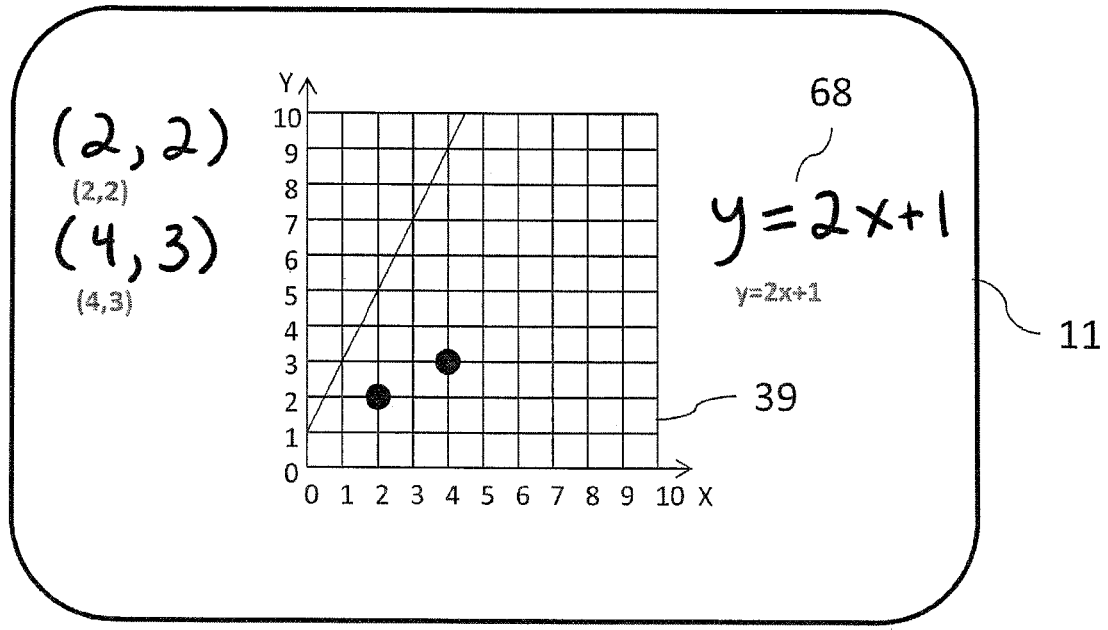
FIG. 10 is a simplified pictorial illustration of a GUI display showing the third step of the teacher-student collaboration in the exploration of the third example wherein the incorrect answer is plotted on the Cartesian coordinates.

FIG. 10 shows Step 3 of the collaboration wherein the teacher asks the student to prompt his/her computer 12 to produce a computerized plot of the line whose equation was entered in Step 2. The line is observed not to pass through (2,2) and (4,3).

FIG. 11 shows Step 4 of the collaboration wherein the teacher indicates that the equation, y=2x+1, includes an incorrect slope. The teacher erases the number 2 in the equation by contacting his or her screen 11 with a stylus 15 or fingertip and by making a scribble 69 on the number 2, thereby erasing it as shown in FIG. 12.

Figure 12:
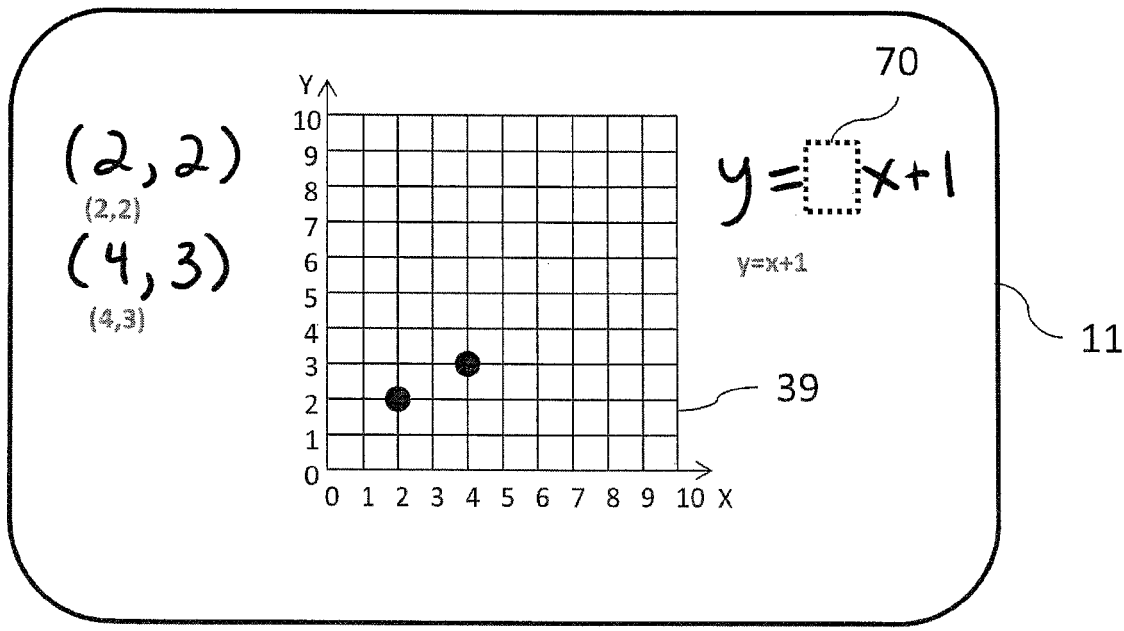
FIG. 12 is a simplified pictorial illustration of a GUI display showing the fifth step of the teacher-student collaboration in the exploration of the third example wherein the student is presented with an equation in which to insert the correct coefficient.

FIG. 12 shows Step 5 of the collaboration wherein the number 2 has been erased from the equation leaving a first space 70.

Figure 13:
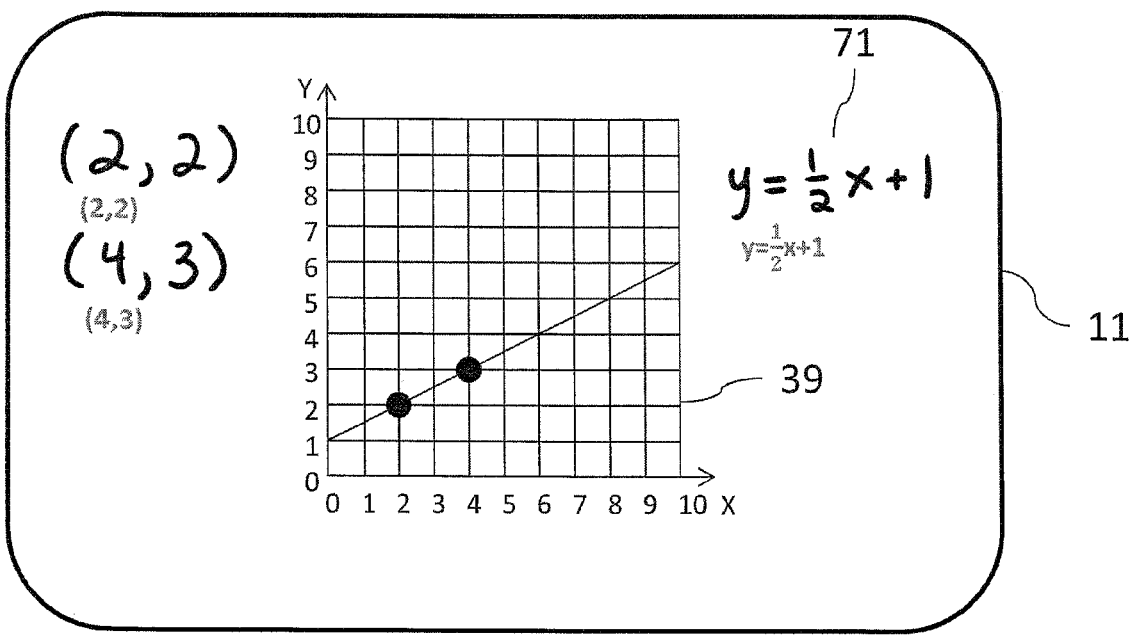
FIG. 13 is a simplified pictorial illustration of a GUI display showing the sixth step of the teacher-student collaboration in the exploration of the third example wherein the student completes the correction of the equation of FIG. 10.

FIG. 13 shows Step 6 wherein the student corrects the slope by entering the correct slope, ½, in the equation and verifies its correctness by having his/her computer plot the line represented by the equation y=½x+1, reference No. 71.

FIG. 14 is a simplified pictorial illustration of the GUI 11 of a teacher's computer 10 displaying the teacher's input in Step 1 of a teacher-student step by step collaboration in solving a fourth example problem which relates to the distributive principle in Algebra. In Step 1, the teacher asks his/her students to solve the equation 2(x−3)=4, reference No. 72, displayed in FIG. 14 using the distributive principle.

In this example, the teacher and the student are not collocated. However, the present invention transforms each of their GUI screens 11 into a virtual shared whiteboard which can be used by the teacher and the student simultaneously. Furthermore, the present invention enables the virtual whiteboard to recognize and understand handwritten math notation. Whatever is input on the GUI 11 of the teacher's computer 10 is displayed and retained thereon and is simultaneously displayed and retained on the GUI 11 of the student computers 12, and vice versa. The teacher and the students share written math notation via their respective GUI screens 11 as if they were standing side by side writing on an intelligent whiteboard located in front of them.

FIG. 15 is a simplified pictorial illustration of Step 2 of the collaboration. In Step 2, the teacher asks a student to rearrange the equation presented in Step 1 using the distributive principle of Algebra. The student writes an incorrect equation, 2x−3=4, reference number 73, on the GUI screen 11 of his/her computer 12.

FIG. 16 is a simplified pictorial illustration of Step 3 of the collaboration. In Step 3, since the teacher and student are sharing the same collaborative whiteboard, the teacher sees on his/her screen 11 what the student wrote. The teacher can now explain to the student that a mistake was made and that he/she can help fix the mistake. The teacher uses a scribble erase gesture 74 to erase the 3 as shown in FIG. 16.

FIG. 17 is a simplified pictorial illustration of Step 4 of the collaboration wherein the number 3 has been erased leaving a second space 75.

FIG. 18 is a simplified pictorial illustration of the correct answer, 2x−6=4, reference number 76, created by the student.

FIG. 19 illustrates the solution to the problem in FIG. 14, the solution being input by the student.

The examples described herein relate to collaborations between teachers and students in educational settings. It is to be understood that the present invention can be used in a broad range of environments wherein participants use tablet computers such as the tablet computers 10 and 12 shown in FIG. 1 to collaborate in the solution of STEM problems and the exchange of STEM reference data either spontaneously handwritten in math notation on the screens of their computers 10, 12 or stored in their respective computers' memories 30, 32.

Unlike the prior art, the present invention enables participants to interact via handwritten math notation as if they were writing on the same virtual whiteboard upon which each participant's handwritten math notation is understood and mathematically interacts with other participants' handwritten math notation.

Although a teacher computer 10 and a student computer 12, and teachers and students, are disclosed herein, it should be understood that the computerized system of the present invention is usable by persons other than teachers and students. More specifically, the system could include just student computers 12 operable by students, just teacher computers 10 operable by teachers, multiple teacher computers 10 and multiple student computers 12, all of which are connected via the communications network 19, and non-teacher and non-student computers, for example, the non-teacher computers and non-student computers being operable by engineers collaborating on solving a STEM problem.

Certain features of the computerized system of the present invention described previously will now be further described.

A computerized system enabling at least a first person (such as a teacher or several teachers, or engineers, for example) and at least a second person (such as a student or several students, or engineers, for example) to collaborate in the solutions of STEM (science, technology, engineering and mathematics) problems includes a communications network 19, at least a first computer 10 operable by the at least first person, at least a second computer 12 operable by the at least second person, the at least second computer 12 being operably connected to the at least first computer 10 via the communications network 19, and at least one computer-readable storage medium 84 operably connected to the communications network 19.

Each of the at least first computer 10 and the at least second computer 12 includes an input device 15, 80, 82 and a touch sensitive screen 11 for receiving handwritten input via the input device 15, 80, 82. The at least first computer 10 and the at least second computer 12 are operably connected to the at least one computer-readable storage medium 84. The at least one computer-readable storage medium 84 contains program instructions transforming each touch sensitive screen 11 of the at least first computer 10 and the at least second computer 12 operably connected via the communications network 19 into a virtual shared whiteboard defining a common work page upon which handwritten input from each of the at least first computer 10 and the at least second computer 12 is received and displayed.

The computerized system causes handwritten input received from the at least first computer 10 to interact mathematically with handwritten input received from the at least second computer 12 operably connected together via the communications network 19 to generate computer interactions. The computer interactions are displayed on the touch sensitive screen 11 of the at least first computer 10 and the at least second computer 12. The handwritten inputs and computer interactions result in a collaborative solution to a STEM problem.

In another form of the present invention, a computerized system enabling at least a first person, such as described above, and at least a second person, such as described above, to collaborate in the solutions of STEM (science, technology, engineering and mathematics) problems includes a communications network 19, at least a first computer 10 operable by the at least first person, at least a second computer 12 operable by the at least second person, the at least second computer 12 being operably connected to the at least first computer 10 via the communications network 19, and at least one computer-readable storage medium 84 operably connected to the communications network 19.

Each of the at least first computer 10 and the at least second computer 12 includes an input device 15, 80, 82 and a touch sensitive screen 11 for receiving handwritten input via the input device 15, 80, 82.

The at least first computer 10 and the at least second computer 12 are operably connected to the at least one computer-readable storage medium 84. The at least one computer-readable storage medium 84 contains program instructions for performing several steps. The steps include: (a) receiving at least one math question handwritten by the at least first person in math notation on the touch sensitive screen 11 of the at least first computer 10 to provide a received handwritten input in math notation; (b) displaying the received handwritten input of step (a) on the touch sensitive screen 11 of the at least first computer 10 and the at least second computer 12; (c) receiving at least one handwritten response from the at least second computer 12 via the communications network 19 to provide a received handwritten response, the at least one response being input by the at least second person by handwriting the at least one response in math notation on the touch sensitive screen 11 of the at least second computer 12; (d) displaying the received handwritten response of step (c) on the touch sensitive screen 11 of the at least first computer 10 and the at least second computer 12; (e) causing by the system the received handwritten response in math notation from the at least second computer 12 to interact with the received handwritten input in math notation from the at least first computer 10 and thereby generating a computer interaction, the computer interaction being displayed on the touch sensitive screen 11 of the at least first computer 10 and the at least second computer 12; (f) comparing the computer interaction with a correct answer to the at least one math question; and (g) repeating steps (c) through (f) until the computer interaction equates to the correct answer.

In another form of the present invention, a computerized system enabling at least a first person, such as described previously, and at least a second person, such as described previously, to collaborate in the solutions of STEM (science, technology, engineering and mathematics) problems includes a communications network 19, at least a first computer 10 operable by the at least first person, at least a second computer 12 operable by the at least second person, and at least one computer-readable storage medium 84.

Each of the at least first computer 10 and the at least second computer 12 includes an input device 15, 80, 82 and a display screen 11. The at least second computer 12 is operably linked to the at least first computer 10 via the communications network 19.

The at least first computer 10 and the at least second computer 12 are operably linked to the at least one computer-readable storage medium 84. The at least one computer-readable storage medium 84 contains program instructions for implementing an application of the system that includes one or more program instructions for performing several steps. The steps include: (a) entering at least one math question description in math notation and at least one correct answer to the at least one math question description into at least one of the at least first computer 10 and the at least second computer 12; (b) storing the at least one correct answer to the at least one math question description in the at least one computer-readable storage medium 84; (c) displaying the at least one math question description entered in step (a) on the display screen 11 of the at least first computer 10 and the at least second computer 12; (d) entering at least one math expression response in response to the at least one math question description entered in step (a) on at least one of the at least first computer 10 and the at least second computer 12; (e) displaying the at least one math expression response entered in step (d) on the display screen 11 of at least one of the at least first computer 10 and the at least second computer 12; (f) causing by the system the at least one math expression response to interact mathematically with the at least one math question description in math notation of step (a) and thereby producing a math expression result; (g) comparing the math expression result of step (f) to the at least one correct answer stored in the at least one computer-readable storage medium 84; and (h) repeating steps (d) through (g) until the math expression result equates to the correct answer.

Turning now to FIGS. 20-34F, there are shown three additional preferred embodiments of a computerized teaching system formed in accordance with the present invention comprising a network of computers used for solving, recording and assessing the solutions of STEM problems. Like numbers used hereinafter and in FIGS. 20-34F refer to the same or similar parts described previously and shown in FIGS. 1-19 in relation to the earlier-described embodiments of the system of the present invention.

Figure 20:
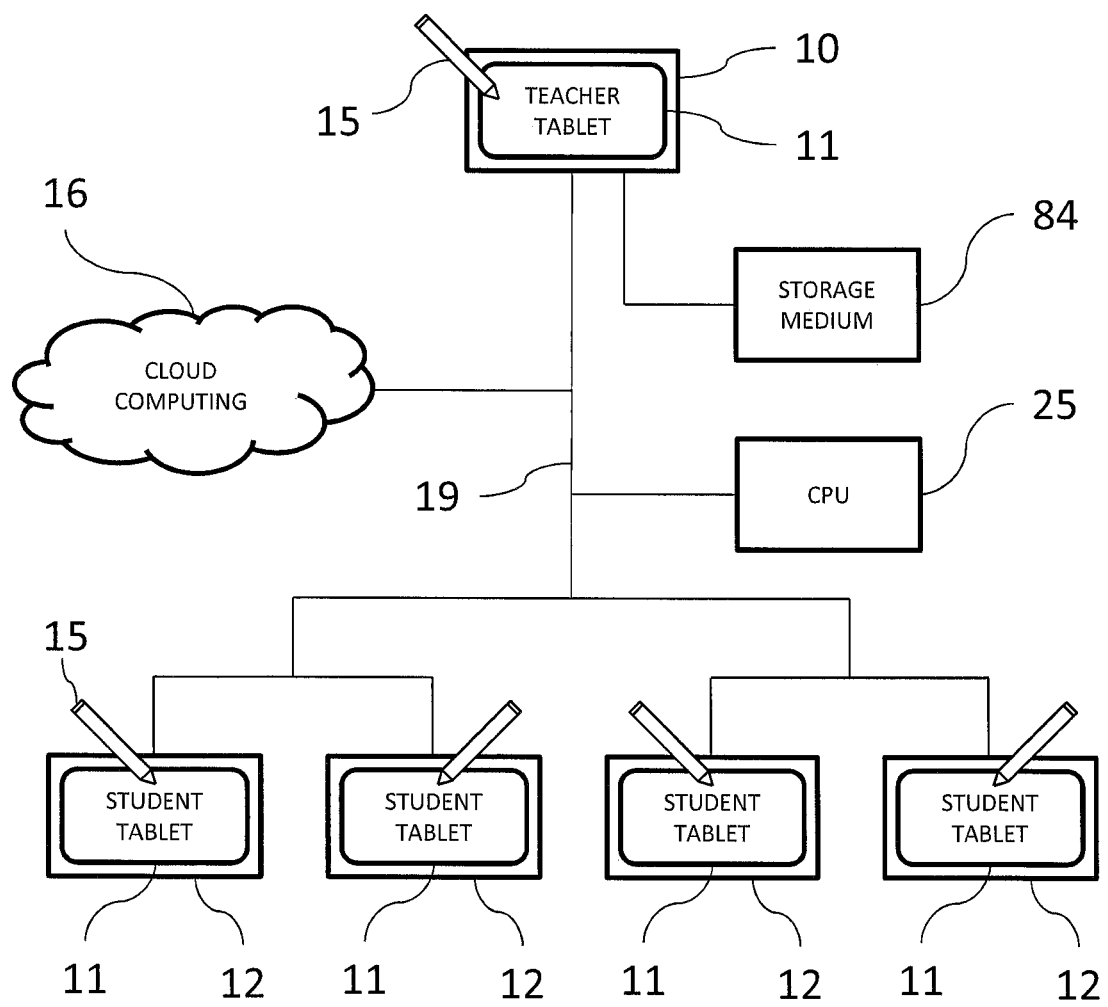
FIG. 20 is a block diagram of another embodiment of a computerized teaching system formed in accordance with the present invention having a network of pen enabled tablet computers configured for participants collaborating in teams.

FIG. 20 illustrates the first of three additional embodiments of the present invention showing a pen-enabled tablet computer 10 operated by a teacher networked with four pen-enabled tablet computers 12 operated by teams of two students in each team collaboratively solving STEM problems. In this disclosure, tablet computers are exemplified by having a touch sensitive screen 11 for receiving input from either a stylus 15 (pen) or a fingertip (not shown) contacting the screen 11.

The tablet computers in FIG. 20 are operatively connected to a cloud computer 16 and a computer readable storage medium 84 by a computer network 19. Although teachers and students, are disclosed as users in the preferred embodiments, it should be understood that the computerized system of the present invention is usable by numerous teams of more than two students in each team and by persons other than teachers and students. The system could include just student computers 12 operable by students, just teacher computers 10 operable by teachers, multiple teacher computers 10 and multiple student computers 12, and non-teacher and non-student computers, being operable by participants such as engineers collaborating to solve a STEM problem, all of which are connected via the communications network 19. The communications network 19 may include any one of, but not limited to, a combination of: a local area network (LAN), a wide area network (WAN), or the World Wide Web (WWW) which includes networking to cloud computing 16. The networked computers may be located in one classroom or in remote locations and may be used to run interactive whiteboards (IWBs) in these locations. As is well known in the art, cloud computing 16 refers to the delivery of computing and storage capacity as a service to a heterogeneous community of end users. Also, shown in FIG. 20 is the computer readable storage medium 84. Its use, in combination with the other elements of the present invention, is described in more detail below.

Figure 21:
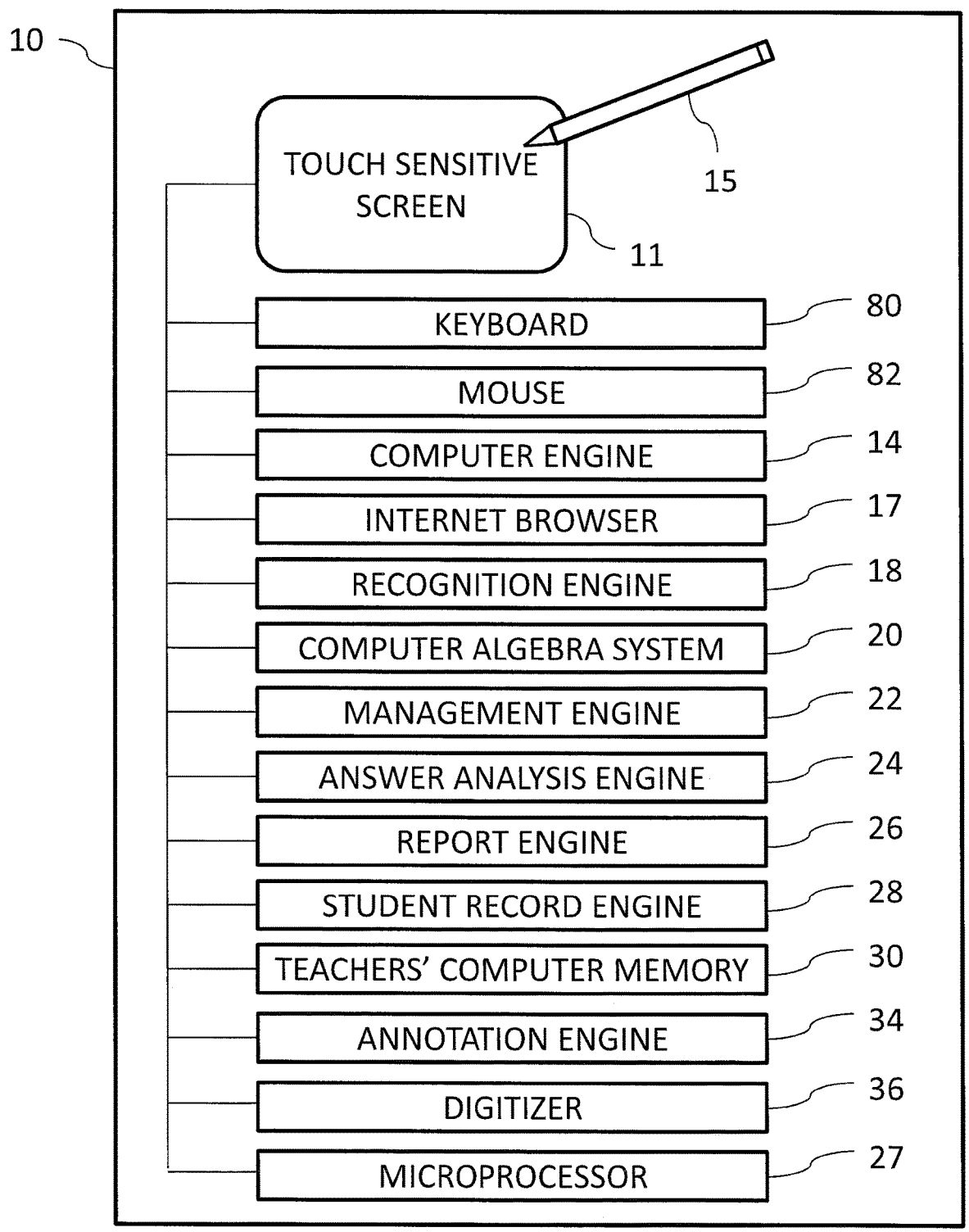
FIG. 21 is a block diagram of a teacher's tablet computer forming part of the system of the present invention shown in FIG. 20.

FIG. 21 is a block diagram of elements included in the pen-enabled tablet computer 10 operated by the teacher. Pen-enabled tablet computers are common in the industry and are commercially available from Hewlett Packard Company of Palo Alto, Calif., Microsoft of Redmond, Wash., Apple of Cupertino, Calif., and Dell, Inc. of Round Rock, Tex., to name just a few suppliers. These computers are equipped with a touch-sensitive screen 11, and a stylus 15 to provide handwritten input. Some tablets are available with physical keyboard 80 and mouse 82 input devices as well as software to create keyboard and mouse functionality on their screens 11. In this disclosure, the pen-centric functionality of tablet computers is exemplified. Tablet computers have a built-in computer engine 14 and a computer memory 30 for storing information. Tablet computers 10 and 12 are typically supplied with a web browser 17. Web browsers are built to well-known industry standards, and the functionality of the computers in which they are installed, as will be described below, may be augmented by cloud computing 16.

In the instant invention, as shown in FIG. 21, a software platform such as FluidMath™ provided by Fluidity Software, Inc., of Somerville, Mass. comprising a recognition engine 18 and a Computer Algebra System (CAS) 20 is installed in the pen-enabled computer 10 operated by the teacher. FluidMath™ enables the user of a pen-enabled computer to create, solve, graph and animate math and science problems and sketches on the screen of their pen-enabled computer. FluidMath™ enables the recognition engine 18 to read handwritten math formulae and sketches drawn on the screen of the computer, understand the formulae, associate the formulae with the sketches, and spontaneously generate mathematics representations of the formulae and the sketches in the form of, but not limited to, graphs and dynamic animations displayed on the touch sensitive screens of the computers of the participants. The recognition engine 18 interprets the handwritten input on the screens 11 of the students' tablets linked in the network 19 and creates digitally enhanced versions of not only handwritten text input but also hand-drawn figures. Digital enhancement converts handwritten text to typeface text and hand-drawn sketches and diagrams to textbook-like figures. The enhancement process does not change the technical content of what is being enhanced. For example, handwritten text is displayed as printed typeface and hand-sketched figures are displayed as scale drawings with straight lines, perfect circles, and measured angles. The system of the present invention spontaneously generates the digitally enhanced versions and transmits them for display on each of the computers in the network. Mathematical computation, graphing and animation are accomplished with the user interfacing with the CAS 20 through handwritten input via the graphical user interface (GUI) screen 11 of the computer. As is known in the art, pen-enabled computers include features which are advantageous for the teaching and learning of STEM principles.

As shown in FIG. 21, the software of the present invention also provides the teacher's tablet computer 10 with the following additional functionalities: a network management engine 22, an answer analysis engine 24, a report engine 26, a student record engine 28, a teacher's computer memory 30, an annotation engine 34 and a digitizer 36 which enables figures to be drawn on the touch sensitive screen 11 of a tablet computer 10 and 12 (FIG. 20). The network management engine 22 enables the teacher to control and administer the computers 10 and 12 in the network 19.

The answer analysis engine 24 provides the pen-enabled computer 10 operated by the teacher with the functionality to compare answers provided by the students to correct answers stored in the memory 30 of the teacher's computer 10 and/or generated by the CAS 20. The report engine 26 provides the computer 10 operated by the teacher with the functionality to present reports regarding the students' performance. The student record engine 28 provides the computer 10 operated by the teacher with the functionality to create individual student performance records for each student in the teacher's classes. The results of the assessments can be downloaded to a spreadsheet and stored therein.

The annotation engine 34 enables any participant to annotate (add to, change, or delete, or interact mathematically with) the content of another participant's input by inputting their own computer with the annotation. The annotation is input and displayed on the computer of the participant making the change and is displayed on the respective computer of the participant whose input is being annotated as well as appearing simultaneously on all the computers linked in the network 19. The annotation engine 34 enables the operator of any computer linked on the network 19 to transmit handwritten math notation instructing any other computer on the network 19 to perform a math calculation. For example, annotations input by a teacher can include math notation and geometric figures which interact mathematically with input displayed on a student computer and vice versa. Annotations may also be entered asynchronously.

Figure 22:
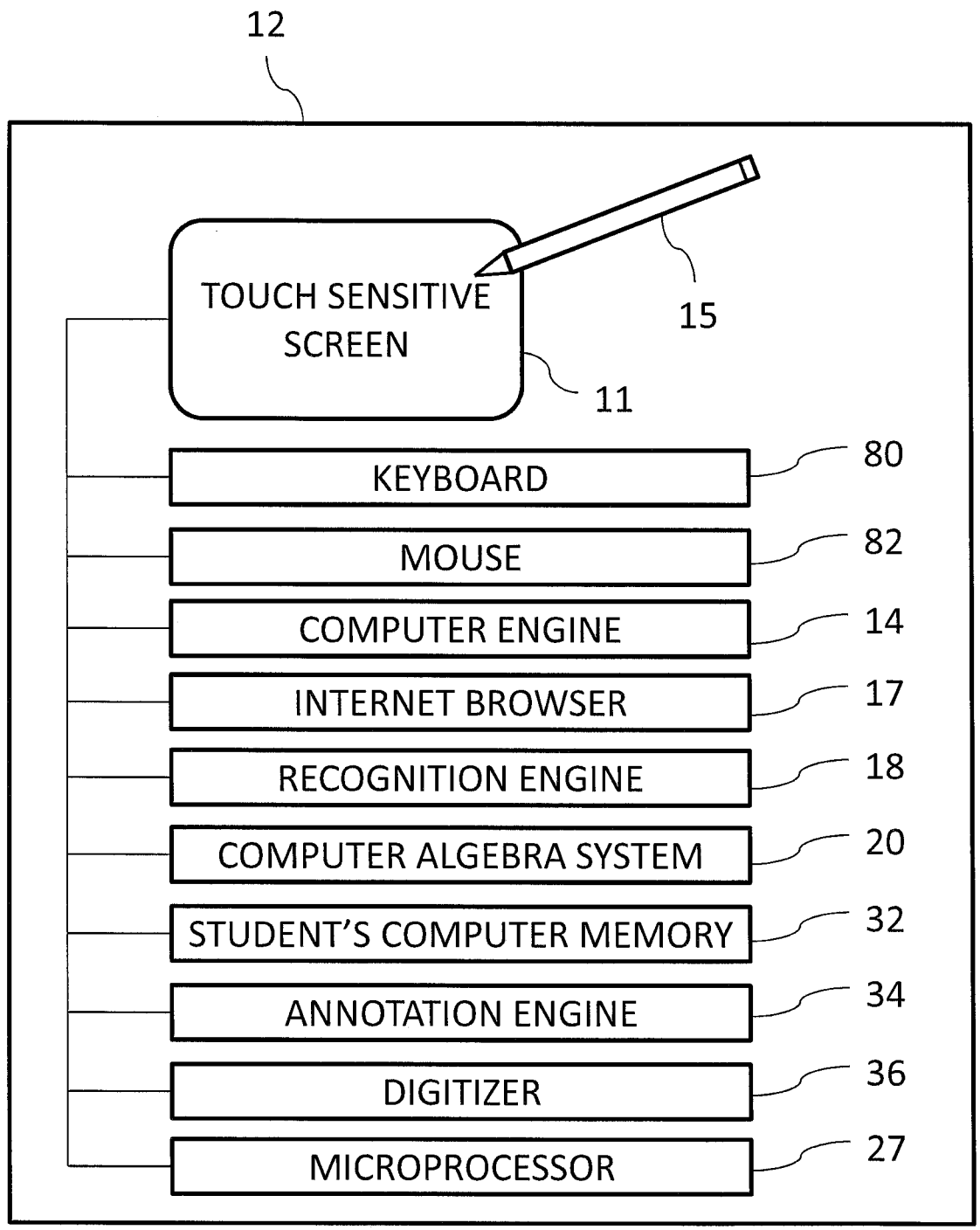
FIG. 22 is a block diagram of a student's tablet computer forming part of the system of the present invention shown in FIG. 20.

As shown in FIG. 22, the pen-enabled computer 12 operated by the student is a commercially available computer similar to the computer 10 (FIG. 21) operated by the teacher having the touch-sensitive screen 11 and the built-in computing engine 14. The student's computer 12 also includes the internet browser 17, the recognition engine 18, the CAS 20 and a student's computer memory 32. The functionality of the student's computer can be augmented by cloud computing 16. The functionalities of the elements in the student's computer 12 have been described above in the description of the teacher's computer 10 and, for the sake of brevity, are not repeated here. The system of the present invention enables any participant to spontaneously create math representations which are presented and recorded while collaborating with others to solve a math problem.

The current explosive growth of tablet PCs with touch sensitive screens has led to a broad range of commercially available tablets along with a variety of operating systems provided in these tablets. Some of these operating systems may not support the software platform (the recognition engine 18 and the CAS 20) of the system of the present invention. However, most commercially available tablets are supplied with an internet browser 17 (FIG. 21). In the present invention, the cloud computer 16 has installed therein the software platform necessary to support the functionality of the present invention. The internet browser 17 communicates with the cloud computer 16 to access the internet platform stored therein, thereby providing the functionality required in the system and method of the present invention. Regardless of what operating system with which the tablet computer is supplied, as long as it has the web browser 17, it will be operable in accordance with the method and system of the present invention. Accessing the cloud 16 and the calculations performed therein are entirely transparent to the users.

The logic and software for carrying out the functions of the teacher computer 10 and/or the student computers 12, and to create the various engines described above, may be embodied on the computer-readable storage medium 84, which is received by, interfaces with, or forms part of, the teacher computer 10 and/or the student computers 12. It should be understood that such computer-readable storage medium 84 includes, and may be realized as, a computer/compact disc (CD), a digital versatile/video disc (DVD), a read only memory (ROM), a programmable read only memory (PROM), an electrically erasable programmable read only memory (EEPROM), a random access memory (RAM) and like devices.

Although it is disclosed herein that the computer-readable storage medium 84 (FIG. 20) preferably resides on or is received by the at least one teacher computer 10, it is envisioned to be within the scope of the present invention to have the storage medium 84 residing on or being received by one or more student computers 12, or on the servers or computers which are associated with or perform the function of the cloud computing 16. Furthermore, one or more of the student computers 12 or the cloud computers or remote computers may be structured to include the same features and functionality of the teacher computer 10, including a keyboard 80, mouse 82, or a touch sensitive screen 11 and stylus 15, a management engine 22, an answer analysis engine 24, a report engine 26, a student record engine 28, and a digitizer 36 such that the functions of the teacher computer 10 may be performed by the one or more student computers 12, and any reports may be generated by the one or more student computers 12 and communicated to, and displayed on the display of, the teacher computer 10.

The system and method of the present invention enables the recording in real-time and subsequent playing back of the collaborative or individual efforts of participants using tablet computers and handwritten math notation to solve STEM problems. Recording and playing back the collaboration enables a teacher to assess all students in a collaboration which involves several students working in teams simultaneously. What follows below are descriptions of the elements of the present invention which enable the recording, playing back, and assessing of students' Collaborative Problem Solving (CPS) skills.

Figure 23:
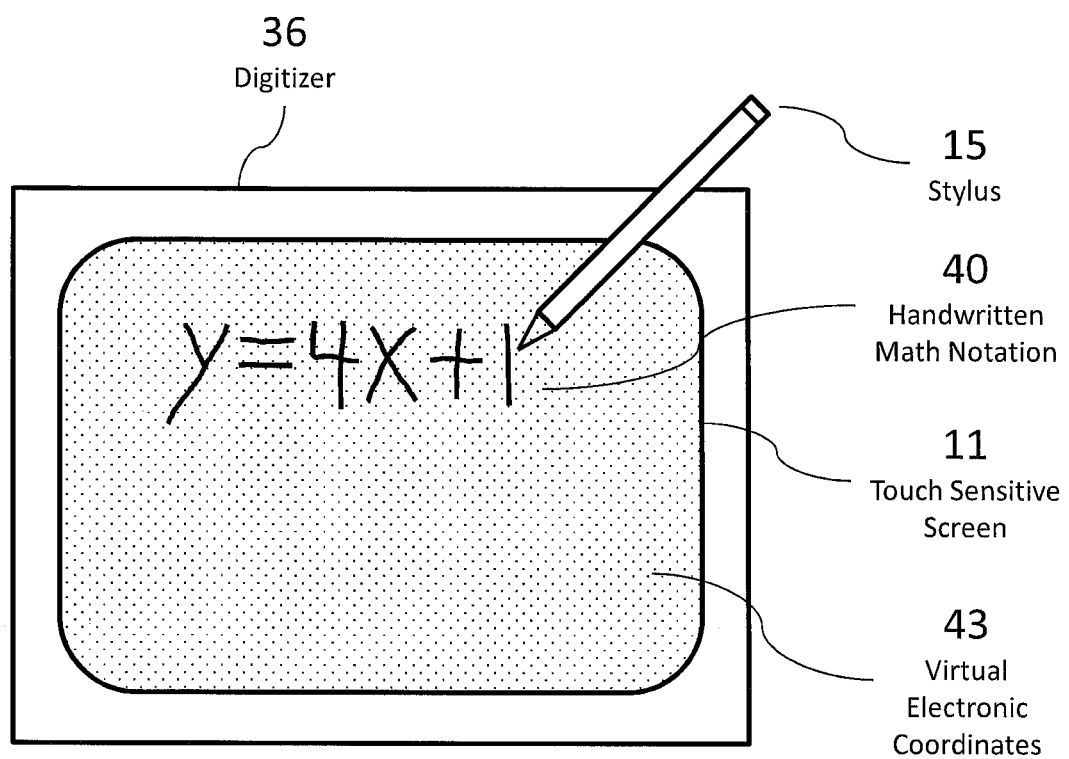
FIG. 23 is a simplified pictorial illustration of the graphical user interface (GUI) display of a teacher's tablet computer and a student's tablet computer of the system of the present invention showing a handwritten math notation input on the touch sensitive GUI screen wherein the GUI screen embodies virtual coordinates.

FIG. 23 pictures a simplified illustration of the touch sensitive screen 11 of the teacher's tablet computer 10 (FIG. 21) or the student's tablet computer 12 (FIG. 22). Each screen 11 is operably connected to a digitizer 36 and each screen 11 embodies virtual electronic coordinates 43 in the touch sensitive screens 11 of the networked computers. FIG. 23 shows the virtual electronic coordinates 43 that are used to create the digital input data which define the handwritten input on the touch sensitive screen 11. The digitizer 36, an integral element of most tablet computers, creates the digital input data which is used to display the math notation and math illustrations on the touch sensitive screens 11. The digitizer 36 also converts the math notation and math representations into the digital input data which is used in the recording of the collaboration. Also illustrated in FIG. 23 is the stylus 15 used to input handwritten math notation on the touch sensitive screens 11. The stylus is a writing instrument such as, but not limited to, a pen shaped device. A fingertip (not shown) is often used as a stylus. When the stylus 15 or fingertip contacts the surface of the touch sensitive screen 11 of a pen-enabled tablet device, "digital ink" appears on the screen 11 of the tablet. "Digital ink" or "ink" is commonly understood in the industry to be the result created on the screen 11 of a tablet device caused by the stylus or the fingertip contacting its touch sensitive screen. The digital ink is identified by the virtual coordinate 43 contact location of the input device at any particular time as the user moves it on the screen 11. The result is like writing on paper with liquid ink. Time is recorded from when the stylus 15 or fingertip contacts the touch sensitive screen 11 until it is lifted. Digital input data is recorded by the computer-readable storage medium 84 monitoring the tablet computer on which the input is entered. The instant invention is enabled, when prompted by a participant, to record and play back each participant's efforts in the collaboration in the actual time sequence and the actual time taken to create the digital input data during the collaboration.

Figure 24:
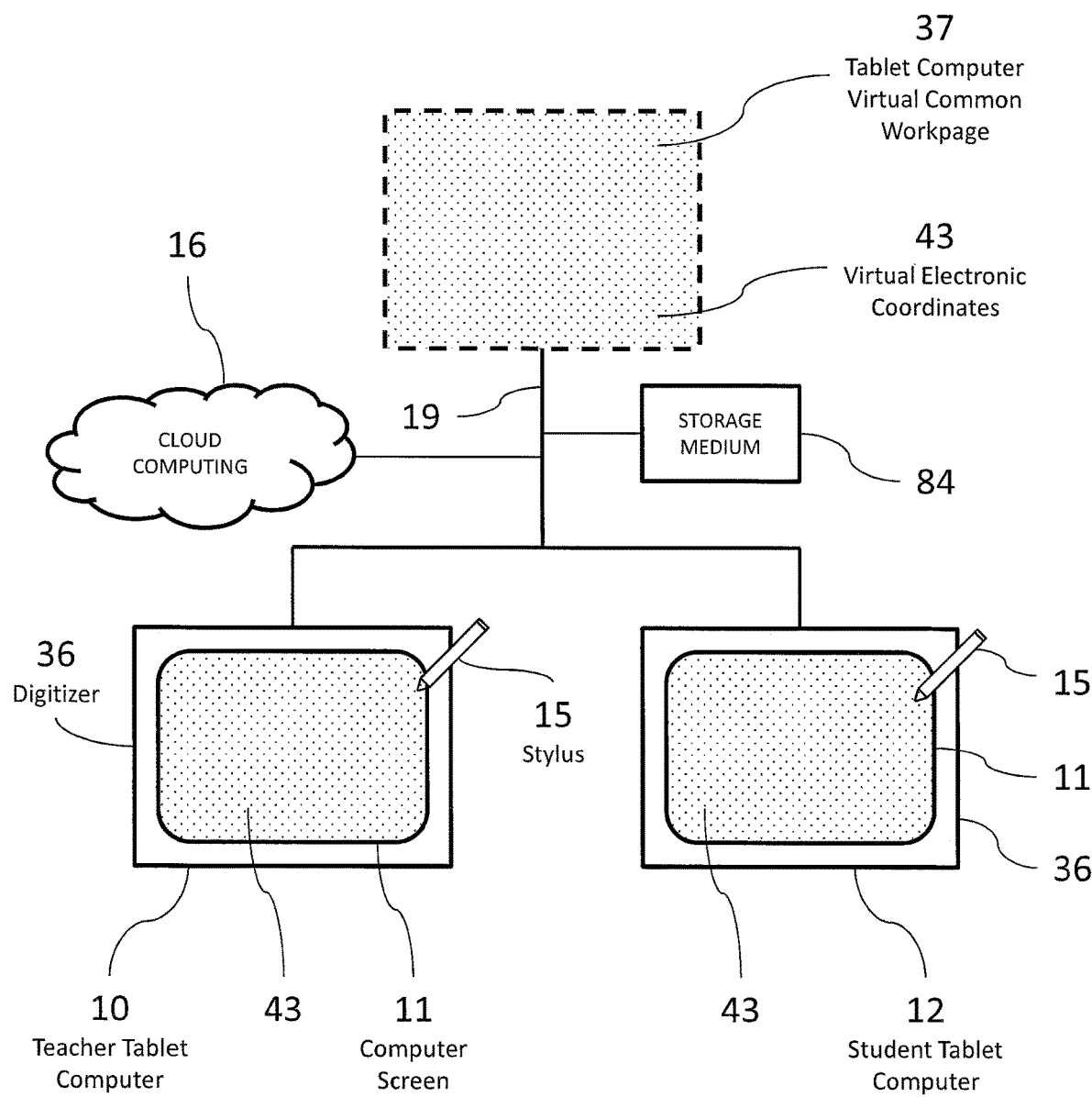
FIG. 24 is a block diagram of a computerized teaching system formed in accordance with the present invention showing a virtual common work page defined by tablet computers.

FIG. 24 depicts a tablet computer virtual common work page 37 formed in accordance with the first preferred embodiment of the present invention. Each of the preferred embodiments disclosed herein includes a virtual common work page having similar functionalities as the functionalities of the tablet computer virtual common work page 37 shown in FIG. 24 (see reference No. 57 in FIG. 29 and reference No. 61 in FIG. 31). In the present invention, one of the functionalities of the common work page is to operably connect the individual computers in their respective networks to function as networked computers having a common screen. In the present invention, the common screen is a combination of all of the screens in their respective network 19. Each respective computer receives input from its respective operator which is viewed simultaneously on each of the operably connected screens in the network wherein each screen functions as part of the common screen. As previously described, the annotation engine 34 (FIG. 21) enables any participant to annotate (add to, change, or delete or interact mathematically with) the content of another participant's input by inputting their respective computer with the annotation. The tablet computer virtual common work page 37, as its name implies, is a "virtual" computer element. It does not physically exist but its functionalities are provided by the software and methods of the instant invention. In each of the preferred embodiments, the virtual common workpage functions as a virtual shared whiteboard defined by the common work page upon which math notation input from each of the computers in the respective network 19 is received and displayed on the common screen.

FIG. 24 shows the tablet computer virtual common workpage 37 formed in accordance with the instant invention operatively connected via the network 19 to the teacher tablet computer 10, the student tablet computer 12, the cloud 16 and the computer readable storage medium 84. The system is supplemented by the cloud 16 which supplies additional computing capability (if necessary) to enable the computer readable storage medium 84 to provide the programming steps to combine the screen 11 of the teacher computer 10 and the screen 11 of the student tablet computer 12. Programming steps supplied by the computer readable storage medium 84 enable the virtual common work page 37 to form the virtual coordinates 43 and enable the tablet computer virtual common work page 37 to read and understand the math notation input entered by the stylus 15 or the student's fingertip (not shown) on the networked computer screens 11. In addition, the tablet computer virtual common workpage 37 enables each participant's input to be displayed simultaneously on the screens 11 of the networked tablets. The virtual common workpage 37 enables any participant to annotate any mathematical representation of a math notation input.

The systems and methods of the instant invention which provide the functionality to record and play back the actual ink generated by the participants in a collaboration is extremely advantageous. As previously noted, during a class effort in which several student teams are formed to collaborate in the solution of a problem, it is very difficult for a teacher to observe on his or her networked computer each student performs, in sequence and in real-time, during their teams collaboration. Recording the performance of all participants as it occurs in sequence and in real-time and subsequently playing it back enables a teacher to observe and assess the CPS skills of each student participating in a collaboration. It is also important to note that the instant invention which reads and understands ink input enables the system to automatically compare collaboratively created handwritten math notation answers to correct answers stored and/or created by the system. By creating content in the form of math representations (i.e. computer generated figures and dynamic animations) and recording them for subsequent playback, the instant invention minimizes either the need for additional computer applications which are used to import figures into a collaboration or the need to painstakingly draw the figures during the collaboration, both of which take time and slow the flow of the collaboration. The virtual common work page 37 is transparent to the participants. It enables them to collaborate on the screens 11 of their respective tablets as if they were standing next to each other entering handwritten input on a common surface which enables the recording of the participants' input, including their spontaneously generated math representations, and playing it back so that their CPS skills can be subsequently reviewed and assessed by a teacher. What follows are two examples of how the first embodiment of the instant invention may be used by teachers and students to collaborate with each other via handwritten math notation to explore STEM principles and the system and the method by which the instant invention records and plays back their collaboration including their spontaneously generated math representations.

Figure 25:
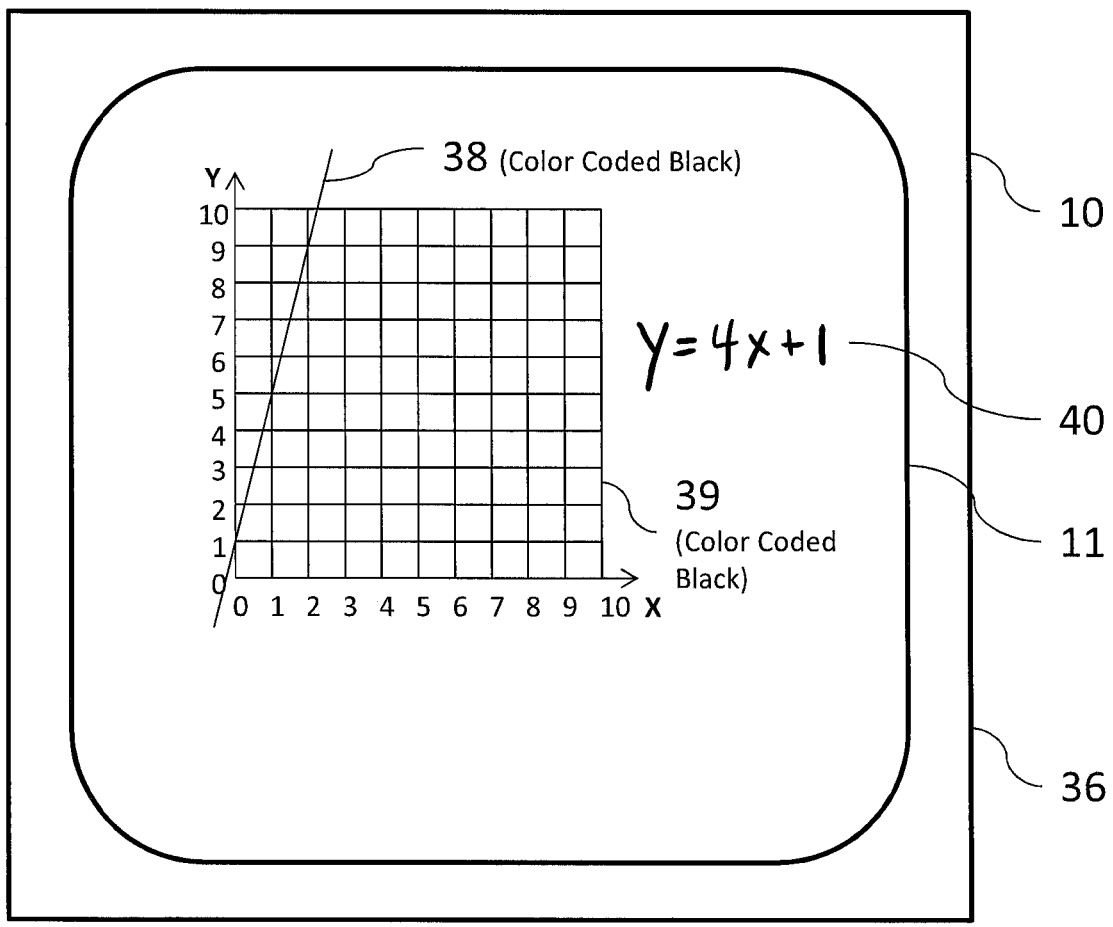
FIG. 25 is a simplified pictorial illustration of a GUI of a participant's tablet computer showing a graph and an equation which define an example of a spontaneously formed static math illustration.

FIG. 25 illustrates an example of a spontaneously generated math representation which relates to basic algebra. In this example, the teacher is presenting an algebra lesson covering the graphing of a straight line. The teacher is using a teacher's tablet 10 and the students are using student tablets 12. The tablet computers are of the type described above in FIG. 21 and FIG. 22 and are networked together as shown in FIG. 20. In this example, the teacher and the students are not collocated. As previously noted, the computer readable storage medium 84 provides the programming steps to combine each of their GUI screens to function as physical screens 11 displaying what is created on the virtual common workpage 37 (FIG. 24) which can be used by the teacher and the students simultaneously, as if they were working next to each other. Furthermore, as previously noted, the computer readable storage medium 84 of the present invention enables the virtual common work page 37 to recognize and understand handwritten math notation. The system recognizes the math notation which represents a math figure and plots the figure. Whatever is input on the GUI 11 of the teacher's computer 10 is displayed and retained thereon and is simultaneously displayed and retained on the GUIs 11 of the students' computers 12, and vice versa. The teacher and the students share written math notation via their respective GUI screens 11 as if they were standing side by side writing on a whiteboard located in front of them.

FIG. 25 shows the graph of the straight line 38 which has been spontaneously generated on the virtual common work page 37 (FIG. 24) by the teacher entering the equation of the line, y=4x+1 (reference No. 40), in handwritten math notation on the screen 11 of his/her computer 10 as the basis for a lesson collaboratively exploring the concepts of linear equations. The graph is prompted to appear on the screens 11 of the students' computers by the teacher using a stylus 15 or a fingertip (both not shown) to make either a gestural motion on the screen 11 of the teacher's tablet or by using the stylus or a fingertip to press a virtual button on its screen 11 (button not shown), thereby making the graph appear on the teacher screen 11 and the students' screens 11. The graph 38 is a spontaneously generated mathematical representation of the math notation, y=4x+1, reference No. 40. The spontaneously generated graph 38 is defined by digital input data and is recorded by the system of the instant invention as described above for subsequent review by the participants.

Figure 25A:
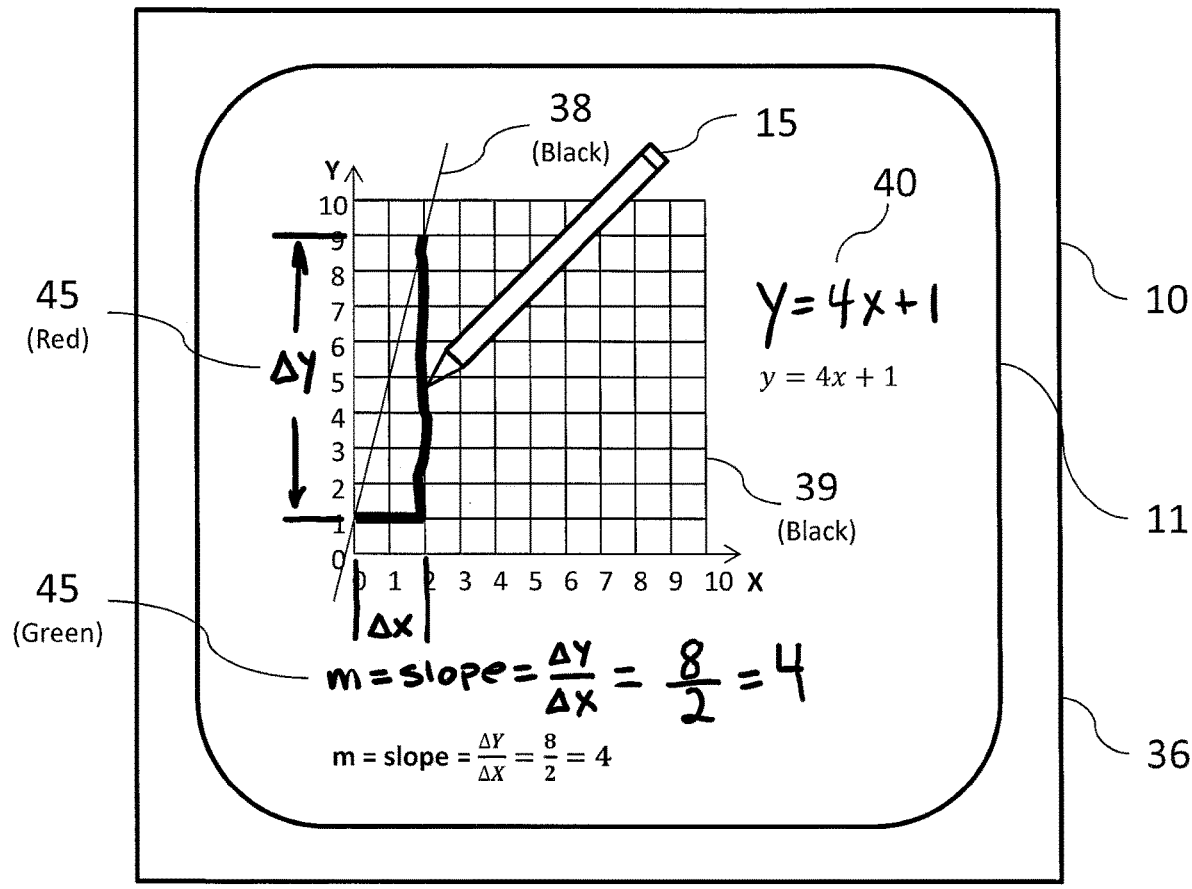
FIG. 25A is a simplified pictorial illustration of a GUI of a participant's tablet computer showing a graph and an equation which define an example of a spontaneously formed static math illustration and annotations formed in accordance with the present invention.

In FIG. 25, an x-y Cartesian coordinate system 39 is determined by the computer readable storage medium 84 that provides program steps which enable the system to understand the math notation input and create appropriate coordinates on which the math notation 40 is displayed. Also, as shown in FIG. 25A, the computer readable storage medium 84 provides the program steps enabling a participant to add annotations to the math representations generated on either his or her or another's respective screen 11. The computer readable storage medium 84 provides the program steps enabling the system to record the digital input data caused by each participants input, in actual sequence and real-time, as their interactive contribution to the collaborative solution to a STEM problem. The stored digital input data is a digital recording representing the ink generated during a collaboration. In addition, any gestures, prompts, or commands that generate ink and are used by any participant to create mathematical representations are also recorded. When prompted by either the teacher or the student, the system plays back the recording generated during either a portion of the collaboration or the entire collaboration at selected speeds: slow motion, actual speed, or fast forward.

Figure 26:
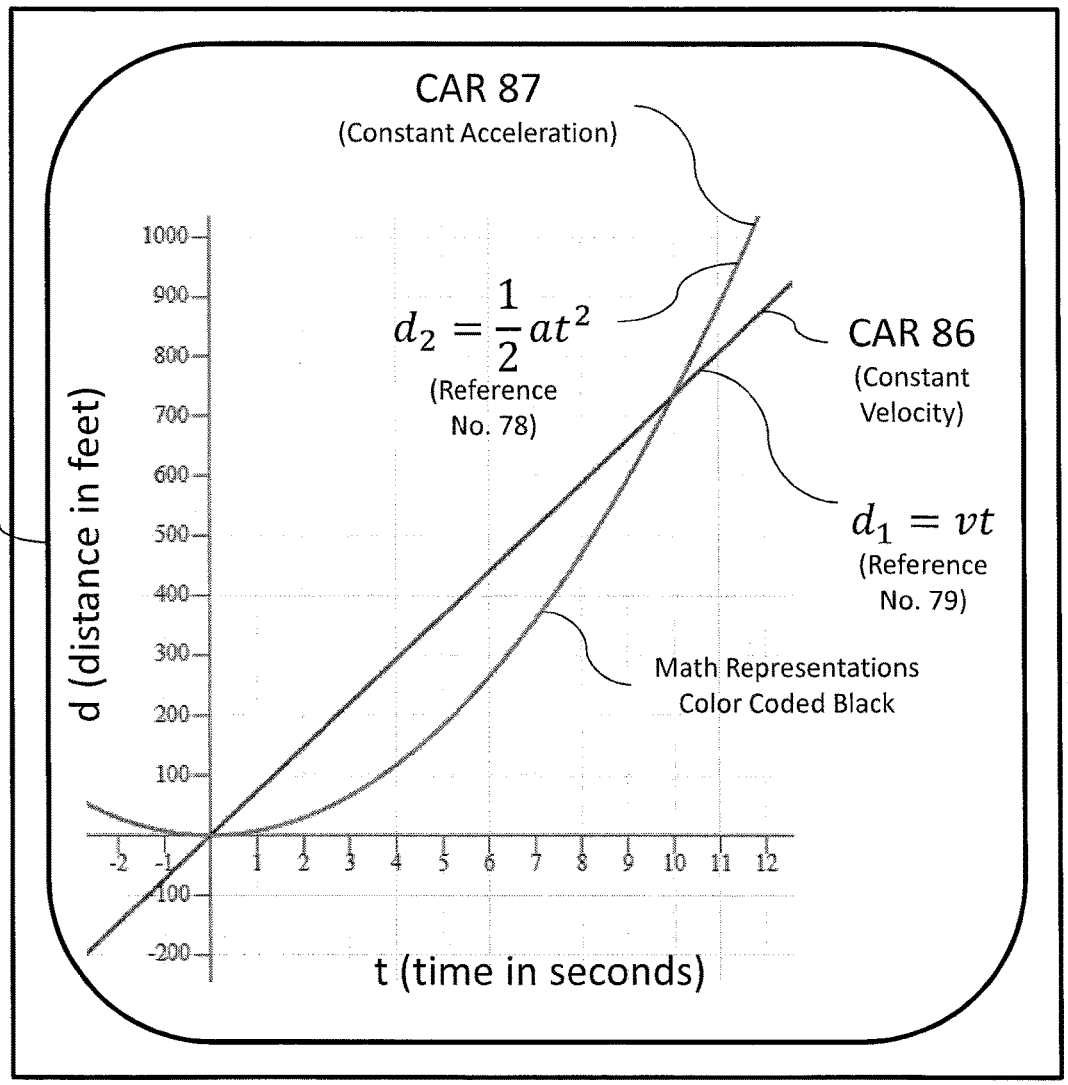
FIG. 26 is a simplified pictorial illustration of a GUI of a participant's tablet computer showing graphs and equations which define an example showing a spontaneously created dynamic math illustration in accordance with the present invention.
Figure 27:
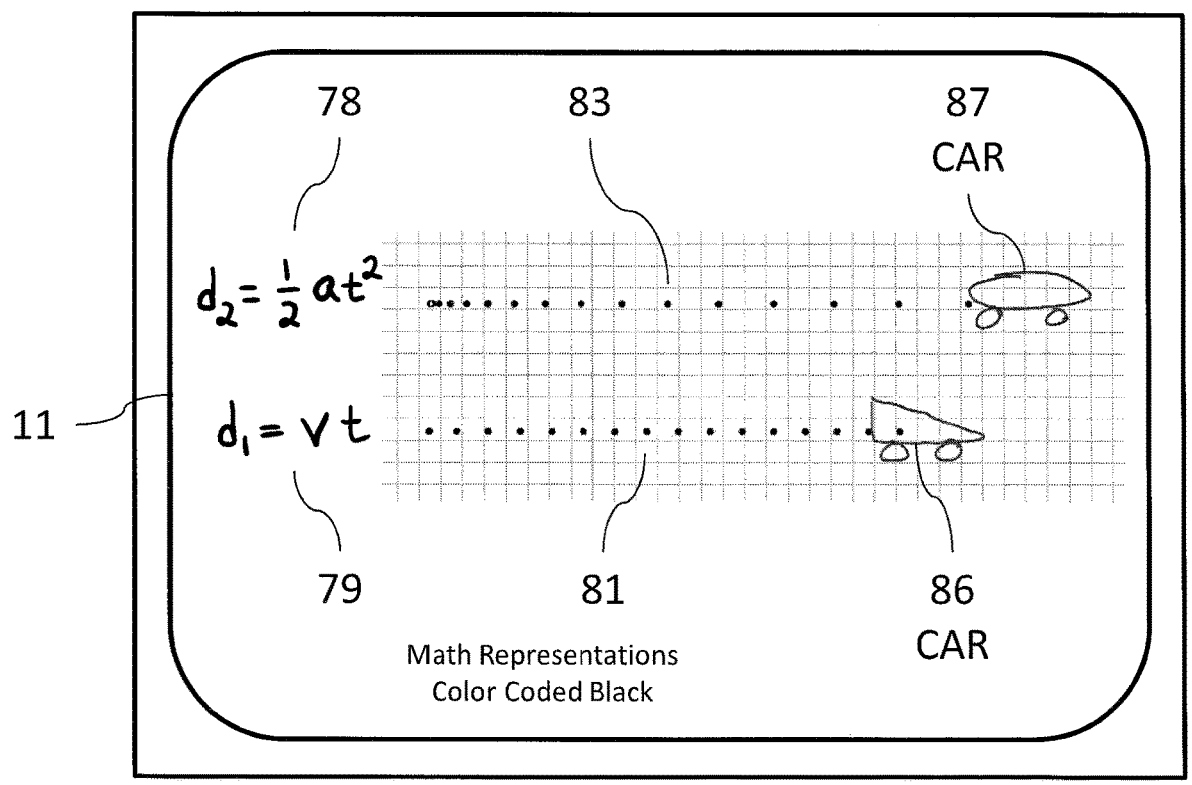
FIG. 27 is a simplified pictorial illustration of the GUI of a participant's tablet computer further defining the example of the spontaneously created animation formed in accordance with the present invention.

It is well known in the art that static math representations such as the representation described above, as shown in FIG. 25, and the dynamic math representation described below, as shown in FIG. 26 and FIG. 27, are important aspects of solutions to STEM problems used by both teachers and students. The recognition engine 18, the CAS 20, the annotation engine 34, and the computer readable storage medium 84 enable a user of the instant invention to create and record a spectrum of spontaneously generated math representations and annotations ranging in complexity from simple arithmetic to advanced calculus and may include, but are not limited to math figures, diagrams, charts and tables.

FIG. 25A exemplifies a means by which participants' inputs can be identified not only as the inputs are being made but also when their recording is subsequently played. In this example, the system assigns a screen identifier which relates each participant to a color code identifying his/her collaborative input. Methods for creating a screen identifier for each participant operating in a computer network are well known. For the sake of brevity, only one method is described herein. In this method, a participant logs in to the system and selects a color code provided by the system to represent the input received from his/her respective computer. For example, the teacher could select black, a first student red, and a second student green. In FIG. 25A, the spontaneously math representation input by the teacher is color coded black, the $\Delta y$ and $\Delta x$, entered by a first student is color coded red, and the math notation, $$m = \text{slope} = \frac{\Delta y}{\Delta x} = \frac{8}{2} = 4,$$

entered by a second student is color coded green. The identifier can also be used when recording the timing of the participant's collaborative effort. Each preferred embodiment described herein includes an input device. The screen identifiers enable the system to identify and record the time spent and the time sequence used by each participant while inputting the input device of their respective computer. Exact timing is provided by either a clock function embodied in most computers or by the computer readable storage medium 84 embodied in the instant invention.

Figure 25B:
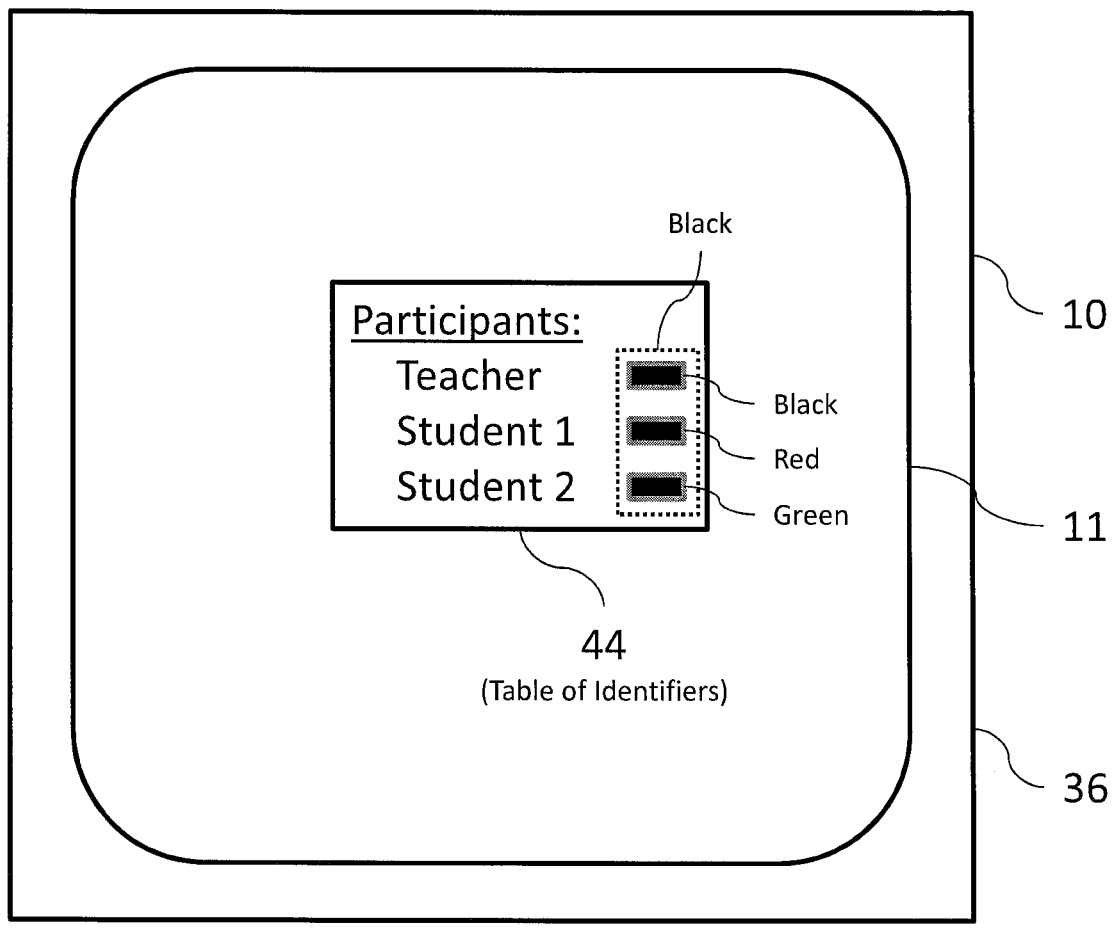
FIG. 25B is a simplified pictorial illustration of a GUI of a participant's computer showing a table of identifiers for distinguishing participants input.

FIG. 25B illustrates a table of identifiers 44 which enables teachers to not only identify a participant's input when played on a recording but also enables a teacher to monitor an individual's performance during the actual generation of a collaborative solution by observing the individual's color code. The use of the color codes shown in the table of identifiers 44 in FIG. 25B is illustrated in the example problems disclosed herein.

FIG. 26 and FIG. 27 are simplified illustrations of the GUIs 11 of the teacher's computer 10 and the student computers 12. These figures have been entered by a teacher and are color coded black conforming to the teacher color code in the tablet of identifiers 44 in FIG. 25B. The figures are being used in an example of a teacher-student collaboration exploring the STEM concepts of constant velocity and constant acceleration of moving objects by using a spontaneously generated animated math representation as shown in FIGS. 26 and 27. FIG. 26 and FIG. 27 may be shown simultaneously on the same screen 11. The system of the present invention displays the animation, in real-time, and records it for playback and review of the collaboration. FIGS. 26 and 27 reference hand-drawn cars, a first car and a second car, numbers 86 and 87, respectively. In this example, the first car 86 is travelling with a constant velocity and the second car 87 is travelling with a constant acceleration. The system displays, in real-time, on the screen 11 of the teacher computer 10 and the screen 11 of the student computer 12 the digital ink input made by the teacher to create a dynamic animation. For the first car 86, the handwritten math notation ink input by the teacher is $d_1 = vt$ (reference no. 79), the distance, $d_1$, measured in feet, that car 86 travels while going at a constant velocity of 50 miles per hour. For the second car 87, the handwritten math ink input by the teacher is $d_2 = 2 at^2$ (reference No. 78), the distance, $d_2$, measured in feet, that car 87 travels while accelerating at a constant 10 miles per hour per second. The system understands the math notations, automatically graphs the equations as shown in FIG. 26, associates the equations with the cars 86 and 87 and makes the static math representation shown in FIG. 26 come alive. FIG. 27 shows the two cars actually move across the screens 11 of the teacher computer 10 and student computer 12. The first car 86 moves with a constant velocity and the second car 87 moves with a constant acceleration. The teacher created the animation of the two cars by sketching them and by linking them to their equations of motion 79 and 78. The dotted line 81 and the dotted line 83 define scaled distances the respective cars travel in the same time frame.

In the present invention, the computer readable storage medium 84 contains program instructions for recording the digital data created by ink input. These data are used to not only spontaneously display math representations, including animations as they are being created, but also for recording math representations so that a teacher can subsequently assess his or her students' understanding and use of spontaneously created math representations in a collaboration. The instant invention enables collaboration participants to change each other's spontaneously generated math representations. For example, a participant can change the animated motion of the first car 86 or the second car 87 by changing either its velocity or its acceleration.

In the first embodiment of the instant invention, the at least one teacher tablet computer 10 and the at least one student tablet computer 12 are operatively connected to the at least one computer readable storage medium 84 (FIG. 24). The at least one computer readable storage medium 84 contains program instructions for implementing an application of the system that includes one or more program instructions for performing several steps. The steps include: (a) receiving at least one STEM question entered by the respective teacher in math notation on the touch sensitive screen 11 of the at least one teacher tablet computer to provide a received handwritten question; (b) displaying the received input of step (a) on the touch sensitive screen 11 of the at least one teacher tablet 10 computer and the at least one student tablet computer 12; (c) receiving at least one handwritten student response from the at least one student tablet computer 12 via the communications network 19 to provide a received handwritten student response, the at least one student response being input by the respective student handwriting the at least one student response in math notation on the touch sensitive screen 11 of the at least one student tablet computer 12; (d) displaying the received handwritten student response of step (c) on the touch sensitive screen 11 of the at least one teacher tablet computer 10 and the at least one student tablet computer 12; (e) enabling the system to read and understand the handwritten math notation received by the at least one teacher tablet computer 10 and to read and understand the handwritten math notation received by the at least one student tablet computer 12; (f) causing the system, when prompted by either the respective teacher or the respective student, to spontaneously generate mathematical representations of the handwritten math notation received by the system and causing the system to enable the at least one respective teacher and the respective student to annotate their own and each other's input including their spontaneously generated mathematical representations thereby enabling the respective teacher and the respective student to collaborate using handwritten math notation on the at least one teacher tablet computer 10 and the at least one student tablet computer 12 to create the collaborative solution to the at least one STEM question, the collaborative solution being displayed on the screen 11 of the at least one teacher tablet computer 10 and the at least one student tablet computer 12; (g) repeating steps (c) through (f) until the collaborative solution is achieved; and (h) causing the at least one computer readable storage medium 84, when prompted by the respective teacher or the respective student, to record the digital input data created by the handwritten input of the respective teacher and the respective student, the respective teacher or the respective student playing back the recording to assess the collaborative solution of the STEM problem.

Figure 28:
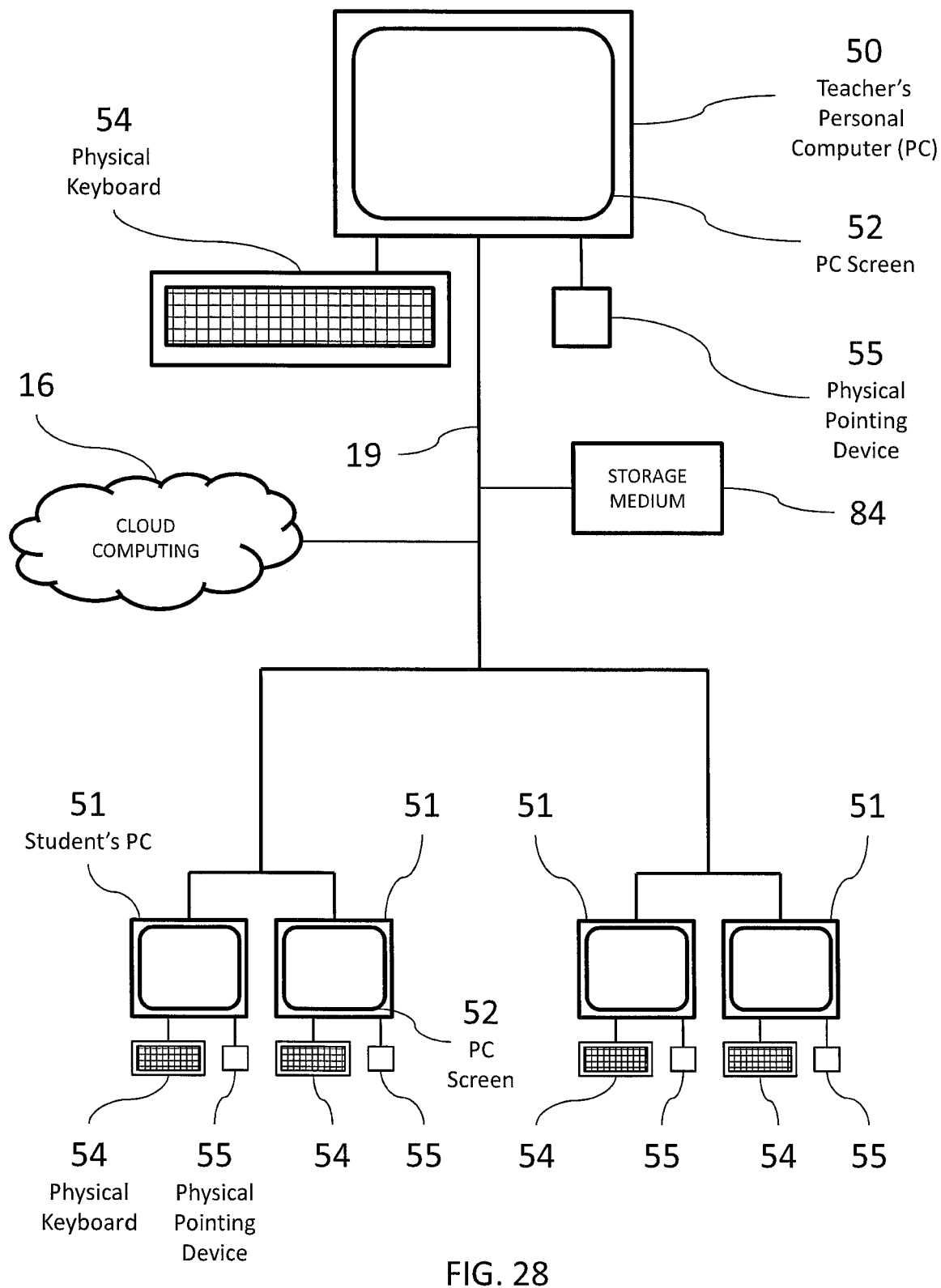
FIG. 28 is a block diagram of yet another embodiment of the computerized teaching system formed in accordance with the present invention having a network of keyboard and mouse enabled personal computers configured for participants collaborating in teams.

FIG. 28 shows a block diagram of a second embodiment of the instant invention comprising a system of networked keyboard and mouse enabled personal computers used for the teaching, practicing, recording and playing back of STEM problems. The system includes a teacher's personal computer 50 and student's personal computer 51. In this disclosure, a personal computer is also referred to as a PC and is exemplified as having a physical keyboard 54 and a physical mouse or pointing device 55. A physical pointing device 55 is either a separate moveable devices that a participant moves on a mouse pad (pad not shown) or a pointing device built into the computer housing that a participant manipulates via fingertip. The personal computers 50 and 51 comprise essentially the same computer elements as shown in FIG. 21 and FIG. 22 except for the elements which relate to the participants' input into the systems. In this embodiment, the personal computers do not employ the touch sensitive screen 11 and the stylus 15, that are included in the first embodiment to input handwritten notation. Rather, the PCs 50 and 51 employ the physical keyboard 54 and the physical pointing device 55 to receive input via a participant typing on the keys of the physical keyboard 54 and manipulating the physical pointing device 55. To avoid needless repetition, the descriptions of the PC elements in FIG. 28 which are counterparts of the tablet elements that have already been described in the disclosure are not described again in the disclosure of the second embodiment.

Figure 29:
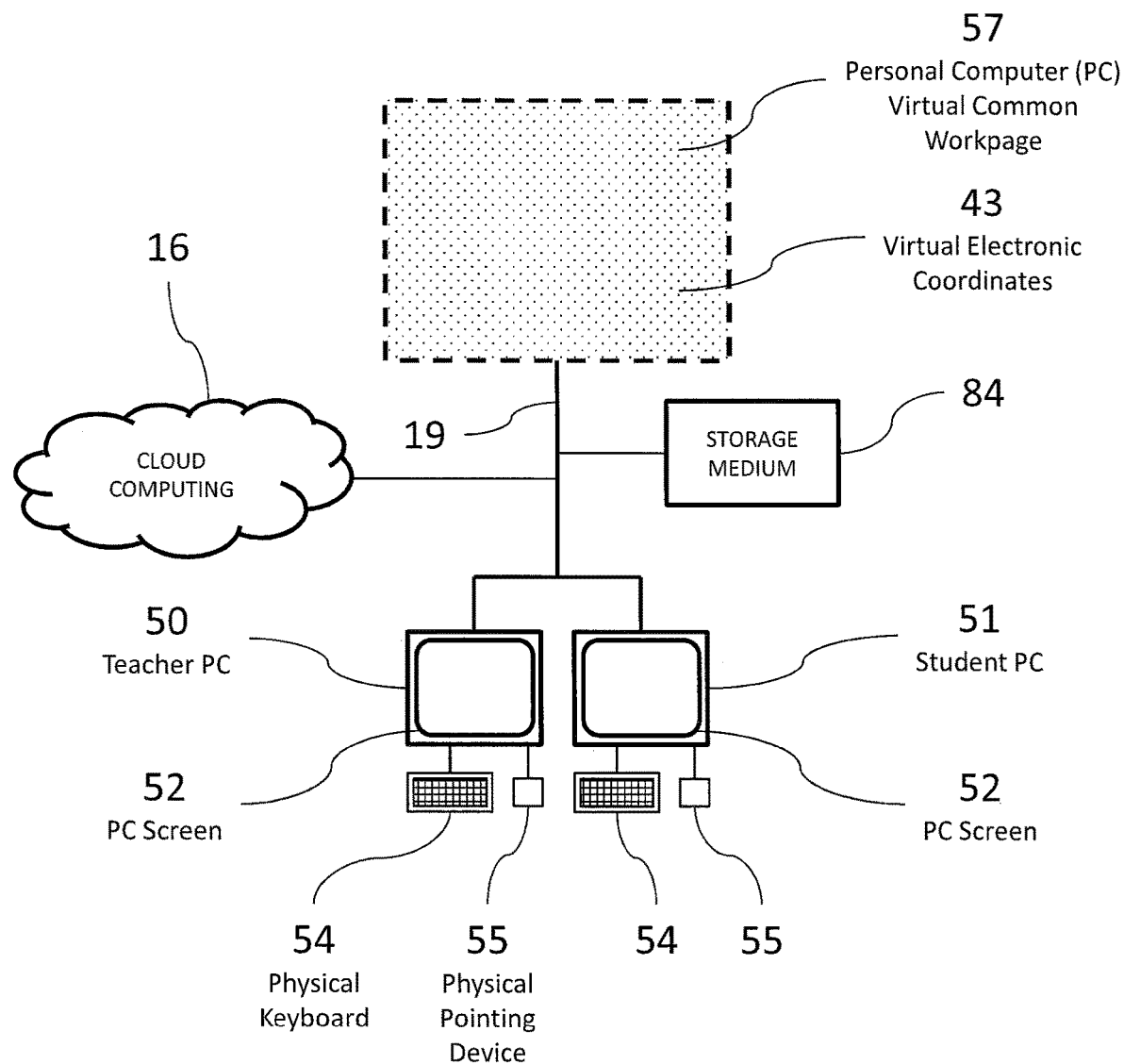
FIG. 29 is a block diagram of the embodiment of the computerized teaching system formed in accordance with the present invention and shown in FIG. 28, illustrating a virtual common work page defined by personal computers having keyboard and mouse input.

FIG. 29 shows a personal computer virtual common workpage 57 formed in accordance with the instant invention being operatively connected via the network 19 to the teacher PC 50, the student PC 51, the cloud 16 and the computer readable storage medium 84. The system is supplemented by the cloud 16 which supplies additional computing capability (if necessary) to enable the computer readable storage medium 84 to provide the programming steps to transform the screen 52 on the teacher PC 50 and the screen 52 of the student PC 51 into a personal computer (PC) virtual common workpage 57. The PC virtual common work page 57 is enabled by the computer readable storage medium 84 to read and understand the input entered by the participant typing on the keys of the physical keyboard 54 and manipulating the physical pointing device 55. The PC virtual common work page 57 provides virtual electronic coordinates 43 upon which annotations and teacher and student input are displayed. The PC virtual common workspace 57 enables each participant's input to be viewed simultaneously on the screens 52 and enables the input to be annotated by any participant via input on their respective physical PC keyboard 54 and physical PC mouse 55. Furthermore, the PC common virtual workpage 57 enables any participant to create a mathematical representation of a math notation input. For example, a graph of a line represented by a math notation input on the keyboard 54 by a participant is created by the system on the PC common virtual workpage 57 and, when prompted, causes it to be displayed on all the networked PCs. The computer readable storage medium 84 provides the program steps enabling the participant to annotate the math representations generated on his or her respective PC screen 52. The computer readable storage medium 84 also provides the program steps enabling the system to record and store each participant's input, in real-time, and in the sequence of interaction with other's input, thereby recording the participant's contribution to the collaborative solution to a STEM problem. The stored input data is a digital recording of interactivity of participants generated during the collaboration. When prompted by either the teacher or the student, the system plays back the input entered during either a portion of the collaboration or the entire collaboration at selected speeds from slow motion to fast forward.

As previously noted, embodiments of the instant invention having the functionality to record and play back the actual input of participants in a collaboration is extremely advantageous. During a classroom effort in which several student teams are formed to collaborate in the solution of a problem, it is very difficult for a teacher to evaluate how each student performs, in sequence and in real-time, as a team member during their team's collaboration. Recording the input of all participants in sequence as it occurs in real-time and subsequently playing it back enables a teacher to assess the CPS skills of each student participating in a collaboration. In the second embodiment, digital data representing the collaboration are created by participant's key strokes and pointing device manipulation. The instant invention records the timing and sequence of each participant's input. Also, as previously noted, by creating content in the form of math representations (i.e. computer generated figures and dynamic animations) and recording them for subsequent playback, the instant invention minimizes either the need for additional applications which are used to import figures into a collaboration or the need to painstakingly draw the figures during the collaboration, both of which take time and slow the flow of the collaboration. The PC virtual work page 57 is transparent to the participants. The virtual page 57 enables them to collaborate via input on their respective PC computers as if they were standing next to each other entering input on a system which enables the recording and displaying of the participants' input including their spontaneously generated math representations. The system plays back each participant's input so that each participant's CPS skills or individual STEM problem solving skills can be asynchronously evaluated by the teacher.

In the second embodiment of the instant invention, the at least one teacher personal computer 50 and the at least one student personal computer 51 are operatively connected to the at least one computer readable storage medium 84 (FIG. 29). The at least one computer readable storage medium 84 contains program instructions for implementing an application of the system that includes one or more program instructions for performing several steps. The steps include: (a) receiving at least one STEM question input by the teacher to provide a received question; (b) displaying the received input of step (a) on the screen 52 of the at least one teacher personal computer 50 and on the screen 52 of the at least one student personal computer 51; (c) receiving at least one student response from the at least one student personal computer 51 via the communications network 19 to provide a received student response, the at least one student response being input by the student in math notation on the physical keyboard 54 and physical pointing device 55 of the at least one student personal computer 50; (d) displaying the received student response of step (c) on the screen of the at least one teacher personal computer 50 and the at least one student personal computer 51; (e) enabling the system to read and understand the math notation received by the at least one teacher personal computer 50 and to read and understand the math notation received by the at least one student personal computer 51; (f) causing the system, when prompted by either the respective teacher or the at least one respective student, to spontaneously generate mathematical representations of the math notation received by the system and causing the system to enable the at least one respective teacher and the at least one respective student to annotate their own and each other's input including their spontaneously generated mathematical representations thereby enabling the respective teacher and the respective student to collaborate using math notation input on the physical keyboard 54 and on the physical pointing device 55 of the at least one teacher personal computer 50 and the at least one student personal computer 51 to create a collaborative solution to the at least one STEM question, the collaborative solution to the at least one STEM question being displayed on the screen 52 of the at least one teacher personal computer 50 and the screen 52 of at least one student personal computer 51; and (g) repeating steps (c) through (f) until a collaborative solution is achieved. When prompted by the respective teacher or the respective student, the system records and plays back the collaborative solution to the STEM problem on the teacher personal computer 50 and the student personal computer 51.

Figure 30:
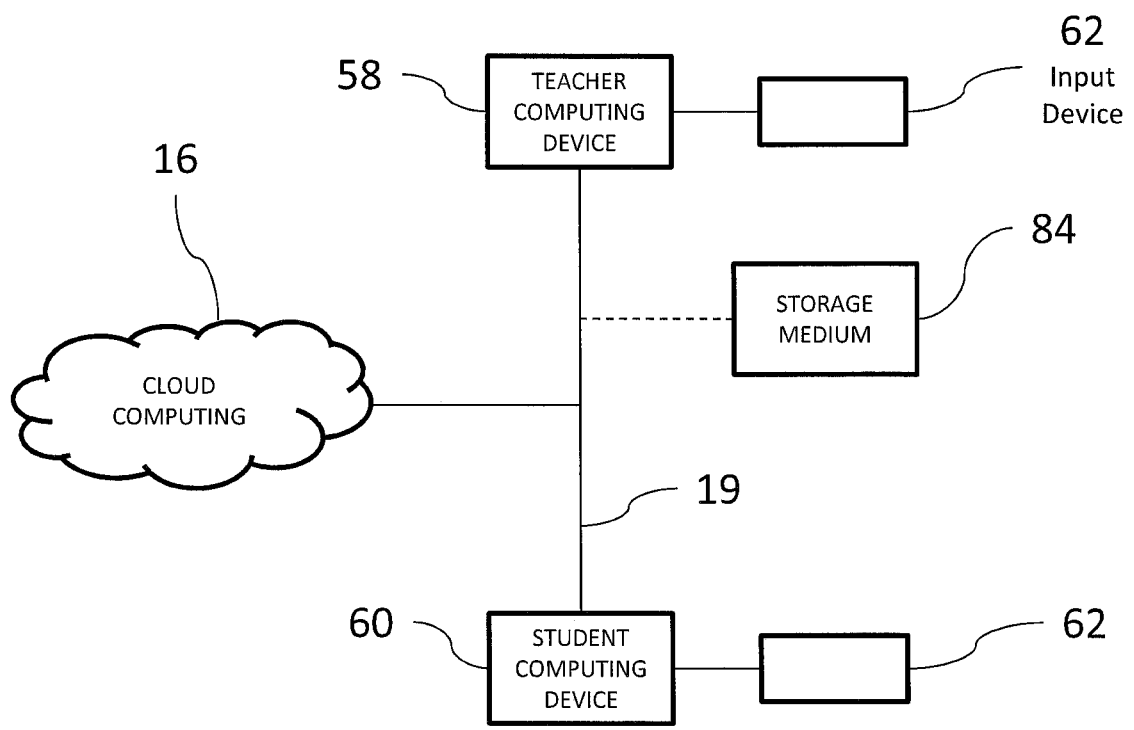
FIG. 30 is a block diagram of still another embodiment of the computerized system formed in accordance with the present invention having a teacher's computing device and a student's computing device for recording the work effort of an individual student solving a STEM problem.
Figure 31:
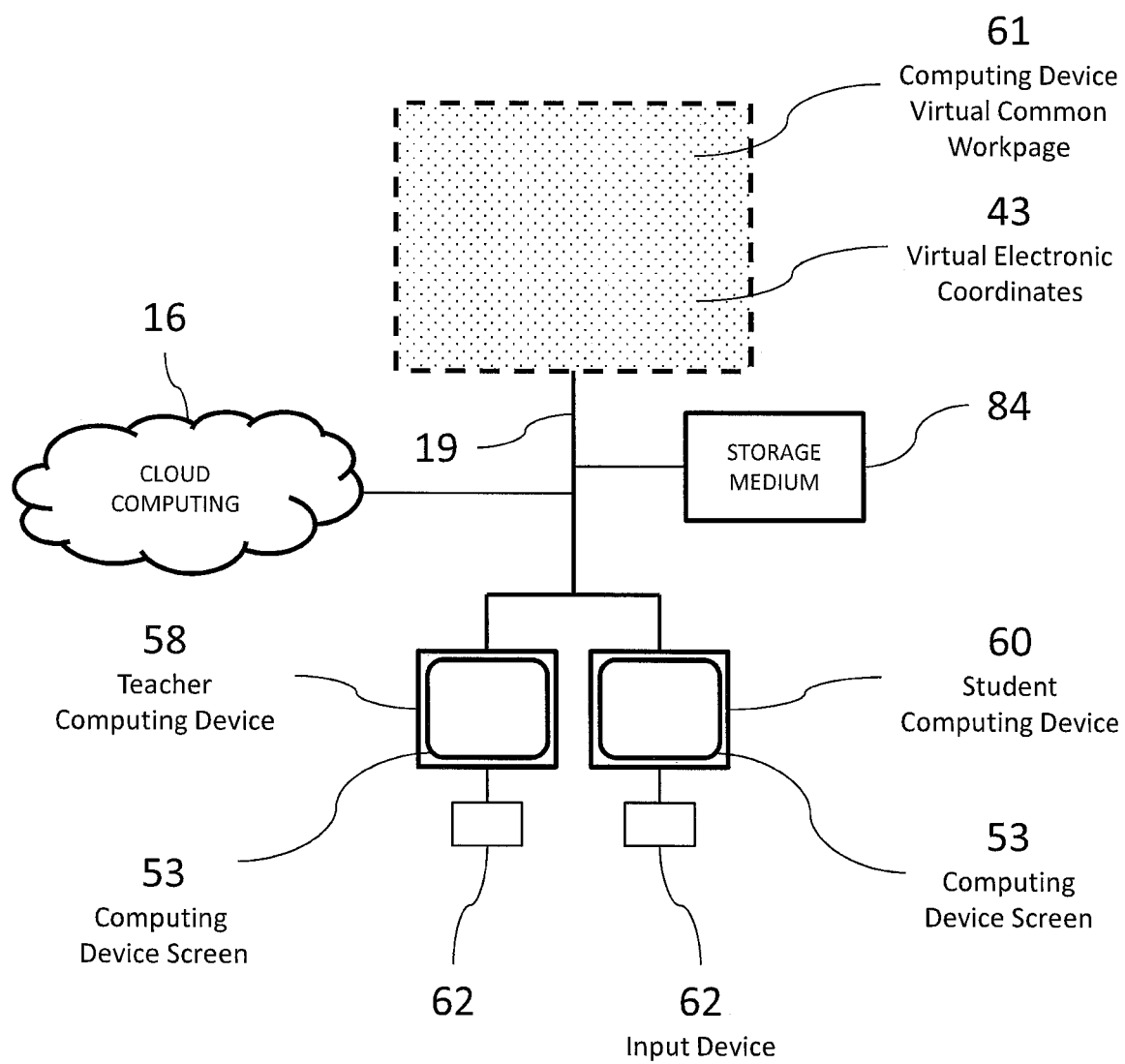
FIG. 31 is a block diagram of a computerized teaching system formed in accordance with the present invention showing a virtual common work page defined by a teacher computing device and a student computing device.

FIG. 30 and FIG. 31 show a third embodiment of the present invention. As previously disclosed, the first and second embodiments enable the recording of the collaborative effort of each student working in a team of students in a classroom environment to solve a STEM problem. The collaborative solutions are recorded so that a teacher can subsequently observe and assess the collaborative problem solving skills of each student in his/her class as they work simultaneously in teams to solve problems. In the third embodiment, the description of the systems and methods of the present invention includes illustrating its functionality to record the efforts of an individual student working alone to solve STEM problems so that the teacher can assess a student's individual problem solving skills including the use of spontaneously generated math representations.

As shown in FIG. 30, the third embodiment comprises a teacher's computing device 58 and a student's computing device 60, each being operably connected via the network 19 to the cloud 16 and the computer readable storage medium 84. Each computing device 58 and 60 is operably connected to an input device 62 being manipulated by users of the system to provide digital input data to the system. As shown in FIG. 31, the third embodiment also includes a computing device virtual common work page 61, formed by programming steps provided by the computer-readable storage medium 84. The programming steps transform the screens 53 of the teacher's computing device 58 and the student's computing device 60 into a computing device common work page 61 upon which the teacher can enter STEM problems to be asynchronously viewed and solved by students. The computing device common virtual work page 61 embodied in the present invention enables computer systems which comprise computing devices that include an input device 62 for entering digital input data and a screen 53 for displaying it to record and play back solutions to STEM problems which include spontaneously generated static and dynamic animations. The computer readable storage medium 84 provides programming steps which enable teachers to present STEM problems which include either static math representations such as the example shown in FIG. 25 or dynamic math representations such as the example shown in FIG. 26 and FIG. 27. The computer readable storage medium 84 provides program steps enabling students to create answers to STEM problems wherein the answers include static and dynamic math representations including annotations as noted above. The computing devices virtual common work page 61 provides virtual electronic coordinates 43 which enable annotations and displaying the teacher and student input. The programmable computer readable storage medium 84 provides the program steps enabling the teacher to either present one STEM problem at a time or a series of STEM problems which have been previously recorded or automatically generated and may be presented on the student computing device 60 automatically.

There currently exists a broad range of multi-purpose computing devices that could be equipped with the instant invention enabling users to individually or collaboratively solve, record, and replay solutions to STEM questions. For example, the teacher's computing device 58 and the student's computing device 60 disclosed in the third embodiment could include, but not be limited to, a desktop computer, a server computer, a laptop or netbook computer, a tablet or phablet device, a cellular or other type of wireless smartphone, an interactive whiteboard or display, a notepad computer, a mobile station, a head-mounted display, an entertainment appliance, a set-top box communicatively coupled to a display device, a game console, an Internet of Things (IoT) device, objects or things with software, firmware, and/or hardware to allow communication with other devices, a television or other display device, etc. The computing devices 58 and 60 may range from a full resource devices with substantial memory and processor resources (e.g. personal computers, game consoles) to a low-resource devices with limited memory and/or processing resources (e.g. traditional set-top boxes, hand-held game consoles). The computing devices 58 and 61 could also include voice activated functionality wherein analog voice input via a microphone is digitized to provide digital input to the system of the present invention. The system and method of the instant invention disclosed in this third embodiment include substantially the same computer components disclosed in the first and second embodiments (FIG. 21 and FIG. 22). To avoid needless repetition, the descriptions of the computer elements disclosed in FIG. 30 and FIG. 31 which are counterparts of the computer elements listed in FIG. 21 and FIG. 22 are not described again in the disclosure of the third embodiment.

Figure 32:
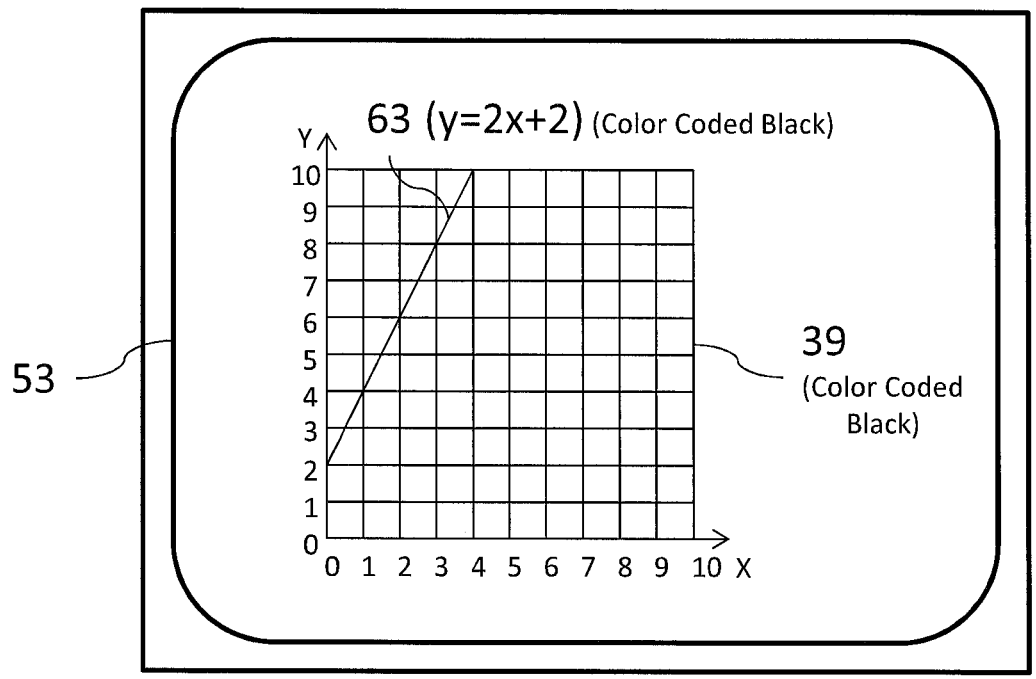
FIG. 32 is a simplified pictorial illustration of the GUI of a participant's computer showing a graph and equation to illustrate an example of a spontaneously formed math representation in accordance with the present invention.
Figure 33:
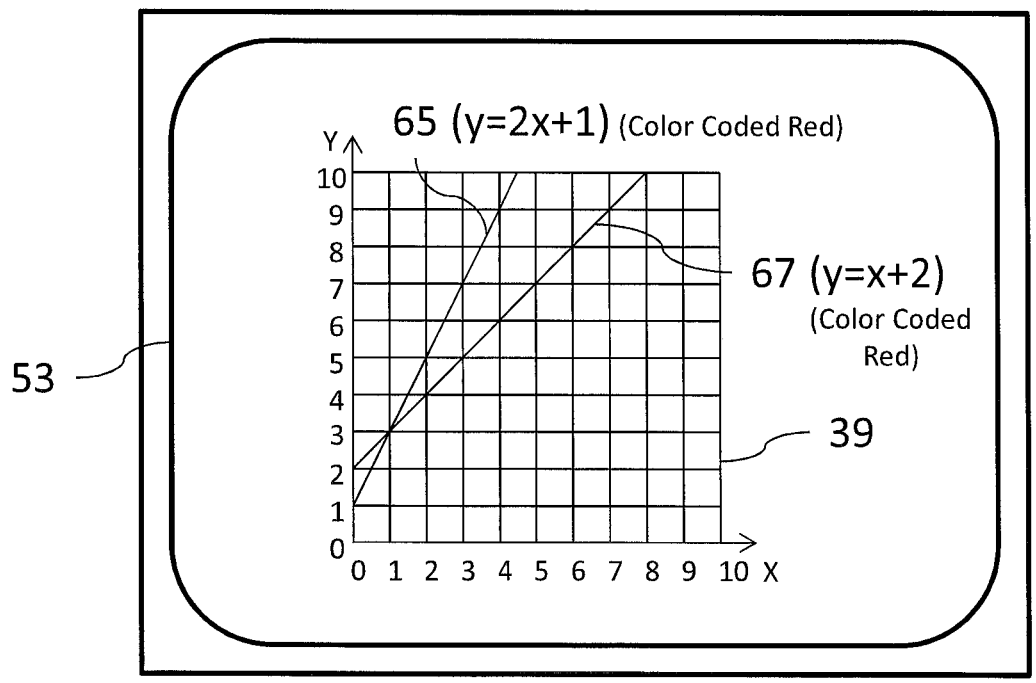
FIG. 33 is a simplified pictorial illustration of the GUI of a participant's computing device showing a solution to a STEM problem in accordance with the present invention.

FIG. 32 and FIG. 33 are simplified illustrations of the display screens 53 of the teacher's and student's computing devices 58 and 60 (FIG. 31) showing an example of a STEM problem presented to a student which includes a teacher's spontaneously generated math representation of a straight line, reference No. 63. As previously noted, the Cartesian coordinates 39 displayed in the figures are created by the computer-readable storage medium 84 as part of the spontaneously generated math representations 63. The teacher's entry is color coded black. FIG. 33 shows the student's solution which includes the student creating two spontaneously generated math representations, straight line reference No. 65 and straight line reference No. 67. The student's entry is color coded red. In this example, the teacher instructs the student to graph a line having one half the slope of the line $y=2x+2$ (reference No. 63) yet still have the same y intercept. In FIG. 33, the student responds with a spontaneously generated graph of an incorrect answer by graphing the line of the equation $y=2x+1$ (reference No. 65) on the screen of his/her computer. Upon seeing the line, the student realizes he/she has entered an incorrect formula. The slope of the line has remained the same but the y intercept has been reduced by one half from 2 to 1. The student enters the correct equation, y=x+2 (reference No. 67) as shown in FIG. 33, and prompts it to be spontaneously generated also as shown in FIG. 33. The student observes that the slope of the line has been reduced by one half and the line has the same y intercept. The student confirmed that his/her answer is correct by using a spontaneously generated math representation. The student's inputs shown in FIG. 33 are directed by the computer readable storage medium 84 to be stored as digital input data in the computer readable storage medium 84. When prompted, these data are replayed on the teacher's and the student's computer, including the spontaneously generated graphs, thereby enabling the teacher to asynchronously work with the student to enhance the student's individual problem solving skills.

In the third embodiment of the instant invention, the at least one teacher computing device 58 and the at least one student computing device 60 are operatively connected to the at least one computer readable storage medium 84 (FIG. 31). The at least one computer readable storage medium 84 contains program instructions for implementing an application of the system that includes one or more program instructions for performing several steps. The steps include: (a) receiving at least one STEM question input by the teacher in math notation on the input device 62 of the at least one teacher computing device 58 to provide a received question; (b) displaying the received input of step (a) on the screen 53 of the at least one teacher computing device 58 and the at least one student computing device 60; (c) receiving at least one student response from the at least one student computing device 60 to provide a received student response, the at least one student response being input by the student inputting the at least one student response in math notation on the input device 62 of the at least one student computing device 60; (d) displaying the received student response of step (c) on the screen 53 of the at least one teacher computing device 58 and the at least one student computing device 60; (e) enabling the system to read and understand the math notation received by the at the at least one teacher computing device 58 and to read and understand the math notation received by the at least one student computing device 60; (f) causing the system, when prompted by either the respective teacher or the respective student, to spontaneously generate representations of the math notation received by the system and causing the system to enable the respective teacher and the at least one respective student to annotate their own and each other's input including their spontaneously generated mathematical representations thereby enabling the at least one student to create a solution to the at least one STEM question, the solution to the at least one STEM question being displayed on the screen 53 of the at least one teacher computing device 58 and the at least one student computing device 60; and (g) repeating steps (c) through (f) until the student achieves a solution to the STEM problem.

When prompted by the respective teacher or the respective student, the system records and plays back the student's solution to the STEM question on the teacher computing device 58 and the student computing device 60.

As previously noted, the examples described herein relate to teachers and students working in educational settings. It is to be understood that the present invention can be used in a broad range of environments wherein participants use multi-purpose computing devices to either collaboratively or individually solve STEM problems and record their collaborations. Unlike the prior art, the present invention enables participants to interact via math notation input as if they were writing on the same virtual workpage upon which each participant's math notation input is understood and mathematically interacts with other participants' math notation. The STEM questions described in this disclosure exemplify the problem solving functionalities taught in each of the embodiments of the present invention.

Furthermore, as previously noted, although teachers' computer and students' computers' are disclosed herein, it should be understood that the computerized system of the present invention is usable by persons other than teachers and students. For example, the non-teacher computers and non-student computers being operable by engineers collaborating on solving a STEM problem. Furthermore, the computers disclosed in the instant invention could include Interactive Whiteboards driven by personal computers.

FIGS. 34A through 34F depict the replay of a collaboration between participants. In the figures, a progress bar 90, playback controls 92, and a timestamp 94 are displayed. The progress bar 90 is similar to the progress bar that is displayed during the playback of a video (e.g. a YouTube™ video). In this example, the left end of the progress bar represents the start time of the playback (i.e. time zero) and the right end of the progress bar represents the end time of the playback. As the playback proceeds, the circle 96 in the progress bar moves from left to right. The playback controls 92 enable a participant to play back a recording of a collaboration. The controls in this example are similar to those which are typically available on a VCR including play, pause, fast forward, and rewind. A timestamp 94 displays the time at a specific instant during the collaboration.

Figure 34A:
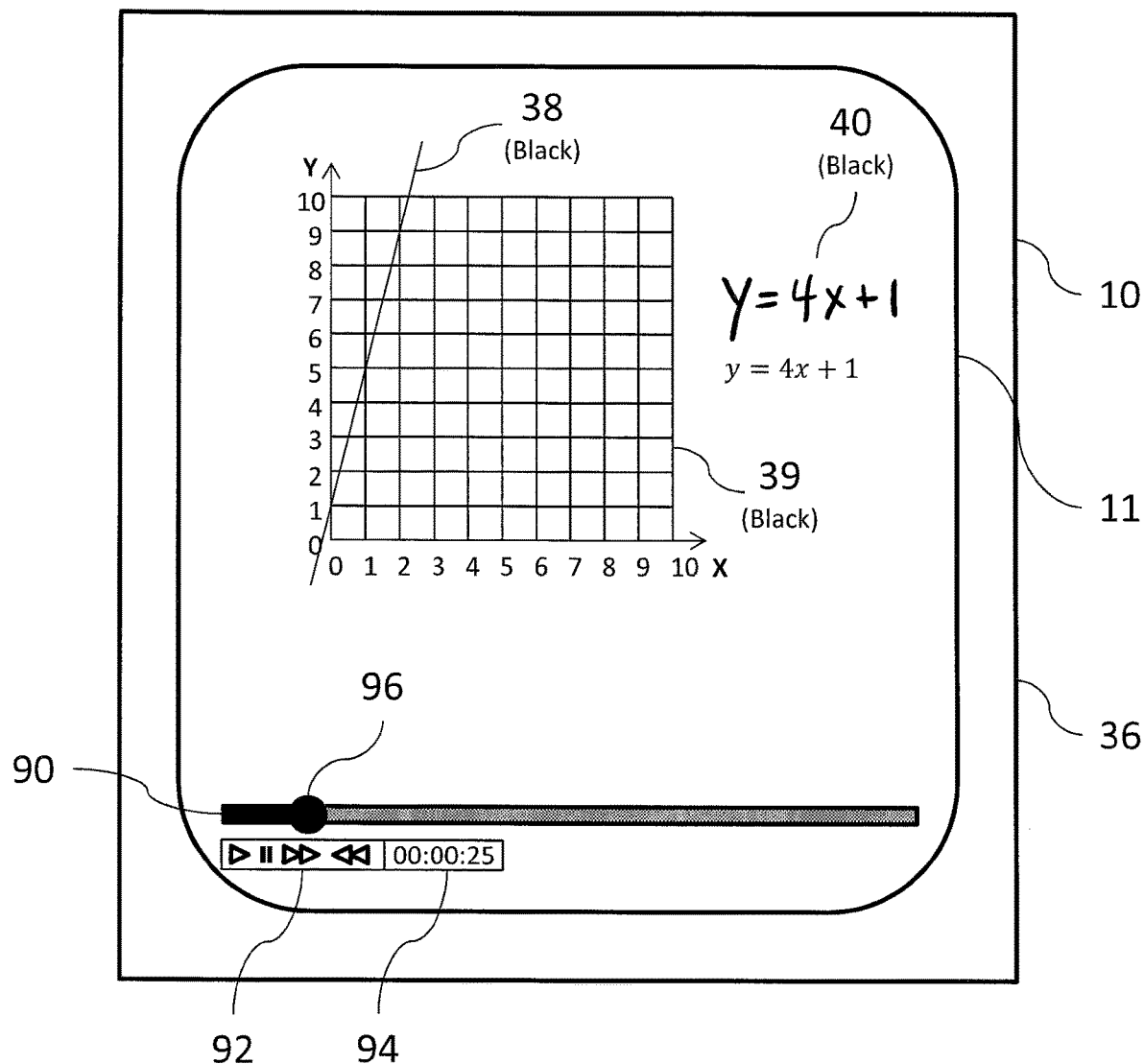
FIGS. 34A-34F are pictorial illustrations of a teacher's (or student's) display of his or her computer, depicting in sequence the replaying of a collaboration among a teacher and students in solving a mathematical problem.

FIG. 34A depicts the point in the collaboration just after the teacher has created the problem, what is the slope of the line y=4x+1? Similar to FIG. 25, it shows the graph of the straight line 38 which has been spontaneously generated on the virtual common work page 37 (FIG. 24) by the teacher entering the equation of the line, y=4x+1 (reference No. 40), in handwritten math notation on the screen 11 of his/her computer 10 as the basis for a lesson collaboratively exploring the concepts of linear equations. The timestamp 94 displays that 25 seconds have elapsed since the collaboration started, or, the recording was started. The digitizer 36 of the system of the present invention displays a typed re-creation of the digital ink notation on the display screen 11 underneath or in close proximity to the displayed handwritten mathematical equation. Also, the teacher's entry shown in FIG. 25 is played back in a particular color, for example black, such that it appears on the teacher's display screen 11 so that the teacher may easily identify his or her contribution to the collaboration when the collaboration is recorded and played back, as shown in FIG. 34A.

Figure 34B:
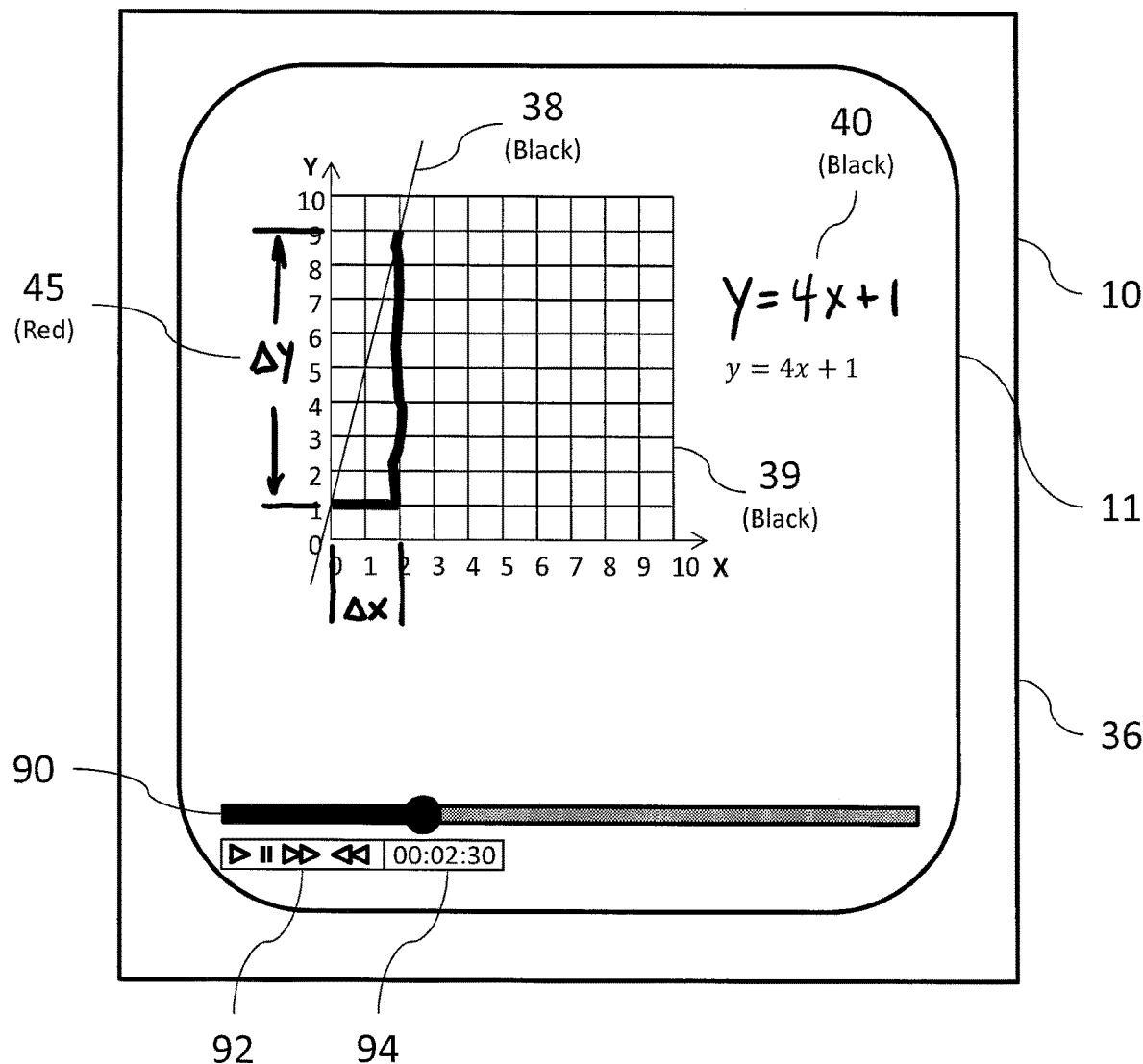

FIG. 34B depicts the point in the collaboration just after a first student has contributed to the solution. The timestamp 94 displays that 2 minutes and 30 seconds have elapsed since the collaboration started, or, the recording was started. The student's handwritten contribution, shown in red, by a digital ink notation 45, are the lines added to the graph and the "Δy" notation. As mentioned previously, each participant's contribution to the collaboration is shown in a different color so that the teacher may easily distinguish one student's contribution from another student's contribution when the collaboration is played back for the teacher's review.

Figure 34C:
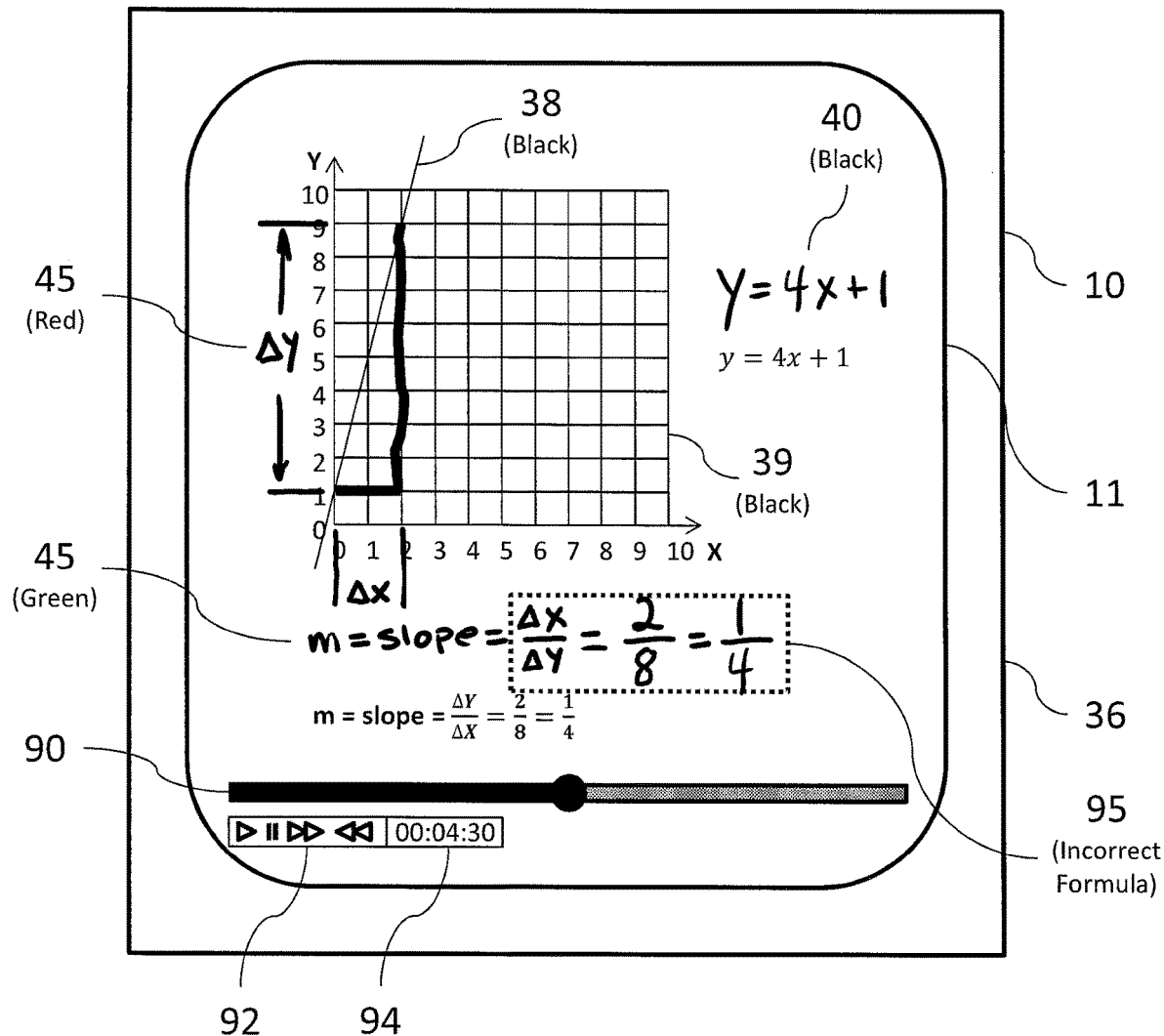

FIG. 34C depicts the point in the collaboration just after a second student has contributed to the solution. The second student has entered an incorrect mathematical formula 95 for the solution. The formula 95 is shown in green, for example, to distinguish the second student's entry and contribution to the collaboration from those of the teacher and other students. The timestamp 94 displays that 4 minutes and 30 seconds have elapsed since the collaboration started, or, the recording was started.

Figure 34D:
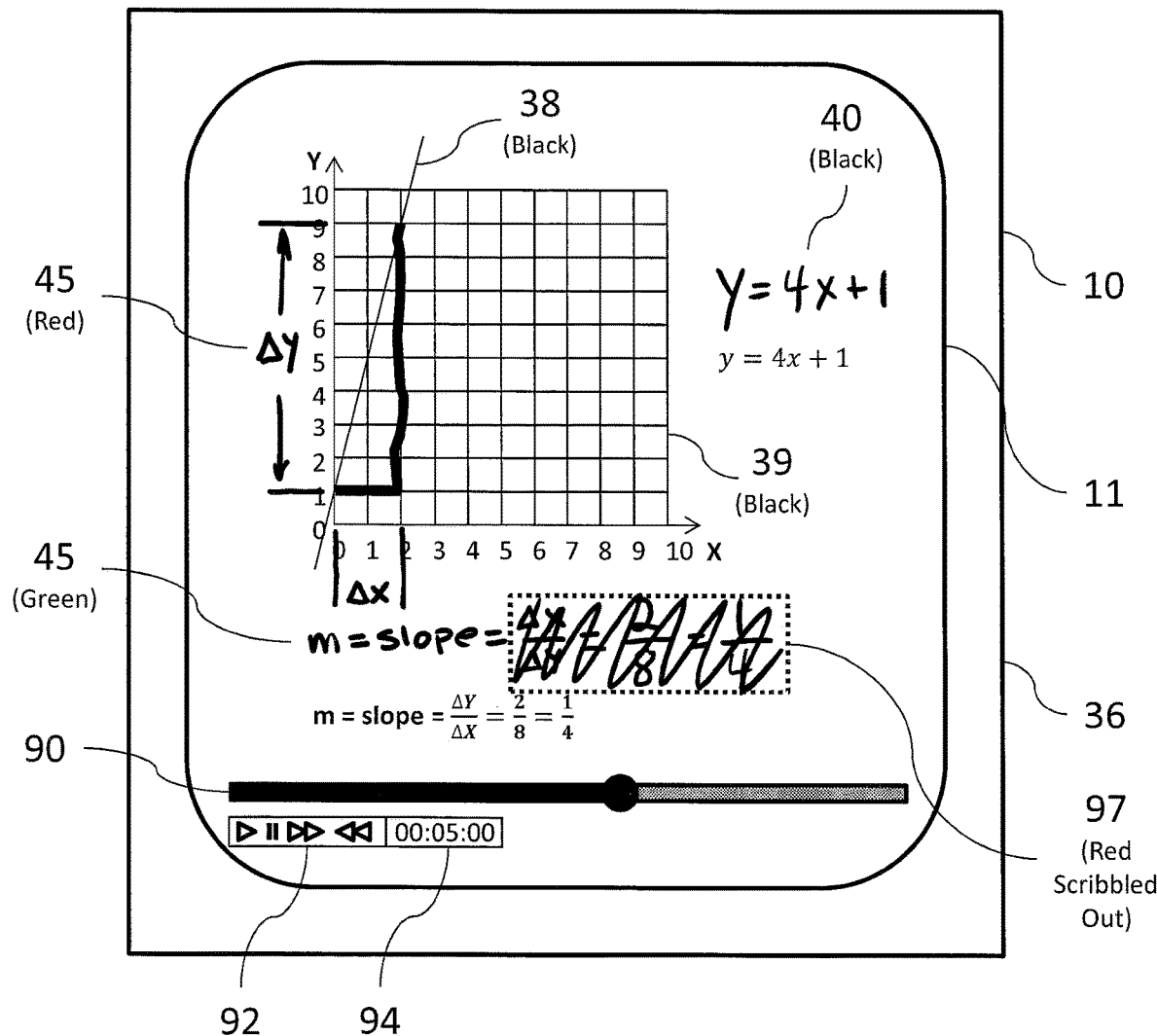
Figure 34E:
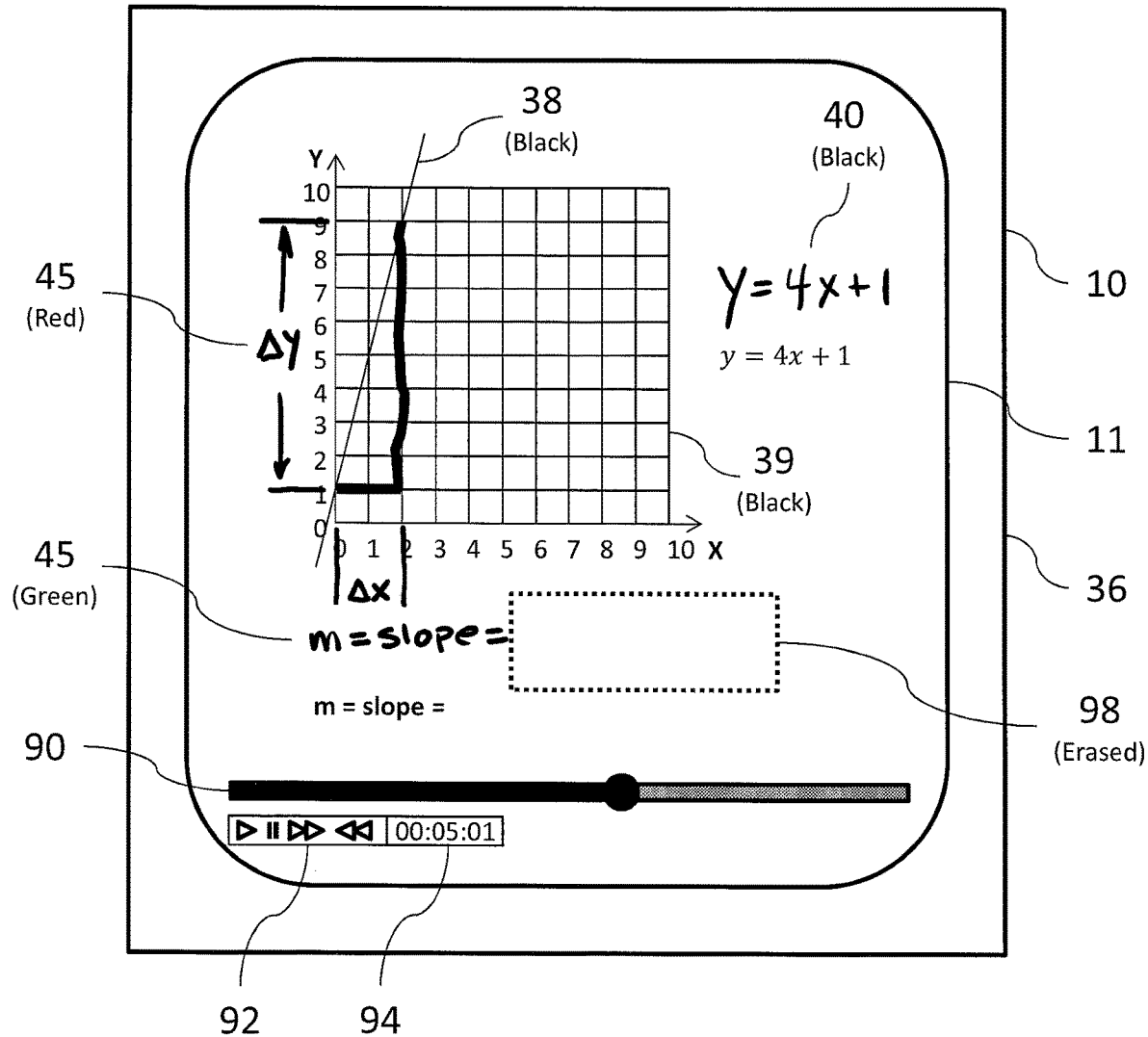

FIG. 34D depicts the point in the collaboration just after the first student corrects the mistake input by the second student. A scribble gesture 97 is input by the first student. This gesture causes the digital ink which the scribble covers to be erased as shown by reference No. 98 in FIG. 34E. The timestamps 94 in FIGS. 34D and 34E display the amount of time that has elapsed since the collaboration started, or, the recording was started.

Figure 34F:
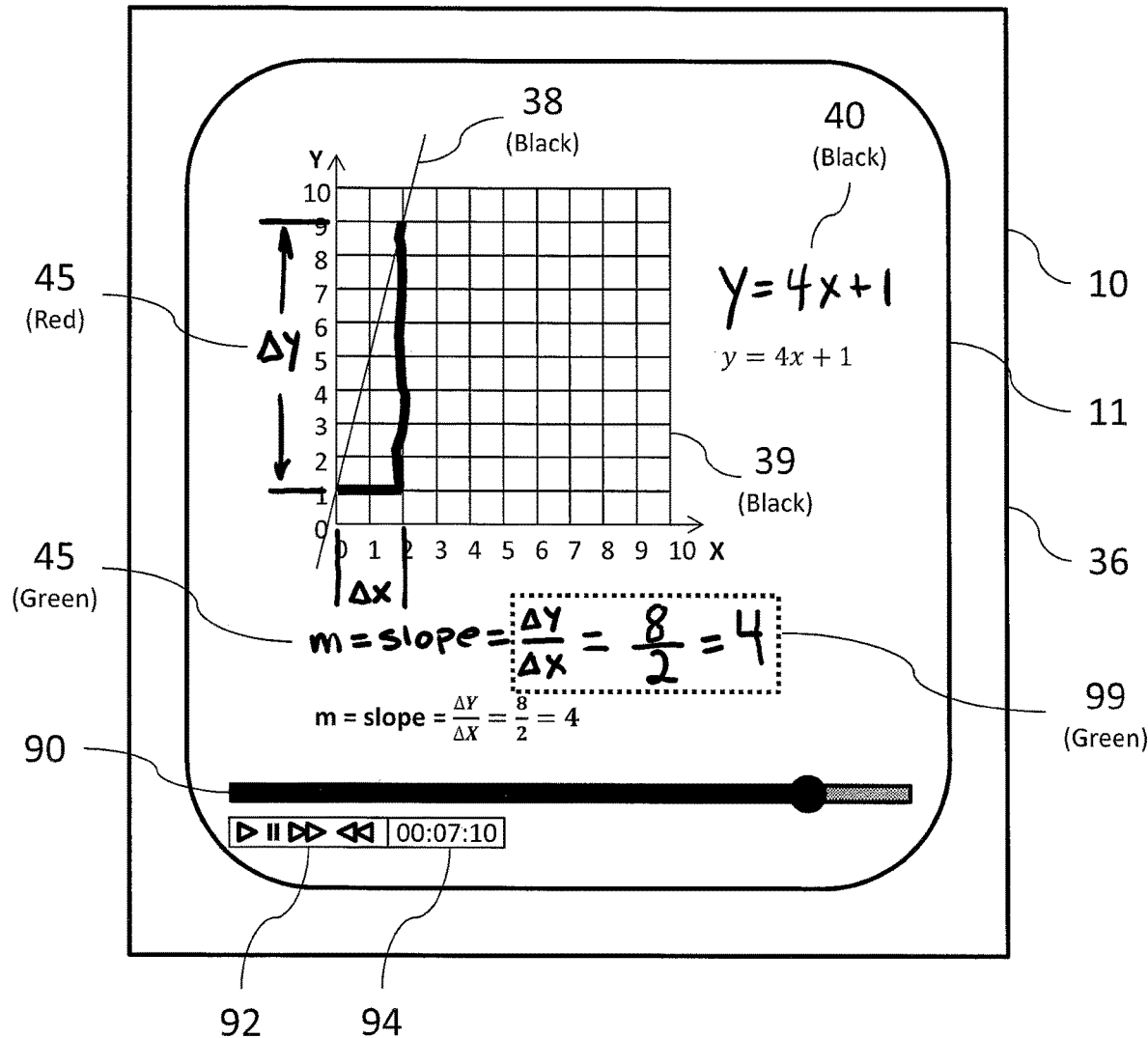

FIG. 34F depicts the point in the collaboration after the second student inputs a correct mathematical formula 99 and solves for a correct answer to the problem.

During a recording of a collaboration to solve a STEM problem, the microprocessor or microcontroller in the teacher's computing device 10, or an external central processing unit (CPU) of the system, causes the teacher's entries and students' entries to be recorded in the storage medium 84. During playback, when prompted by the teacher's computing device 10, the microprocessor or CPU fetches from the storage medium 84 the entries stored in the storage medium 84 and displays the entries, on the display or touch sensitive screen 11 of the teacher's computing device 10 in differentiating colors so that each participant's entry, assigned a different color, may be differentiated from another participant's entry.

Additionally, the microprocessor of the teacher's computing device 10, or the CPU of the system, includes an internal clock which will mark the time when an entry by either a teacher or a student has been made and will cause a timestamp 94 to be recorded in the storage medium 84. During playback of the problem-solving collaboration, the timestamp 94 assigned to the entry of each participant is displayed so that the teacher may not only see when the entry was made and the sequence of entries, but also may determine the lapse in time between entries to provide, for example, an indication as to whether a student is having difficulty in formulating his responsive entry.

Furthermore, the teacher may choose just to play back the entries made by a particular student, rather than playing back the entries of the entire collaboration session of all participating students. Each student's (and the teacher's) entry on his or her computing device 10, 12 is assigned a particular attribute datum or data when digitized in binary format by the digitizer 36 and recorded in the storage medium 84, at the direction of the microprocessor on the teacher's computing device 10 or the system CPU. When such is requested by the teacher through an entry on the touch sensitive screen 11 of the teacher's computing device 10, the microprocessor on the teacher's computing device 10, or the system CPU, will search for and retrieve from the storage medium 84 only those digitized entries of a selected student having a particular attribute datum, and the microprocessor or CPU will play back and show on the display 11 of the teacher's computing device 10 only those entries, with a time stamp of the entry, of the selected student that are recorded in the storage medium 84.

Although it is described herein for exemplary purposes to use color coding to differentiate one participant's entries from those of another participant, it should be realized that other differentiating techniques may be employed by the system of the present invention, and such techniques are envisioned to be within the scope of the present invention. For example, a teacher may move a cursor on the touch sensitive screen 11 using the keyboard 80, mouse 82, stylus (pen) or finger to hover over one of several entries made by different students during a collaboration that are displayed on the teacher's computing device 10, such as shown in FIG. 25A. The microprocessor of the teacher's computing device 10, or the system CPU, will recognize the cursor's "hover", and will retrieve from the storage medium 84 the attribute data that associates that entry with a particular student. A lookup table, stored in the storage medium 84, of digitized student's names and their corresponding attribute data, is searched by the teacher's microprocessor or the system CPU, and the name is retrieved by the microprocessor or CPU and displayed on the touch sensitive screen 11 of the teacher's computing device 10 in proximity to the student's entry over which the cursor is located.

Those skilled in the art recognize that the identifying methods and time-stamping methods of the present invention enable the following:

a. Observing all participants in a collaboration via their identifier and subsequently playing back the collaboration with the actual timing and time sequence of their contribution on a tablet computer, personal computer, or multi-purpose computing device as described herein in the collaboration
b. Isolating the input of any or all participants during a collaboration, recording the input, and subsequently playing the input back in time sequence.
c. Starting and stopping the recording to play back a segment of the recording.
d. Playing back the recording at a rate equal to, greater than, or less than the rate at which the original input occurred.
e. Correlating and presenting the following data:
   i. Overall timing of the collaboration
   ii. Total contribution time of each participant
   iii. Comparison of teams total times to solve a problem or sequence of problems The system and method of the present invention will now be further described.

In accordance with the present invention, a computerized system and method enabling teachers and students to collaborate in solving, recording, replaying, and assessing a collaborative solution to a STEM (science, technology, engineering and mathematics) question includes a communications network 19; at least one teacher tablet computer 10 operable by a respective teacher; at least one student tablet computer 12 operable by a respective student, the at least one teacher tablet computer 10 being operably connected to the at least one student tablet 12 computer via the communications network 19; and at least one computer-readable storage medium 84 operably connected to the communications network 19. Each of the at least one teacher tablet computer 10 and the at least one student tablet computer 12 includes a stylus 15 for inputting handwritten math notation, a touch sensitive screen 11 for receiving the handwritten math notation input and a digitizer 36 for converting the handwritten input to digital input data. The system reads and understands the digital input data.

The at least one computer-readable storage medium 84 contains program instructions transforming each touch sensitive screen 11 of the at least one teacher tablet computer 10 and the at least one student tablet computer 12 operably connected via the communications network 19 into a virtual shared whiteboard upon which handwritten math notation input from the at least one teacher tablet computer 10 and the at least one student tablet computer 12 is received and displayed. The system, when prompted in real-time by the respective teacher or the respective student, causes the system to spontaneously generate math representations of the respective teacher's and the respective student's handwritten math notation input.

The system enables collaboration between the respective teacher and the respective student, both inputting handwritten math notation to create a collaborative solution to the STEM problem by annotating each other's input including the math representations spontaneously generated by each respective teacher and respective student which are displayed on the common work page.

The handwritten inputs and spontaneously generated mathematical representations result in the respective teacher's and the respective student's collaborative solution to the STEM problem. When prompted by the respective teacher or the respective student, the at least one computer readable storage medium 84 records the digital input data created by the handwritten input and spontaneously generated mathematical representations of the respective teacher and the respective student to create a digital recording thereof. Furthermore, when prompted by the respective teacher or the respective student, the system plays back the recording of the digital input data comprising the collaborative solution for the teacher or the student to asynchronously assess the collaborative solution of the STEM problem.

Preferably, the recording of the digital input data and the spontaneously generated math representations comprising the collaborative solution to the STEM problem are played back in the real time and in the sequence in which it was input and recorded.

Even more preferably, the teacher tablet computer 10 embodies an analysis engine 24 and a computer algebra system (CAS) 20 providing the functionality to compare the answers provided by the students during the recording to correct answers stored in the memory 30 of the teacher's tablet computer and/or generated by the CAS 20 therein. The tablet computer virtual common workpage 37 may provide virtual electronic coordinates 43 which define and are used to record and display the teacher and student input.

The STEM questions may be automatically generated or loaded from memory for presenting to students. Furthermore, the computer-readable storage medium 84 creates appropriate coordinates upon which math notations are displayed. Additionally, the recording of the collaboration or a portion thereof is played back at a rate equal to, faster, or slower than the rate of the real-time recording.

Furthermore, the input of the respective teacher and respective student is preferably distinguished by an identifier enabling the respective teacher to identify the respective student when either monitoring the collaboration or when replaying the recording thereof.

In yet another form of the present invention, the computerized system includes a communications network 19; at least one teacher tablet computer 10 operable by a respective teacher; at least one student tablet computer 12 operable by a respective student, the at least one student tablet computer 12 being operably connected to the at least one teacher tablet computer 10 via the communications network 19; and at least one computer-readable storage medium 84 operably connected to the communications network 19. Each of the at least one teacher tablet computer 10 and the at least one student tablet computer 12 includes a touch sensitive screen 11, a stylus 15 and a digitizer 36 and receives input from the stylus 15 contacting the touch sensitive screen 11 receiving handwritten math notation input via the stylus 15, the digitizer 36 converting the handwritten math notation into digital input data defining the handwritten collaborative solution.

The at least one computer-readable storage medium 84 contains program instructions transforming each touch sensitive screen 11 of the at least one teacher tablet computer 10 and the at least one student tablet computer 12 operably connected via the communications network 19 into a tablet computer virtual shared common work page 37 upon which handwritten math notation input from the at least one teacher tablet computer 10 and the at least one student tablet computer 12 is received and displayed.

More specifically, the at least one computer-readable storage medium 84 contains program steps for recording and playing back the collaborative solution including the steps of: (a) receiving at least one STEM question input by the respective teacher into the at least one teacher tablet computer 10 to provide a received question; (b) displaying the received input of step (a) on the touch sensitive screen 11 of the at least one teacher tablet computer 10 and the at least one student tablet computer 12; (c) receiving at least one handwritten student response from the at least one student tablet computer 12 via the communications network 19 to provide a received handwritten student response, the at least one student response being input by the respective student handwriting the at least one student response in math notation on the touch sensitive screen 11 of the at least one student tablet computer 12; (d) displaying the received handwritten student response of step (c) on the touch sensitive screen 11 of the at least one teacher tablet computer 10 and the at least one student tablet computer 12; (e) enabling the system to read and understand the handwritten math notation received by the at least one teacher tablet computer and to read and understand the handwritten math notation received by the at least one student tablet computer 10; (f) causing the system, when prompted by either the respective teacher or the respective student, to spontaneously generate mathematical representations of the handwritten math notation received by the system and causing the system to enable the at least one respective teacher and the respective student to annotate their own and each other's input including their spontaneously generated mathematical representations thereby enabling the respective teacher and the respective student to collaborate using handwritten math notation on the at least one teacher tablet computer 10 and the at least one student tablet computer 12 to create the collaborative solution to the at least one STEM question, the collaborative solution being displayed on the screen of the at least one teacher tablet computer 10 and the at least one student tablet computer 12; (g) repeating steps (c) through (f) until the collaborative solution is achieved; and (h) causing the at least one computer readable storage medium 84, when prompted by the respective teacher or the respective student, to record the digital input data created by the handwritten input of the respective teacher and the respective student, the respective teacher or the respective student playing back the recording to assess the collaborative solution of the STEM problem.

Preferably, the at least one computer-readable storage medium 84 plays back in sequence and in real-time the digital input data and the spontaneously generated math representations created by the digitizer 36 which defines the collaborative solution to the STEM problem.

In yet another form of the present invention, the computerized system includes a communications network 19; at least one teacher personal computer 50 operable by a respective teacher; at least one student personal computer 51 operable by a respective student, the at least one student personal computer 51 being operably connected to the at least one teacher personal computer 50 via the communications network 19; and at least one computer-readable storage medium 84 operably connected to the communications network 19. Each of the at least one teacher personal computer 50 and the at least one student personal computer includes a physical keyboard 54 and a physical pointing device 55 for receiving math notation input from the respective teacher and the respective student manipulating the physical keyboard and the physical pointing device, and a screen for displaying the input.

The physical keyboard 54 and the physical pointing device 55 create digital data defining the math notation input. The system reads and understands the math notation input.

The at least one computer-readable storage medium 84 contains program instructions transforming each screen 52 of the at least one teacher personal computer 50 and the at least one student personal computer 51 operably connected via the communications network 19 into a personal computer virtual common work page 57 upon which the input from each of the at least one teacher personal computer 50 and the at least one student personal computer 51 is received and displayed. The system, when prompted in real-time by the respective teacher or the respective student, causes the system to spontaneously generate math representations of the respective teacher's and the respective student's math notation input.

The system enables collaboration between the respective teacher and the respective student, each inputting math notation via their respective keyboard 54 and pointing device 55 to create the solution to the STEM problem by annotating each other's input including the math representations spontaneously generated by each respective teacher and respective student which are displayed on the common work page 57, and the math notation inputs result in the respective teacher's and the respective student's collaborative solution to the STEM problem.

Preferably, the at least one computer readable storage medium 84 records the digital input data and the spontaneously generated math representations resulting from the input of the respective teacher's and the respective students' collaborative solution to the STEM problem and, when prompted, the system replays on the screen 52 of the at least one teacher personal computer 50 or the at least one student personal computer 51 the digital input data and the spontaneously generated math representations created by the collaboration and recorded in the computer readable storage medium 84, thereby replaying the digital recording, in sequence and in real-time, of the collaborative solution to the STEM question.

In yet another alternative version of the present invention, the computerized system includes a communications network 19; at least one teacher personal computer 50 operable by a respective teacher; at least one student personal computer 51 operable by a respective student, the at least one student personal computer 51 being operably connected to the at least one teacher personal computer 50 via the communications network 19; and at least one computer-readable storage medium 84 operably connected to the communications network 19. Each of the at least one teacher personal computer 50 and the at least one student personal computer 51 includes a computer screen 52 and physical keyboard 54 and a physical pointing device 55 which receive input from the physical keyboard 54 and the physical pointing device 55 being operated by the respective teacher and respective student, the input being converted to digital input data representing the collaborative solution to the STEM question. The at least one computer-readable storage medium 84 contains program instructions transforming each computer screen 52 of the at least one teacher personal 50 computer and the at least one student personal computer 51 operably connected via the communications network 19 into a personal computer virtual common work page 57 upon which math notation input from the at least one teacher personal computer 50 and the at least one student personal computer 51 is received and displayed.

More specifically, the at least one computer-readable storage medium 84 contains program steps for recording and playing back the collaborative solution including the steps of: (a) receiving at least one STEM question input by the teacher to provide a received question; (b) displaying the received input of step (a) on the screen 52 of the at least one teacher personal computer 50 and on the screen 52 of the at least one student personal computer 51; (c) receiving at least one student response from the at least one student personal computer 51 via the communications network 19 to provide a received student response, the at least one student response being input by the student in math notation on the physical keyboard 54 and physical pointing device 55 of the at least one student personal computer 51; (d) displaying the received student response of step (c) on the screen 52 of the at least one teacher personal computer 50 and the at least one student personal computer 51; (e) enabling the system to read and understand the math notation received by the at least one teacher personal computer 50 and to read and understand the math notation received by the at least one student personal computer 51; (f) causing the system, when prompted by either the respective teacher or the at least one respective student, to spontaneously generate mathematical representations of the math notation received by the system and causing the system to enable the at least one respective teacher and the at least one respective student to annotate their own and each other's input including their spontaneously generated mathematical representations thereby enabling the respective teacher and the respective student to collaborate using math notation input on the physical keyboard 54 and on the physical pointing device 55 of the at least one teacher personal computer 50 and the at least one student personal computer 51 to create a collaborative solution to the at least one STEM question, the collaborative solution to the at least one STEM question being displayed on the screen 52 of the at least one teacher personal computer 50 and the at least one student personal computer 51; and (g) repeating steps (c) through (f) until a collaborative solution is achieved.

Preferably, the at least one computer-readable storage medium 84 records and plays back in sequence and in real-time the digital data input created by the physical keyboard 54 and physical pointing device 55 being input by the respective teacher and the respective student and the spontaneously generated math representations to collaboratively solve the STEM problem.

In still another form of the present invention, the computerized system includes a communications network 19; at least one teacher computing device 58 operable by a respective teacher; at least one student computing device 60 operable by a respective student, the at least one student computing device 60 being operably connected to the at least one teacher computing device 58 via the communications network 19; and at least one computer-readable storage medium 84 operably connected to the communications network 19. Each of the at least one teacher computing device 58 and the at least one student computing device 60 includes a computer screen 53 and an input device 62 for receiving math notation input by the respective teacher and the respective student via the input device 62, the math notation input being displayed on the computer screen 53. The input device 62 creates digital input data defining the math notation input. The system reads and understands the math notation input. The at least one computer-readable storage medium 84 contains program instructions transforming each screen 53 of the at least one teacher computing device 58 and the at least one student computing device 60 operably connected via the communications network 19 into a computing device virtual common work page 61 upon which math notation input from each of the at least one teacher computing device 58 and the at least one student computing device 60 is received and displayed.

The system, when prompted in real-time, by the respective teacher or the respective student causes the system to spontaneously generate math representations of the respective teacher's and the respective student's math notation input.

The system enables the student and the teacher to annotate their own and each other's input including the math representations spontaneously generated by the respective teacher or the respective student and are displayed on the common work page 61. The inputs result in the respective student's solution to the STEM problem presented by the respective teacher.

Preferably, the at least one computer readable storage medium 84 stores the input data and the spontaneously generated math representations created by the respective teacher and the respective student and when prompted by the respective teacher or the respective student, the system replays on the screen of the at least one teacher computer 58 or the at least one student computer 60 the input data and the spontaneously generated math representations stored in the computer readable storage medium 84 created by the respective student's solution to the STEM problem thereby replaying a recording in sequence and in real-time of the respective student's solution to the STEM question.

In yet another form of the present invention, the computerized system includes a communications network 19; at least one teacher computing device 58 operable by a respective teacher; at least one student computing device 60 operable by a respective student, the at least one student computing device 60 being operably connected to the at least one teacher computing device 58 via the communications network 19; and at least one computer-readable storage medium 84 operably connected to the communications network 19. Each of the at least one teacher computing device 58 and the at least one student computing device 60 includes a computer screen 53 and an input device 62 for receiving math notation input by the respective teacher and the respective student via the input device 62, the math notation being displayed on the computer screen 53. The input device 62 creates digital input data defining the math notation input. The at least one computer-readable storage medium 84 contains program instructions transforming each screen of the at least one teacher computing device 58 and the at least one student computing device 60 operably connected via the communications network 19 into a virtual shared common work page 61 upon which math notation input from the at least one teacher computing device 58 and the at least one student computing device 60 is received and displayed.

More specifically, the at least one computer-readable storage medium 84 contains program instructions for solving, recording and playing back the student's solution including the steps of: (a) receiving at least one STEM question input by the teacher to provide a received question; (b) displaying the received input of step (a) on the screen of the at least one teacher computing device 58 and the at least one student computing device 60; (c) receiving at least one student response from the at least one student computing device 60 to provide a received student response, the at least one student response being input by the student inputting the at least one student response in math notation on the input device 62 of the at least one student computing device 60; (d) displaying the received student response of step (c) on the screen 53 of the at least one teacher computing device 58 and the at least one student computing device 60; (e) enabling the system to read and understand the math notation received by the at the at least one teacher computing device 58 and to read and understand the math notation received by the at least one student computing device 60; (f) causing the system, when prompted by either the respective teacher or the respective student, to spontaneously generate representations of the math notation received by the system and causing the system to enable the respective teacher and the at least one respective student to annotate their own and each other's input including their spontaneously generated mathematical representations thereby enabling the at least one student to create a solution to the at least one STEM question, the solution to the at least one STEM question being displayed on the screen 53 of the at least one teacher computing device 58 and the at least one student computing device 60; and (g) repeating steps (c) through (f) until the student achieves a solution to the STEM problem.

Preferably, the at least one computer-readable storage medium 84 records and plays back in sequence and in real-time the digital data input and the spontaneously generated math representations created by the respective teacher presenting the STEM problem and the respective student solving the STEM problem.

It should be noted that the display screen 53 may be a non-touch sensitive screen, although a touch sensitive screen on the teacher's computing device 58 and the students' computing devices 60 is preferred. Furthermore, when a touch sensitive screen is used in the system, entry of handwritten math notations may be made directly on the touch sensitive screen by the teacher or the student using a stylus or his finger.

Alternatively, a keyboard may be used to enter math notation inputs on the teacher's computing device and the students' computing devices, especially a keyboard that has math notation keys (e.g., ln, log, x, >) or pre-established equations (e.g., $A=\pi r^2$). Furthermore, a mouse may be used as the pointing device to point to a chart of mathematical notations and symbols and/or equations displayed on the display screen 53 which may be selected by using the mouse.

The system and method of the present invention will now be even further described.

In accordance with the present invention. a computerized system enabling teachers and students to collaborate in the solutions of STEM (science, technology, engineering and mathematics) problems, includes a communications network 19, at least one teacher computing device 58 operable by at least one respective teacher, at least one student computing device 60 operable by at least one respective student, the at least one student computing device 60 being operably connected to the at least one teacher computing device 58 via the communications network 19; and at least one computer-readable storage medium 84 operably connected to the communications network 19.

Each of the at least one teacher computing device 58 and the at least one student computing device 60 includes an input device 62 and a display screen 53 for receiving math notation input via the input device 62, the math notation input or a corresponding digitized version thereof defining digital input data; and the system reads and understands the digital input data.

The at least one teacher computing device 58 and the at least one student computing device 60 are operably connected to the at least one computer-readable storage medium 84, the at least one computer-readable storage medium 84 having stored therein program instructions transforming each display screen 53 of the at least one teacher computing device 58 and the at least one student computing device 60 operably connected together via the communications network 19 into a virtual shared whiteboard defining a common work page 61 upon which the math notation input from each of the at least one teacher computing device 58 and the at least one student computing device 60 is received and displayed. The system enables collaboration between the at least one respective teacher and the at least one respective student, each of whom respectively enters the math notation input on the at least one teacher computing device 58 and the at least one student computing device 60 to create a collaborative solution to the STEM problem by annotating each other's math notation input, each of which is displayed on the common work page 61. The math notation inputs result in the at least one respective teacher's and the at least one respective student's collaborative solution to the STEM problem;

The at least one computer-readable storage medium 84 records by storing therein the digital input data corresponding to the math notation input entered by the at least one respective teacher on the at least one teacher computing device 58 and the math notation input entered by the at least one respective student on the at least one student computing device 60 to create a digital recording thereof. When prompted by the at least one respective teacher or the at least one respective student, the system plays back at least a portion of the digital recording so that the at least one respective teacher or the at least one respective student may subsequently assess the collaborative solution of the STEM problem. Preferably the at least portion of the digital recording of the digital input data comprising the collaborative solution to the STEM problem is played back in the sequence in which the math notation inputs were entered by the at least one respective teacher on the at least one teacher computing device 58 and by the at least one respective student on the at least one student computing device 60. The at least portion of the digital recording played back by the system corresponds to at least one of the math notation input entered by the at least one respective teacher on the at least one teacher computing device 58 and the math notation input entered by the at least one respective student on the at least one student computing device 60.

The system generates mathematical representations of the at least one respective teacher's and the at least one respective student's math notation inputs. The at least one computer-readable storage medium 84 stores therein the generated mathematical representations of the math notation inputs of the at least one respective teacher and the at least one respective student, the mathematical representations forming part of the digital recording. The at least portion of the digital recording played back by the system corresponds to at least one of 1) the math notation input entered by the at least one respective teacher on the at least one teacher computing device 58 and including the generated mathematical representation thereof, and 2) the math notation input entered by the at least one respective student on the at least one student computing device 60 and including the generated mathematical representation thereof. The mathematical representation includes a graph having at least one of cartesian coordinates 39 and polar coordinates. The math notation input entered by the at least one respective teacher on the at least one teacher computing device 58 has a first color associated therewith, and the math notation input entered by the at least one respective student on the at least one student computing device 60 has a second color associated therewith, the second color being different from the first color; and the system plays back the at least portion of the digital recording of the digital input data corresponding to the math notation input of at least one of the at least one respective teacher in the first color associated therewith and the at least one respective student in the second color associated therewith. The display screen 53 of the at least one teacher computing device 58 displays a chart 44, the chart 44 identifying the at least one respective student and the second color associated with the math notation input entered by the at least one respective student on the at least one student computing device 60. The chart 44 identifies the first color associated with the math notation input entered by the at least one respective teacher on the at least one teacher computing device 58.

Preferably the at least portion of the digital recording played back by the system corresponds to one of the math notation input having the first color associated therewith entered by the at least one respective teacher on the at least one teacher computing device 58 and the math notation input having the second color associated therewith and entered by the at least one respective student on the at least one student computing device 60. The math notation input entered by the at least one respective student on the at least one student computing device 60 and the math notation input entered by the at least one respective teacher on the at least one teacher computing device 58 have identifying informational data associated therewith; and when the system plays back the at least portion of the digital recording of the digital input data corresponding to the math notation input of at least one of the at least one respective teacher and the at least one respective student, the identifying informational data associated therewith are displayed on the display screen 53 of at least one of the at least one teacher computing device 58 and the at least one student computing device 60.

The identifying informational data may include a color. The identifying informational data may include the name of at least one of the at least one respective teacher and the at least one respective student.

The at least one respective student may include at least a first respective student and a second respective student; The at least one student computing device 60 includes a first student computing device 60 and a second student computing device 60, the first respective student and the second respective student respectively entering math notation inputs on the first student computing device 60 and the second student computing device 60;

The math notation input entered by the first respective student on the first student computing device 60 has first identifying informational data associated therewith; The math notation input entered by the second respective student on the second student computing device 60 has second identifying informational data associated therewith, the second identifying informational data being different from the first identifying informational data; and the at least portion of the digital recording of the digital input data corresponding to the math notation input of the first respective student with the first identifying informational data associated therewith. The system plays back the at least portion of the digital recording of the digital input data corresponding to the math notation input of the second respective student with the second identifying informational data associated therewith. The math notation input entered by the at least one respective teacher on the at least one teacher computing device 58 has third identifying informational data associated therewith, the third identifying informational data being different from the first identifying informational data and the second identifying informational data; and the system plays back the at least portion of the digital recording of the digital input data corresponding to the math notation input of the at least one respective teacher with the third identifying informational data associated therewith. Preferably the at least one respective student includes at least a first respective student and a second respective student.

The at least one student computing device 60 may include a first student computing device 60 and a second student computing device 60, the first respective student and the second respective student respectively entering math notation inputs on the first student computing device 60 and the second student computing device 60; and the system plays back the at least portion of the digital recording of the digital input data corresponding to the math notation input of at least one of the first respective student entered on the first student computing device 60 and the second respective student entered on the second student computing device 60. The math notation input entered by the first respective student on the first student computing device 60 has a first color associated therewith. The math notation input entered by the second respective student on the second student computing device 60 has a second color associated therewith, the second color being different from the first color; and the system plays back the at least portion of the digital recording of the digital input data corresponding to the math notation input of the first respective student in the first color.

More specifically, the system plays back the at least portion of the digital recording of the digital input data corresponding to the math notation input of the second respective student in the second color. The math notation input entered by the at least one respective teacher on the at least one teacher computing device 58 has a third color associated therewith, the third color being different from the first color and the second color; and the system plays back the at least portion of the digital recording of the digital input data corresponding to the math notation input of the at least one respective teacher in the third color.

Preferably the system generates a timestamp 94 associated with the time the math notation input is entered by at least one of the at least one respective student on the at least one student computing device 60 and the at least one respective teacher on the at least one teacher computing device 58; The timestamp 94 is recorded by the system by storing the timestamp 94 on the at least one computer-readable storage medium 84, the timestamp 94 forming part of the digital recording; and the at least portion of the digital recording played back by the system includes the timestamp 94 associated with at least one of the math notation input entered by the at least one respective teacher on the at least one teacher computing device 58 and the math notation input entered by the at least one respective student on the at least one student computing device 60. The timestamp 94 is displayed on the display screen 53 of at least one of the at least one teacher computing device 58 and the at least one student computing device 60.

Preferably, at least one of the at least one teacher computing device 58 and the at least one student computing device 60 is one of a personal computer, a laptop computer, a tablet computer, a smart phone and a handheld personal assistant device. The input device 62 of at least one of the at least one teacher computing device 58 and the at least one student computing device 60 includes at least one of a keyboard 54, a mouse 55, a finger and a stylus 15. The display screen 53 is a touch sensitive screen and the at least one of the at least one teacher computing device 58 and the at least one student computing device 60 includes a digitizer 36; The math notation input entered by at least one of the at least one respective teacher and the at least one respective student includes handwritten math notation input, the handwritten math notation input being digitally converted by the digitizer 36 to at least partially define the digital input data.

In accordance with another form of the present invention, a computerized system enabling teachers and students to collaborate in the solutions of STEM (science, technology, engineering and mathematics) problems, includes a communications network 19; at least one teacher computing device 58 operable by at least one respective teacher; at least one student computing device 60 operable by at least one respective student, the at least one student computing device 60 being operably connected to the at least one teacher computing device 58 via the communications network 19; and at least one computer-readable storage medium 84 operably connected to the communications network 19;

Each of the at least one teacher computing device 58 and the at least one student computing device 60 includes an input device 62 and a display screen 53 for receiving math notation input via the input device 62, the math notation input or a corresponding digitized version thereof defining digital input data; and the system reads and understands the digital input data;

The at least one teacher computing device 58 and the at least one student computing device 60 are operably connected to the at least one computer-readable storage medium 84, the at least one computer-readable storage medium 84 having stored therein program instructions transforming each display screen 53 of the at least one teacher computing device 58 and the at least one student computing device 60 operably connected together via the communications network 19 into a virtual shared whiteboard defining a common work page upon which the math notation input from each of the at least one teacher computing device 58 and the at least one student computing device 60 is received and displayed;

wherein the system enables collaboration between the at least one respective teacher and the at least one respective student, each of whom respectively enters the math notation input on the at least one teacher computing device 58 and the at least one student computing device 60 to create a collaborative solution to the STEM problem by annotating each other's math notation input, each of which is displayed on the common work page 61; and the math notation inputs result in the at least one respective teacher's and the at least one respective student's collaborative solution to the STEM problem;

The math notation input entered by the at least one respective teacher on the at least one teacher computing device 58 may have a first color associated therewith, and the math notation input entered by the at least one respective student on the at least one student computing device 60 may have a second color associated therewith, the second color being different from the first color; and the system displays on at least one of the at least one teacher computing device 58 and the at least one student computing device 60 the math notation input of at least one of the at least one respective teacher in the first color associated therewith and the at least one respective student in the second color associated therewith.

At least one of the at least one teacher computing device 58 and the at least one student computing device 60 may include a digitizer 36; and the math notation input entered by at least one of the at least one respective teacher and the at least one respective student may include handwritten math notation input, the handwritten math notation input being digitally converted by the digitizer 36 to at least partially define the digital input data.

In yet another form, a computerized system enabling teachers and students to collaborate in the solutions of STEM (science, technology, engineering and mathematics) problems, the system includes a communications network 19; at least one teacher computing device 58 operable by at least one respective teacher; at least one student computing device 60 operable by at least one respective student, the at least one student computing device 60 being operably connected to the at least one teacher computing device 58 via the communications network 19; and at least one computer-readable storage medium 84 operably connected to the communications network 19; Each of the at least one teacher computing device 58 and the at least one student computing device 60 includes an input device 62 and a display screen 53 for receiving math notation input via the input device 62, the math notation input or a corresponding digitized version thereof defining digital input data; and the system reads and understands the digital input data. The at least one teacher computing device 58 and the at least one student computing device 60 are operably connected to the at least one computer-readable storage medium 84, the at least one computer-readable storage medium 84 having stored therein program instructions transforming each display screen 53 of the at least one teacher computing device 58 and the at least one student computing device 60 operably connected together via the communications network 19 into a virtual shared whiteboard defining a common work page 61 upon which the math notation input from each of the at least one teacher computing device 58 and the at least one student computing device 60 is received and displayed; The system enables collaboration between the at least one respective teacher and the at least one respective student, each of whom respectively enters the math notation input on the at least one teacher computing device 58 and the at least one student computing device 60 to create a collaborative solution to the STEM problem by annotating each other's math notation input, each of which is displayed on the common work page 61; The math notation inputs result in the at least one respective teacher's and the at least one respective student's collaborative solution to the STEM problem;

The at least one respective student includes at least a first respective student and a second respective student; The at least one student computing device 60 includes a first student computing device 60 and a second student computing device 60, the first respective student and the second respective student respectively entering math notation inputs on the first student computing device 60 and the second student computing device 60; The math notation input entered by the first respective student on the first student computing device 60 may have a first color associated therewith; The math notation input entered by the second respective student on the second student computing device 60 may have a second color associated therewith, the second color being different from the first color; The system displays on at least one of the at least one teacher computing device 58, the first student computing device 60 and the second student computing device 60 the math notation input of at least one of the first respective student in the first color associated therewith and the second respective student in the second color associated therewith. The math notation input entered by the at least one respective teacher on the at least one teacher computing device 58 has a third color associated therewith, the third color being different from the first color and the second color; The system displays on at least one of the at least one teacher computing device 58, the first student computing device 60 and the second student computing device 60 the math notation input of the at least one respective teacher in the third color associated therewith.

At least one of the at least one teacher computing device 58, the first student computing device 60 and the second student computing device 60 may include a digitizer 36; The math notation input entered by at least one of the at least one respective teacher, the first respective student and the second respective student includes handwritten math notation input, the handwritten math notation input being digitally converted by the digitizer 36 to at least partially define the digital input data.

In yet another form, a computerized system enabling teachers and students to collaborate in the solutions of STEM (science, technology, engineering and mathematics) problems, the system including a communications network 19; at least one teacher computing device 58 operable by at least one respective teacher; at least one student computing device 60 operable by at least one respective student, the at least one student computing device 60 being operably connected to the at least one teacher computing device 58 via the communications network 19; and at least one computer-readable storage medium 84 operably connected to the communications network 19; Each of the at least one teacher computing device 58 and the at least one student computing device 60 includes an input device 62 and a display screen 53 for receiving math notation input via the input device 62, the math notation input or a corresponding digitized version thereof defining digital input data; and the system reads and understands the digital input data;

The at least one teacher computing device 58 and the at least one student computing device 60 are operably connected to the at least one computer-readable storage medium 84, the at least one computer-readable storage medium 84 having stored therein program instructions transforming each display screen 53 of the at least one teacher computing device 58 and the at least one student computing device 60 operably connected together via the communications network 19 into a virtual shared whiteboard defining a common work page 61 upon which the math notation input from each of the at least one teacher computing device 58 and the at least one student computing device 60 is received and displayed;

The system enables collaboration between the at least one respective teacher and the at least one respective student, each of whom respectively enters the math notation input on the at least one teacher computing device 58 and the at least one student computing device 60 to create a collaborative solution to the STEM problem by annotating each other's math notation input, each of which is displayed on the common work page 61; The math notation inputs result in the at least one respective teacher's and the at least one respective student's collaborative solution to the STEM problem;

The math notation input entered by the at least one respective teacher on the at least one teacher computing device 58 may have a first identifier associated therewith, and the math notation input entered by the at least one respective student on the at least one student computing device 60 may have a second identifier associated therewith, the second identifier being different from the first identifier; The system displays on at least one of the at least one teacher computing device 58 and the at least one student computing device 60 the math notation input of at least one of the at least one respective teacher with the first identifier associated therewith and the at least one respective student with the second identifier associated therewith.

At least one of the at least one teacher computing device 58 and the at least one student computing device 60 may include a digitizer 36; The math notation input entered by at least one of the at least one respective teacher and the at least one respective student includes handwritten math notation input, the handwritten math notation input being digitally converted by the digitizer 36 to at least partially define the digital input data.

In an alternative form, a computerized system enabling teachers and students to collaborate in the solutions of STEM (science, technology, engineering and mathematics) problems, the system including a communications network 19; at least one teacher computing device 58 operable by at least one respective teacher; at least one student computing device 60 operable by at least one respective student, the at least one student computing device 60 being operably connected to the at least one teacher computing device 58 via the communications network 19; and at least one computer-readable storage medium 84 operably connected to the communications network 19;

Each of the at least one teacher computing device 58 and the at least one student computing device 60 includes an input device 62 and a display screen 53 for receiving math notation input via the input device 62, the math notation input or a corresponding digitized version thereof defining digital input data; and the system reads and understands the digital input data;

The at least one teacher computing device 58 and the at least one student computing device 60 are operably connected to the at least one computer-readable storage medium 84, the at least one computer-readable storage medium 84 having stored therein program instructions transforming each display screen 53 of the at least one teacher computing device 58 and the at least one student computing device 60 operably connected together via the communications network 19 into a virtual shared whiteboard defining a common work page 61 upon which the math notation input from each of the at least one teacher computing device 58 and the at least one student computing device 60 is received and displayed; The system enables collaboration between the at least one respective teacher and the at least one respective student, each of whom respectively enters the math notation input on the at least one teacher computing device 58 and the at least one student computing device 60 to create a collaborative solution to the STEM problem by annotating each other's math notation input, each of which is displayed on the common work page 61; The math notation inputs result in the at least one respective teacher's and the at least one respective student's collaborative solution to the STEM problem;

The at least one respective student may include at least a first respective student and a second respective student; The at least one student computing device 60 may include a first student computing device 60 and a second student computing device 60, the first respective student and the second respective student respectively entering math notation inputs on the first student computing device 60 and the second student computing device 60; The math notation input entered by the first respective student on the first student computing device 60 may have a first identifier associated therewith; The math notation input entered by the second respective student on the second student computing device 60 may have a second identifier associated therewith, the second identifier being different from the first identifier; The system displays on at least one of the at least one teacher computing device 58, the first student computing device 60 and the second student computing device 60 the math notation input of at least one of the first respective student with the first identifier associated therewith and the second respective student with the second identifier associated therewith.

The math notation input entered by the at least one respective teacher on the at least one teacher computing device 58 may have a third identifier associated therewith, the third identifier being different from the first identifier and the second identifier; The system displays on at least one of the at least one teacher computing device 58, the first student computing device 60 and the second student computing device 60 the math notation input of the at least one respective teacher with the third identifier associated therewith.

At least one of the at least one teacher computing device 58, the first student computing device 60 and the second student computing device 60 may include a digitizer 36; The math notation input entered by at least one of the at least one respective teacher, the first respective student and the second respective student may include handwritten math notation input, the handwritten math notation input being digitally converted by the digitizer 36 to at least partially define the digital input data.

In a further form of the present invention, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least one student computing device 60 operable by at least one respective student, the at least one student computing device 60 being operably connected to the at least one teacher computing device 58 via the communications network 19, and at least one computer-readable storage medium 84 operably connected to the communications network 19, each of the at least one teacher computing device 58 and the at least one student computing device 60 including an input device 62 and a display screen 53 for receiving math notation input via the input device 62, the math notation input or a corresponding digitized version thereof defining digital input data, the system reading and understanding the digital input data, the method comprising the steps of:

receiving a teacher math notation input on the at least one teacher computing device 58 entered by the at least one respective teacher;

receiving a student math notation input on the at least one student computing device 60 entered by the at least one respective student;

storing on the at least one computer-readable storage medium 84 the digital input data corresponding to the teacher math notation input entered by the at least one respective teacher on the at least one teacher computing device 58 and the student math notation input entered by the at least one respective student on the at least one student computing device 60 to create a digital recording thereof; and playing back at least a portion of the digital recording so that the at least one respective teacher or the at least respective student may subsequently assess a collaborative solution of the STEM problem.

The at least portion of the digital recording of the digital input data is played back in the sequence in which the teacher math notation input and the student math notation input were respectively entered by the at least one respective teacher on the at least one teacher computing device 58 and by the at least one respective student on the at least one student computing device 60.

The method may further comprise the steps of:

generating by the computerized system mathematical representations of the teacher math notation input of the at least one respective teacher and the student math notation input of the at least one respective student;

storing on the at least one computer-readable storage medium 84 the generated mathematical representations of the teacher math notation input and the student math notation input, the mathematical representations forming part of the digital recording; and playing back by the computerized system the at least portion of the digital recording which corresponds to at least one of 1) the teacher math notation input entered by the at least one respective teacher on the at least one teacher computing device 58 and including the generated mathematical representation thereof, and 2) the student math notation input entered by the at least one respective student on the at least one student computing device 60 and including the generated mathematical representation thereof. The mathematical representation includes a graph having at least one of cartesian coordinates 39 and polar coordinates; and wherein the method further comprises the step of:

displaying the graph on the display screen 53 of at least one of the at least one teacher computing device 58 and the at least one student computing device 60.

The method may further comprise the steps of:

plotting at least one of the math notation input of the at least one respective teacher and the math notation input of the at least one respective student on the graph to provide a plotted graph; and displaying the plotted graph on the display screen 53 of at least one of the at least one teacher computing device 58 and the at least one student computing device 60.

The method may further comprise the steps of:

associating by the computerized system a first color with the teacher math notation input entered by the at least one respective teacher on the at least one teacher computing device 58;

associating by the computerized system a second color with the student math notation input entered by the at least one respective student on the at least one student computing device 60, the second color being different from the first color; and playing back by the computerized system the at least portion of the digital recording of the digital input data corresponding to at least one of the teacher math notation input of the at least one respective teacher in the first color associated therewith and the student math notation input of the at least one respective student in the second color associated therewith.

The method may further comprise the step of:

displaying by the computerized system on the display screen 53 of the at least one teacher computing device 58 a chart 44, the chart 44 identifying the at least one respective student and the second color associated with the student math notation input entered by the at least one respective student on the at least one student computing device 60. The chart 44 identifies the first color associated with the teacher math notation input entered by the at least one respective teacher on the at least one teacher computing device 58.

The method may further comprise the steps of:

associating by the computerized system first identifying informational data with the teacher math notation input entered by the at least one respective teacher on the at least one teacher computing device 58;

associating by the computerized system second identifying informational data with the student math notation input entered by the at least one respective student on the at least one student computing device 60, the second identifying informational data being different from the first identifying informational data; and playing back by the computerized system the at least portion of the digital recording of the digital input data corresponding to at least one of the teacher math notation input of the at least one respective teacher with the first identifying informational data associated therewith and the student math notation input of the at least one respective student with the second identifying informational data associated therewith.

In one form of the method, the first identifying informational data includes a first color; and the second identifying informational data includes a second color, the second color being different from the first color and the second identifying informational data includes the name of the at least one respective student.

In another form of the method, the at least one respective student includes at least a first respective student and a second respective student, and the at least one student computing device 60 of the computerized system includes a first student computing device 60 and a second student computing device 60. The method may further comprise the steps of:

receiving a first student math notation input on the first student computing device 60 entered by the first respective student;

associating by the computerized system first identifying informational data with the first student math notation input entered by the first respective student on the first student computing device 60;

receiving a second student math notation input on the second student computing device 60 entered by the second respective student;

associating by the computerized system second identifying informational data with the second student math notation input entered by the second respective student on the second student computing device 60, the second identifying informational data being different from the first identifying informational data; and playing back by the computerized system the at least portion of the digital recording of the digital input data corresponding to the first student math notation input of the first respective student with the first identifying informational data associated therewith.

The method may further comprise the step of:

playing back by the computerized system the at least portion of the digital recording of the digital input data corresponding to the second student math notation input of the second respective student with the second identifying informational data associated therewith.

The method may further comprise the steps of:

associating by the computerized system third identifying informational data with the teacher math notation input entered by the at least one respective teacher on the at least one teacher computing device 58; and playing back by the computerized system the at least portion of the digital recording of the digital input data corresponding to the teacher math notation input of the at least one respective teacher with the third identifying informational data associated therewith. The at least one respective student may include at least a first respective student and a second respective student, and the at least one student computing device 60 of the computerized system may include a first student computing device 60 and a second student computing device 60. The method may further comprise the steps of:

receiving a first student math notation input on the first student computing device 60 entered by the first respective student; and receiving a second student math notation input on the second student computing device 60 entered by the second respective student; and wherein the computerized system plays back the at least portion of the digital recording of the digital input data corresponding to at least one of the first student math notation input entered by the first respective student on the first student computing device 60 and the second student math notation input entered by the second respective student on the second student computing device 60.

The method may further comprise the steps of:

associating by the computerized system a first color with the first student math notation input entered by the first respective student on the first student computing device 60;

associating by the computerized system a second color with the second student math notation input entered by the second respective student on the second student computing device 60; and playing back by the computerized system the at least portion of the digital recording of the digital input data corresponding to the first student math notation input of the first respective student in the first color associated therewith.

The method may further comprise the step of:

playing back by the computerized system the at least portion of the digital recording of the digital input data corresponding to the second student math notation input of the second respective student in the second color associated therewith.

The method may further comprise the steps of:

associating by the computerized system a third color with the teacher math notation input entered by the at least one respective teacher on the at least one teacher computing device 58, the third color being different from the first color and the second color; and playing back by the computerized system the at least portion of the digital recording of the digital input data corresponding to the teacher math notation input of the at least one respective teacher in the third color associated therewith.

The method may further comprise the steps of:

generating by the computerized system a timestamp 94 associated with the time that at least one of 1) the teacher math notation input is entered by the at least one teacher on the at least one teacher computing device 58, and 2) the student math notation input is entered by the at least one student on the at least one student computing device 60;

storing by the computerized system on the at least one computer-readable storage medium 84 the timestamp 94, the timestamp 94 forming part of the digital recording; and playing back by the computerized system the at least portion of the digital recording which includes the timestamp 94 associated with at least one of the teacher math notation input entered by the at least one respective teacher on the at least one teacher computing device 58 and the student math notation input entered by the at least one respective student on the at least one student computing device 60.

The method may further comprise the step of:

displaying the timestamp 94 on the display screen 53 of at least one of the at least one teacher computing device 58 and the at least one student computing device 60.

In yet another form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least one student computing device 60 operable by at least one respective student, the at least one student computing device 60 being operably connected to the at least one teacher computing device 58 via the communications network 19, and at least one computer-readable storage medium 84 operably connected to the communications network 19, each of the at least one teacher computing device 58 and the at least one student computing device 60 including an input device 62 and a display screen 53 for receiving handwritten math notation input via the input device 62, and a digitizer 36 for converting the handwritten math notation input to digital input data, the system reading and understanding the digital input data, the method comprising the steps of:

receiving a teacher handwritten math notation input on the at least one teacher computing device 58 entered by the at least one respective teacher;

converting the teacher handwritten math notation input by the digitizer 36 of the at least one teacher computing device 58 to the digital input data;

receiving a student handwritten math notation input on the at least one student computing device 60 entered by the at least one respective student;

converting the student handwritten math notation input by the digitizer 36 of the at least one student computing device 60 to the digital input data;

storing on the at least one computer-readable storage medium 84 the digital input data corresponding to the teacher handwritten math notation input entered by the at least one respective teacher on the at least one teacher computing device 58 and converted by the digitizer 36 thereof and the student handwritten math notation input entered by the at least one respective student on the at least one student computing device 60 and converted by the digitizer 36 thereof to create a digital recording thereof; and playing back at least a portion of the digital recording so that the at least one respective teacher or the at least one respective student may subsequently assess a collaborative solution of the STEM problem.

In a further form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least one student computing device 60 operable by at least one respective student, the at least one student computing device 60 being operably connected to the at least one teacher computing device 58 via the communications network 19, and at least one computer-readable storage medium 84 operably connected to the communications network 19, each of the at least one teacher computing device 58 and the at least one student computing device 60 including an input device 62 and a display screen 53 for receiving math notation input via the input device 62, the math notation input or a corresponding digitized version thereof defining digital input data, the system reading and understanding the digital input data, the method comprising the steps of:

receiving a teacher math notation input on the at least one teacher computing device 58 entered by the at least one respective teacher;

receiving a student math notation input on the at least one student computing device 60 entered by the at least one respective student;

storing on the at least one computer-readable storage medium 84 the digital input data corresponding to the teacher math notation input entered by the at least one respective teacher on the at least one teacher computing device 58 and the student math notation input entered by the at least one respective student on the at least one student computing device 60 to create a digital recording thereof;

associating by the computerized system a first color with the teacher math notation input entered by the at least one respective teacher on the at least one teacher computing device 58;

associating by the computerized system a second color with the student math notation input entered by the at least one respective student on the at least one student computing device 60, the second color being different from the first color; and displaying on the display screen 53 of at least one of the at least one teacher computing device 58 and the at least one student computing device 60 at least one of the teacher math notation input of the at least one respective teacher in the first color associated therewith and the student math notation input of the at least one respective student in the second color associated therewith.

In an alternative form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least one student computing device 60 operable by at least one respective student, the at least one student computing device 60 being operably connected to the at least one teacher computing device 58 via the communications network 19, and at least one computer-readable storage medium 84 operably connected to the communications network 19, each of the at least one teacher computing device 58 and the at least one student computing device 60 including an input device 62 and a display screen 53 for receiving handwritten math notation input via the input device 62, and a digitizer 36 for converting the handwritten math notation input to digital input data, the system reading and understanding the digital input data, the method comprising the steps of:

receiving a teacher handwritten math notation input on the at least one teacher computing device 58 entered by the at least one respective teacher;

converting the teacher handwritten math notation input by the digitizer 36 of the at least one teacher computing device 58 to the digital input data;

receiving a student handwritten math notation input on the at least one student computing device 60 entered by the at least one respective student;

converting the student handwritten math notation input by the digitizer 36 of the at least one student computing device 60 to the digital input data;

storing on the at least one computer-readable storage medium 84 the digital input data corresponding to the teacher handwritten math notation input entered by the at least one respective teacher on the at least one teacher computing device 58 and converted by the digitizer 36 thereof and the student handwritten math notation input entered by the at least one respective student on the at least one student computing device 60 and converted by the digitizer 36 thereof to create a digital recording thereof;

associating by the computerized system a first color with the teacher handwritten math notation input entered by the at least one respective teacher on the at least one teacher computing device 58;

associating by the computerized system a second color with the student handwritten math notation input entered by the at least one respective student on the at least one student computing device 60, the second color being different from the first color; and displaying on the display screen 53 of at least one of the at least one teacher computing device 58 and the at least one student computing device 60 at least one of the teacher handwritten math notation input of the at least one respective teacher in the first color associated therewith and the student handwritten math notation input of the at least one respective student in the second color associated therewith.

In yet another form, a method using a computerized system for enabling teachers and students to collaborate in the solutions of STEM (science, technology, engineering and mathematics) problems, the computerized system including a communications network 19, at least one teacher computing device 58 operable by at least one respective teacher, at least a first student computing device 60 operable by a first respective student, and at least a second student computing device 60 operable by a second respective student, the at least first student computing device 60 and the second student computing device 60 being operably connected to the at least one teacher computing device 58 via the communications network 19, and at least one computer-readable storage medium 84 operably connected to the communications network 19, each of the at least one teacher computing device 58 and the at least first student computing device 60 and the second student computing device 60 including an input device 62 and a display screen 53 for respectively receiving math notation input via the input device 62, the math notation input or a corresponding digitized version thereof defining digital input data, the system reading and understanding the digital input data, the method comprising the steps of:

receiving a teacher math notation input on the at least one teacher computing device 58 entered by the at least one respective teacher;

receiving a first student math notation input on the first student computing device 60 entered by the first respective student;

receiving a second student math notation input on the second student computing device 60 entered by the second respective student;

storing on the at least one computer-readable storage medium 84 the digital input data corresponding to the teacher math notation input entered by the at least one respective teacher on the at least one teacher computing device 58, the first student math notation input entered by the first respective student on the first student computing device 60, and the second student math notation input entered by the second respective student on the second student computing device 60 to create a digital recording thereof;

associating by the computerized system a first color with the first student math notation input entered by the first respective student on the first student computing device 60;

associating by the computerized system a second color with the second student math notation input entered by the second respective student on the second student computing device 60, the second color being different from the first color; and displaying on the display screen 53 of at least one of the at least one teacher computing device 58, the first student computing device 60 and the second student computing device 60 at least one of the first student math notation input of the first respective student in the first color associated therewith and the second student math notation input of the second respective student in the second color associated therewith.

The method may further comprise the steps of:

associating with the teacher math notation input entered by the at least one respective teacher on the at least one teacher computing device 58 a third color, the third color being different from the first color and the second color; and displaying on the display screen 53 of at least one of the at least one teacher computing device 58, the first student computing device 60 and the second student computing device 60 the teacher math notation input of the at least one respective teacher in the third color associated therewith.

In an alternative form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least a first student computing device 60 operable by a first respective student, and at least a second student computing device 60 operable by a second respective student, the at least first student computing device 60 and the second student computing device 60 being operably connected to the at least one teacher computing device 58 via the communications network 19, and at least one computer-readable storage medium 84 operably connected to the communications network 19, each of the at least one teacher computing device 58 and the at least first student computing device 60 and the second student computing device 60 including an input device 62 and a display screen 53 for respectively receiving handwritten math notation input via the input device 62, and a digitizer 36 for converting the handwritten math notation input to digital input data, the system reading and understanding the digital input data, the method comprising the steps of:

receiving a teacher handwritten math notation input on the at least one teacher computing device 58 entered by the at least one respective teacher;

converting the teacher handwritten math notation input by the digitizer 36 of the at least one teacher computing device 58 to the digital input data;

receiving a first student handwritten math notation input on the first student computing device 60 entered by the first respective student;

converting the first student handwritten math notation input by the digitizer 36 of the first student computing device 60 to the digital input data;

receiving a second student handwritten math notation input on the second student computing device 60 entered by the second respective student;

converting the second student handwritten math notation input by the digitizer 36 of the second student computing device 60 to the digital input data;

storing on the at least one computer-readable storage medium 84 the digital input data corresponding to the teacher handwritten math notation input entered by the at least one respective teacher on the at least one teacher computing device 58 and converted by the digitizer 36 thereof, the first student handwritten math notation input entered by the first respective student on the first student computing device 60 and converted by the digitizer 36 thereof, and the second student handwritten math notation input entered by the second respective student on the second student computing device 60 and converted by the digitizer 36 thereof to create a digital recording thereof;

associating by the computerized system a first color with the first student handwritten math notation input entered by the first respective student on the first student computing device 60;

associating by the computerized system a second color with the second student handwritten math notation input entered by the second respective student on the second student computing device 60, the second color being different from the first color; and displaying on the display screen 53 of at least one of the at least one teacher computing device 58, the first student computing device 60 and the second student computing device 60 at least one of the first student handwritten math notation input of the first respective student in the first color associated therewith and the second student handwritten math notation input of the second respective student in the second color associated therewith.

In yet another form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least one student computing device 60 operable by at least one respective student, the at least one student computing device 60 being operably connected to the at least one teacher computing device 58 via the communications network 19, and at least one computer-readable storage medium 84 operably connected to the communications network 19, each of the at least one teacher computing device 58 and the at least one student computing device 60 including an input device 62 and a display screen 53 for receiving math notation input via the input device 62, the math notation input or a corresponding digitized version thereof defining digital input data, the system reading and understanding the digital input data, the method comprising the steps of:

receiving a teacher math notation input on the at least one teacher computing device 58 entered by the at least one respective teacher;

receiving a student math notation input on the at least one student computing device 60 entered by the at least one respective student;

storing on the at least one computer-readable storage medium 84 the digital input data corresponding to the teacher math notation input entered by the at least one respective teacher on the at least one teacher computing device 58 and the student math notation input entered by the at least one respective student on the at least one student computing device 60 to create a digital recording thereof;

associating by the computerized system a first identifier with the teacher math notation input entered by the at least one respective teacher on the at least one teacher computing device 58;

associating by the computerized system a second identifier with the student math notation input entered by the at least one respective student on the at least one student computing device 60, the second identifier being different from the first identifier; and displaying on the display screen 53 of at least one of the at least one teacher computing device 58 and the at least one student computing device 60 at least one of the teacher math notation input of the at least one respective teacher with the first identifier associated therewith and the student math notation input of the at least one respective student with the second identifier associated therewith.

In accordance with another form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least one student computing device 60 operable by at least one respective student, the at least one student computing device 60 being operably connected to the at least one teacher computing device 58 via the communications network 19, and at least one computer-readable storage medium 84 operably connected to the communications network 19, each of the at least one teacher computing device 58 and the at least one student computing device 60 including an input device 62 and a display screen 53 for receiving handwritten math notation input via the input device 62, and a digitizer 36 for converting the handwritten math notation input to digital input data, the system reading and understanding the digital input data, the method comprising the steps of:

receiving a teacher handwritten math notation input on the at least one teacher computing device 58 entered by the at least one respective teacher;

converting the teacher handwritten math notation input by the digitizer 36 of the at least one teacher computing device 58 to the digital input data;

receiving a student handwritten math notation input on the at least one student computing device 60 entered by the at least one respective student;

converting the student handwritten math notation input by the digitizer 36 of the at least one student computing device 60 to the digital input data;

storing on the at least one computer-readable storage medium 84 the digital input data corresponding to the teacher handwritten math notation input entered by the at least one respective teacher on the at least one teacher computing device 58 and converted by the digitizer 36 thereof and the student handwritten math notation input entered by the at least one respective student on the at least one student computing device 60 and converted by the digitizer 36 thereof to create a digital recording thereof;

associating by the computerized system a first identifier with the teacher handwritten math notation input entered by the at least one respective teacher on the at least one teacher computing device 58;

associating by the computerized system a second identifier with the student handwritten math notation input entered by the at least one respective student on the at least one student computing device 60, the second identifier being different from the first identifier; and displaying on the display screen 53 of at least one of the at least one teacher computing device 58 and the at least one student computing device 60 at least one of the teacher handwritten math notation input of the at least one respective teacher with the first identifier associated therewith and the student handwritten math notation input of the at least one respective student with the second identifier associated therewith.

In yet a further form of the present invention, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least a first student computing device 60 operable by a first respective student, and at least a second student computing device 60 operable by a second respective student, the at least first student computing device 60 and the second student computing device 60 being operably connected to the at least one teacher computing device 58 via the communications network 19, and at least one computer-readable storage medium 84 operably connected to the communications network 19, each of the at least one teacher computing device 58 and the at least first student computing device 60 and the second student computing device 60 including an input device 62 and a display screen 53 for respectively receiving math notation input via the input device 62, the math notation input or a corresponding digitized version thereof defining digital input data, the system reading and understanding the digital input data, the method comprising the steps of:

receiving a teacher math notation input on the at least one teacher computing device 58 entered by the at least one respective teacher;

receiving a first student math notation input on the first student computing device 60 entered by the first respective student;

receiving a second student math notation input on the second student computing device 60 entered by the second respective student;

storing on the at least one computer-readable storage medium 84 the digital input data corresponding to the teacher math notation input entered by the at least one respective teacher on the at least one teacher computing device 58, the first student math notation input entered by the first respective student on the first student computing device 60, and the second student math notation input entered by the second respective student on the second student computing device 60 to create a digital recording thereof;

associating by the computerized system a first identifier with the first student math notation input entered by the first respective student on the first student computing device 60;

associating by the computerized system a second identifier with the second student math notation input entered by the second respective student on the second student computing device 60, the second identifier being different from the first identifier; and displaying on the display screen 53 of at least one of the at least one teacher computing device 58, the first student computing device 60 and the second student computing device 60 at least one of the first student math notation input of the first respective student with the first identifier associated therewith and the second student math notation input of the second respective student with the second identifier associated therewith.

The method may further comprise the steps of:

associating a third identifier with the teacher math notation input entered by the at least one respective teacher on the at least one teacher computing device 58, the third identifier being different from the first identifier and the second identifier; and displaying on the display screen 53 of at least one of the at least one teacher computing device 58, the first student computing device 60 and the second student computing device 60 the teacher math notation input of the at least one respective teacher with the third identifier associated therewith.

In an alternative form, a method using a computerized system for enabling teachers and students to collaborate in the solutions of STEM (science, technology, engineering and mathematics) problems, the computerized system including a communications network 19, at least one teacher computing device 58 operable by at least one respective teacher, and at least a first student computing device 60 operable by a first respective student, and at least a second student computing device 60 operable by a second respective student, the at least first student computing device 60 and the second student computing device 60 being operably connected to the at least one teacher computing device 58 via the communications network 19, and at least one computer-readable storage medium 84 operably connected to the communications network 19, each of the at least one teacher computing device 58 and the at least first student computing device 60 and the second student computing device 60 including an input device 62 and a display screen 53 for respectively receiving handwritten math notation input via the input device 62, and a digitizer 36 for converting the handwritten math notation input to digital input data, the system reading and understanding the digital input data, the method comprising the steps of:

receiving a teacher handwritten math notation input on the at least one teacher computing device 58 entered by the at least one respective teacher;

converting the teacher handwritten math notation input by the digitizer 36 of the at least one teacher computing device 58 to the digital input data;

receiving a first student handwritten math notation input on the first student computing device 60 entered by the first respective student;

converting the first student handwritten math notation input by the digitizer 36 of the first student computing device 60 to the digital input data;

receiving a second student handwritten math notation input on the second student computing device 60 entered by the second respective student;

converting the second student handwritten math notation input by the digitizer 36 of the second student computing device 60 to the digital input data;

storing on the at least one computer-readable storage medium 84 the digital input data corresponding to the teacher handwritten math notation input entered by the at least one respective teacher on the at least one teacher computing device 58 and converted by the digitizer 36 thereof, the first student handwritten math notation input entered by the first respective student on the first student computing device 60 and converted by the digitizer 36 thereof, and the second student handwritten math notation input entered by the second respective student on the second student computing device 60 and converted by the digitizer 36 thereof to create a digital recording thereof;

associating by the computerized system a first identifier with the first student handwritten math notation input entered by the first respective student on the first student computing device 60;

associating by the computerized system a second identifier with the second student handwritten math notation input entered by the second respective student on the second student computing device 60, the second identifier being different from the first identifier; and displaying on the display screen 53 of at least one of the at least one teacher computing device 58, the first student computing device 60 and the second student computing device 60 at least one of the first student handwritten math notation input of the first respective student with the first identifier associated therewith and the second student handwritten math notation input of the second respective student with the second identifier associated therewith.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computerized system enabling teachers and students to collaborate in the solutions of STEM (science, technology, engineering and mathematics) problems, the computerized system comprising:

a communications network;

at least one teacher computing device operable by at least one respective teacher;

at least one student computing device operable by at least one respective student, the at least one student computing device being operably connected to the at least one teacher computing device via the communications network; and at least one computer-readable storage medium operably connected to the communications network;

wherein each of the at least one teacher computing device and the at least one student computing device includes an input device and a display screen for receiving math notation input via the input device, the math notation input or a corresponding digitized version thereof defining digital input data;

wherein the computerized system reads and understands the digital input data;

wherein the computerized system generates mathematical representations of the at least one respective teacher's and the at least one respective student's math notation inputs;

wherein the at least one teacher computing device and the at least one student computing device are operably connected to the at least one computer-readable storage medium, the at least one computer-readable storage medium having stored therein program instructions transforming each display screen of the at least one teacher computing device and the at least one student computing device operably connected together via the communications network into a virtual shared whiteboard defining a common work page upon which the math notation input from each of the at least one teacher computing device and the at least one student computing device is received and displayed;

wherein the computerized system enables collaboration between the at least one respective teacher and the at least one respective student, each of whom respectively enters the math notation input on the at least one teacher computing device and the at least one student computing device to create a collaborative solution to the STEM problem by annotating each other's math notation input, each of which is displayed on the common work page;

wherein the math notation inputs result in the at least one respective teacher's and the at least one respective student's collaborative solution to the STEM problem;

wherein the at least one computer-readable storage medium records by storing therein the digital input data corresponding to the math notation input entered by the at least one respective teacher on the at least one teacher computing device and the math notation input entered by the at least one respective student on the at least one student computing device to create a digital recording thereof;

wherein, when prompted by the at least one respective teacher or the at least one respective student, the computerized system plays back at least a portion of the digital recording so that the at least one respective teacher or the at least one respective student may subsequently assess the collaborative solution of the STEM problem;

wherein the at least one computer-readable storage medium stores therein the generated mathematical representations of the math notation inputs of the at least one respective teacher and the at least one respective student, the mathematical representations forming part of the digital recording; and wherein the at least portion of the digital recording played back by the computerized system corresponds to at least one of 1) the math notation input entered by the at least one respective teacher on the at least one teacher computing device and including the generated mathematical representation thereof, and 2) the math notation input entered by the at least one respective student on the at least one student computing device and including the generated mathematical representation thereof.

2. The computerized system according to claim 1, wherein the mathematical representation includes a graph having at least one of cartesian coordinates and polar coordinates.

3. The computerized system according to claim 1, wherein the math notation input entered by the at least one respective teacher on the at least one teacher computing device has a first color associated therewith, and the math notation input entered by the at least one respective student on the at least one student computing device has a second color associated therewith, the second color being different from the first color; and wherein the computerized system plays back the at least portion of the digital recording of the digital input data corresponding to at least one of 1) the math notation input of the at least one respective teacher in the first color associated therewith and the generated mathematical representation thereof and 2) the math notation input of the at least one respective student in the second color associated therewith and the generated mathematical representation thereof.

4. The computerized system according to claim 1, wherein the at least one respective student includes at least a first respective student and a second respective student;

wherein the at least one student computing device includes a first student computing device and a second student computing device, the first respective student and the second respective student respectively entering math notation inputs on the first student computing device and the second student computing device;

wherein the computerized system generates mathematical representations of the math notation inputs entered on the first student computing device and the second student computing device;

wherein the at least one computer-readable storage medium stores therein the generated mathematical representations of the math notation inputs of the first student and the second student, the generated mathematical representations of the math notation inputs of the first student and the second student forming part of the digital recording; and wherein the computerized system plays back the at least portion of the digital recording of the digital input data corresponding to the math notation input including the generated mathematical representation thereof of at least one of the first respective student entered on the first student computing device and the second respective student entered on the second student computing device.

5. The computerized system according to claim 4, wherein the math notation input entered by the first respective student on the first student computing device has a first color associated therewith;

wherein the math notation input entered by the second respective student on the second student computing device has a second color associated therewith, the second color being different from the first color; and wherein the computerized system plays back the at least portion of the digital recording of the digital input data corresponding to the math notation input of the first respective student in the first color.

6. The computerized system according to claim 5, wherein the computerized system plays back the at least portion of the digital recording of the digital input data corresponding to the math notation input of the second respective student in the second color.

7. The computerized system according to claim 5, wherein the math notation input entered by the at least one respective teacher on the at least one teacher computing device has a third color associated therewith, the third color being different from the first color and the second color; and wherein the computerized system plays back the at least portion of the digital recording of the digital input data corresponding to the math notation input of the at least one respective teacher in the third color.

8. The computerized system as defined by claim 1, wherein at least one of the at least one teacher computing device and the at least one student computing device is one of a personal computer, a laptop computer, a tablet computer, a smart phone and a handheld personal assistant device.

9. The computerized system according to claim 1, wherein the input device of at least one of the at least one teacher computing device and the at least one student computing device includes at least one of a keyboard, a mouse, a finger and a stylus.

10. The computerized system according to claim 1, wherein the display screen is a touch sensitive screen.

11. The computerized system according to claim 1, wherein at least one of the at least one teacher computing device and the at least one student computing device includes a digitizer; and wherein the math notation input entered by at least one of the at least one respective teacher and the at least one respective student includes handwritten math notation input, the handwritten math notation input being digitally converted by the digitizer to at least partially define the digital input data.

12. The computerized system according to claim 1, wherein the at least portion of the digital recording of the digital input data comprising the collaborative solution to the STEM problem is played back in the sequence in which the math notation inputs were entered by the at least one respective teacher on the at least one teacher computing device and by the at least one respective student on the at least one student computing device.

13. A computerized system enabling teachers and students to collaborate in the solutions of STEM (science, technology, engineering and mathematics) problems, the computerized system comprising:

a communications network;

at least one teacher computing device operable by at least one respective teacher;

at least one student computing device operable by at least one respective student, the at least one student computing device being operably connected to the at least one teacher computing device via the communications network; and at least one computer-readable storage medium operably connected to the communications network;

wherein each of the at least one teacher computing device and the at least one student computing device includes an input device and a display screen for receiving math notation input via the input device, the math notation input or a corresponding digitized version thereof defining digital input data;

wherein the computerized system reads and understands the digital input data;

wherein the computerized system generates mathematical representations of the at least one respective teacher's and the at least one respective student's math notation inputs;

wherein the at least one teacher computing device and the at least one student computing device are operably connected to the at least one computer-readable storage medium, the at least one computer-readable storage medium having stored therein program instructions transforming each display screen of the at least one teacher computing device and the at least one student computing device operably connected together via the communications network into a virtual shared whiteboard defining a common work page upon which the math notation input from each of the at least one teacher computing device and the at least one student computing device is received and displayed;

wherein the computerized system enables collaboration between the at least one respective teacher and the at least one respective student, each of whom respectively enters the math notation input on the at least one teacher computing device and the at least one student computing device to create a collaborative solution to the STEM problem by annotating each other's math notation input, each of which is displayed on the common work page;

wherein the math notation inputs result in the at least one respective teacher's and the at least one respective student's collaborative solution to the STEM problem;

wherein the at least one computer-readable storage medium records by storing therein the digital input data corresponding to the math notation input entered by the at least one respective teacher on the at least one teacher computing device and the math notation input entered by the at least one respective student on the at least one student computing device to create a digital recording thereof;

wherein, when prompted by the at least one respective teacher or the at least one respective student, the computerized system plays back at least a portion of the digital recording so that the at least one respective teacher or the at least one respective student may subsequently assess the collaborative solution of the STEM problem;

wherein the math notation input entered by the at least one respective teacher on the at least one teacher computing device has a first color associated therewith, and the math notation input entered by the at least one respective student on the at least one student computing device has a second color associated therewith, the second color being different from the first color;

wherein the computerized system plays back the at least portion of the digital recording of the digital input data corresponding to the math notation input of at least one of the at least one respective teacher in the first color associated therewith and the at least one respective student in the second color associated therewith; and wherein the display screen of the at least one teacher computing device displays a chart, the chart identifying the at least one respective student and the second color associated with the math notation input entered by the at least one respective student on the at least one student computing device.

14. The computerized system according to claim 13, wherein the chart identifies the first color associated with the math notation input entered by the at least one respective teacher on the at least one teacher computing device.

15. The computerized system as defined by claim 13, wherein at least one of the at least one teacher computing device and the at least one student computing device is one of a personal computer, a laptop computer, a tablet computer, a smart phone and a handheld personal assistant device.

16. The computerized system according to claim 13, wherein the input device of at least one of the at least one teacher computing device and the at least one student computing device includes at least one of a keyboard, a mouse, a finger and a stylus.

17. The computerized system according to claim 13, wherein the display screen is a touch sensitive screen.

18. The computerized system according to claim 13, wherein at least one of the at least one teacher computing device and the at least one student computing device includes a digitizer; and wherein the math notation input entered by at least one of the at least one respective teacher and the at least one respective student includes handwritten math notation input, the handwritten math notation input being digitally converted by the digitizer to at least partially define the digital input data.

19. A computerized system enabling teachers and students to collaborate in the solutions of STEM (science, technology, engineering and mathematics) problems, the computerized system comprising:
- a communications network;
- at least one teacher computing device operable by at least one respective teacher;
- at least one student computing device operable by at least one respective student, the at least one student computing device being operably connected to the at least one teacher computing device via the communications network; and
- at least one computer-readable storage medium operably connected to the communications network;
- wherein each of the at least one teacher computing device and the at least one student computing device includes an input device and a display screen for receiving math notation input via the input device, the math notation input or a corresponding digitized version thereof defining digital input data;
- wherein the computerized system reads and understands the digital input data;
- wherein the computerized system generates mathematical representations of the at least one respective teacher's and the at least one respective student's math notation inputs;
- wherein the at least one teacher computing device and the at least one student computing device are operably connected to the at least one computer-readable storage medium, the at least one computer-readable storage medium having stored therein program instructions transforming each display screen of the at least one teacher computing device and the at least one student computing device operably connected together via the communications network into a virtual shared whiteboard defining a common work page upon which the math notation input from each of the at least one teacher computing device and the at least one student computing device is received and displayed;
- wherein the computerized system enables collaboration between the at least one respective teacher and the at least one respective student, each of whom respectively enters the math notation input on the at least one teacher computing device and the at least one student computing device to create a collaborative solution to the STEM problem by annotating each other's math notation input, each of which is displayed on the common work page;
- wherein the math notation inputs result in the at least one respective teacher's and the at least one respective student's collaborative solution to the STEM problem;
- wherein the at least one computer-readable storage medium records by storing therein the digital input data corresponding to the math notation input entered by the at least one respective teacher on the at least one teacher computing device and the math notation input entered by the at least one respective student on the at least one student computing device to create a digital recording thereof;
- wherein, when prompted by the at least one respective teacher or the at least one respective student, the computerized system plays back at least a portion of the digital recording so that the at least one respective teacher or the at least one respective student may subsequently assess the collaborative solution of the STEM problem;
- wherein the math notation input entered by the at least one respective teacher on the at least one teacher computing device has a first color associated therewith, and the math notation input entered by the at least one respective student on the at least one student computing device has a second color associated therewith, the second color being different from the first color;
- wherein the computerized system plays back the at least portion of the digital recording of the digital input data corresponding to the math notation input of at least one of the at least one respective teacher in the first color associated therewith and the at least one respective student in the second color associated therewith; and
- wherein the at least portion of the digital recording played back by the computerized system corresponds to one of the math notation input having the first color associated therewith entered by the at least one respective teacher on the at least one teacher computing device and the math notation input having the second color associated therewith and entered by the at least one respective student on the at least one student computing device.

20. The computerized system as defined by claim 19, wherein at least one of the at least one teacher computing device and the at least one student computing device is one of a personal computer, a laptop computer, a tablet computer, a smart phone and a handheld personal assistant device.

21. The computerized system according to claim 19, wherein the input device of at least one of the at least one teacher computing device and the at least one student computing device includes at least one of a keyboard, a mouse, a finger and a stylus.

22. The computerized system according to claim 19, wherein the display screen is a touch sensitive screen.

23. The computerized system according to claim 19, wherein at least one of the at least one teacher computing device and the at least one student computing device includes a digitizer; and
- wherein the math notation input entered by at least one of the at least one respective teacher and the at least one respective student includes handwritten math notation input, the handwritten math notation input being digitally converted by the digitizer to at least partially define the digital input data.

24. A computerized system enabling teachers and students to collaborate in the solutions of STEM (science, technology, engineering and mathematics) problems, the computerized system comprising:
- a communications network;
- at least one teacher computing device operable by at least one respective teacher;
- at least one student computing device operable by at least one respective student, the at least one student computing device being operably connected to the at least one teacher computing device via the communications network; and
- at least one computer-readable storage medium operably connected to the communications network;
- wherein each of the at least one teacher computing device and the at least one student computing device includes an input device and a display screen for receiving math notation input via the input device, the math notation input or a corresponding digitized version thereof defining digital input data;
- wherein the computerized system reads and understands the digital input data;

wherein the computerized system generates mathematical representations of the at least one respective teacher's and the at least one respective student's math notation inputs;

wherein the at least one teacher computing device and the at least one student computing device are operably connected to the at least one computer-readable storage medium, the at least one computer-readable storage medium having stored therein program instructions transforming each display screen of the at least one teacher computing device and the at least one student computing device operably connected together via the communications network into a virtual shared whiteboard defining a common work page upon which the math notation input from each of the at least one teacher computing device and the at least one student computing device is received and displayed;

wherein the computerized system enables collaboration between the at least one respective teacher and the at least one respective student, each of whom respectively enters the math notation input on the at least one teacher computing device and the at least one student computing device to create a collaborative solution to the STEM problem by annotating each other's math notation input, each of which is displayed on the common work page;

wherein the math notation inputs result in the at least one respective teacher's and the at least one respective student's collaborative solution to the STEM problem;

wherein the at least one computer-readable storage medium records by storing therein the digital input data corresponding to the math notation input entered by the at least one respective teacher on the at least one teacher computing device and the math notation input entered by the at least one respective student on the at least one student computing device to create a digital recording thereof;

wherein, when prompted by the at least one respective teacher or the at least one respective student, the computerized system plays back at least a portion of the digital recording so that the at least one respective teacher or the at least one respective student may subsequently assess the collaborative solution of the STEM problem;

wherein the math notation input entered by the at least one respective student on the at least one student computing device and the math notation input entered by the at least one respective teacher on the at least one teacher computing device have identifying informational data associated therewith; and wherein, when the computerized system plays back the at least portion of the digital recording of the digital input data corresponding to the math notation input of at least one of the at least one respective teacher and the at least one respective student, the identifying informational data associated therewith are displayed on the display screen of at least one of the at least one teacher computing device and the at least one student computing device.

25. The computerized system according to claim 24, wherein the identifying informational data includes a color.

26. The computerized system according to claim 24, wherein the identifying informational data include the name of at least one of the at least one respective teacher and the at least one respective student.

27. The computerized system according to claim 24, wherein the at least one respective student includes at least a first respective student and a second respective student;

wherein the at least one student computing device includes a first student computing device and a second student computing device, the first respective student and the second respective student respectively entering math notation inputs on the first student computing device and the second student computing device;

wherein the math notation input entered by the first respective student on the first student computing device has first identifying informational data associated therewith;

wherein the math notation input entered by the second respective student on the second student computing device has second identifying informational data associated therewith, the second identifying informational data being different from the first identifying informational data; and wherein the computerized system plays back the at least portion of the digital recording of the digital input data corresponding to the math notation input of the first respective student with the first identifying informational data associated therewith.

28. The computerized system according to claim 27, wherein the computerized system plays back the at least portion of the digital recording of the digital input data corresponding to the math notation input of the second respective student with the second identifying informational data associated therewith.

29. The computerized system according to claim 27, wherein the math notation input entered by the at least one respective teacher on the at least one teacher computing device has third identifying informational data associated therewith, the third identifying informational data being different from the first identifying informational data and the second identifying informational data; and wherein the computerized system plays back the at least portion of the digital recording of the digital input data corresponding to the math notation input of the at least one respective teacher with the third identifying informational data associated therewith.

30. The computerized system as defined by claim 24, wherein at least one of the at least one teacher computing device and the at least one student computing device is one of a personal computer, a laptop computer, a tablet computer, a smart phone and a handheld personal assistant device.

31. The computerized system according to claim 24, wherein the input device of at least one of the at least one teacher computing device and the at least one student computing device includes at least one of a keyboard, a mouse, a finger and a stylus.

32. The computerized system according to claim 24, wherein the display screen is a touch sensitive screen.

33. The computerized system according to claim 24, wherein at least one of the at least one teacher computing device and the at least one student computing device includes a digitizer; and wherein the math notation input entered by at least one of the at least one respective teacher and the at least one respective student includes handwritten math notation input, the handwritten math notation input being digitally converted by the digitizer to at least partially define the digital input data.

34. A computerized system enabling teachers and students to collaborate in the solutions of STEM (science, technology, engineering and mathematics) problems, the computerized system comprising:
- a communications network;
- at least one teacher computing device operable by at least one respective teacher;
- at least one student computing device operable by at least one respective student, the at least one student computing device being operably connected to the at least one teacher computing device via the communications network; and
- at least one computer-readable storage medium operably connected to the communications network;
- wherein each of the at least one teacher computing device and the at least one student computing device includes an input device and a display screen for receiving math notation input via the input device, the math notation input or a corresponding digitized version thereof defining digital input data;
- wherein the computerized system reads and understands the digital input data;
- wherein the computerized system generates mathematical representations of the at least one respective teacher's and the at least one respective student's math notation inputs;
- wherein the at least one teacher computing device and the at least one student computing device are operably connected to the at least one computer-readable storage medium, the at least one computer-readable storage medium having stored therein program instructions transforming each display screen of the at least one teacher computing device and the at least one student computing device operably connected together via the communications network into a virtual shared whiteboard defining a common work page upon which the math notation input from each of the at least one teacher computing device and the at least one student computing device is received and displayed;
- wherein the computerized system enables collaboration between the at least one respective teacher and the at least one respective student, each of whom respectively enters the math notation input on the at least one teacher computing device and the at least one student computing device to create a collaborative solution to the STEM problem by annotating each other's math notation input, each of which is displayed on the common work page;
- wherein the math notation inputs result in the at least one respective teacher's and the at least one respective student's collaborative solution to the STEM problem;
- wherein the at least one computer-readable storage medium records by storing therein the digital input data corresponding to the math notation input entered by the at least one respective teacher on the at least one teacher computing device and the math notation input entered by the at least one respective student on the at least one student computing device to create a digital recording thereof;
- wherein, when prompted by the at least one respective teacher or the at least one respective student, the computerized system plays back at least a portion of the digital recording so that the at least one respective teacher or the at least one respective student may subsequently assess the collaborative solution of the STEM problem;
- wherein the computerized system generates a timestamp associated with the time the math notation input is entered by at least one of the at least one respective student on the at least one student computing device and the at least one respective teacher on the at least one teacher computing device;
- wherein the timestamp is recorded by the computerized system by storing the timestamp on the at least one computer-readable storage medium, the timestamp forming part of the digital recording; and
- wherein the at least portion of the digital recording played back by the computerized system includes the timestamp associated with at least one of the math notation input entered by the at least one respective teacher on the at least one teacher computing device and the math notation input entered by the at least one respective student on the at least one student computing device.

35. The computerized system according to claim 34, wherein the timestamp is displayed on the display screen of at least one of the at least one teacher computing device and the at least one student computing device.

36. The computerized system as defined by claim 34, wherein at least one of the at least one teacher computing device and the at least one student computing device is one of a personal computer, a laptop computer, a tablet computer, a smart phone and a handheld personal assistant device.

37. The computerized system according to claim 34, wherein the input device of at least one of the at least one teacher computing device and the at least one student computing device includes at least one of a keyboard, a mouse, a finger and a stylus.

38. The computerized system according to claim 34, wherein the display screen is a touch sensitive screen.

39. The computerized system according to claim 34, wherein at least one of the at least one teacher computing device and the at least one student computing device includes a digitizer; and
- wherein the math notation input entered by at least one of the at least one respective teacher and the at least one respective student includes handwritten math notation input, the handwritten math notation input being digitally converted by the digitizer to at least partially define the digital input data.

40. A method using a computerized system for enabling teachers and students to collaborate in the solutions of STEM (science, technology, engineering and mathematics) problems, the computerized system including a communications network, at least one teacher computing device operable by at least one respective teacher, and at least one student computing device operable by at least one respective student, the at least one student computing device being operably connected to the at least one teacher computing device via the communications network, and at least one computer-readable storage medium operably connected to the communications network, each of the at least one teacher computing device and the at least one student computing device including an input device and a display screen for receiving math notation input via the input device, the math notation input or a corresponding digitized version thereof defining digital input data, the computerized system reading and understanding the digital input data, the method comprising the steps of:
- receiving a teacher math notation input on the at least one teacher computing device entered by the at least one respective teacher;

receiving a student math notation input on the at least one student computing device entered by the at least one respective student;

generating by the computerized system mathematical representations of the teacher math notation input of the at least one respective teacher and the student math notation input of the at least one respective student;

storing on the at least one computer-readable storage medium the digital input data corresponding to the teacher math notation input entered by the at least one respective teacher on the at least one teacher computing device and the student math notation input entered by the at least one respective student on the at least one student computing device to create a digital recording thereof;

playing back at least a portion of the digital recording so that the at least one respective teacher or the at least respective student may subsequently assess a collaborative solution of the STEM problem;

storing on the at least one computer-readable storage medium the generated mathematical representations of the teacher math notation input and the student math notation input, the mathematical representations forming part of the digital recording; and playing back by the computerized system the at least portion of the digital recording which corresponds to at least one of 1) the teacher math notation input entered by the at least one respective teacher on the at least one teacher computing device and including the generated mathematical representation thereof, and 2) the student math notation input entered by the at least one respective student on the at least one student computing device and including the generated mathematical representation thereof.

41. The method according to claim 40, wherein the mathematical representation includes a graph having at least one of cartesian coordinates and polar coordinates; and wherein the method further comprises the step of:

displaying the graph on the display screen of at least one of the at least one teacher computing device and the at least one student computing device.

42. The method according to claim 41, which further comprises the steps of:

plotting at least one of the math notation input of the at least one respective teacher and the math notation input of the at least one respective student on the graph to provide a plotted graph; and displaying the plotted graph on the display screen of at least one of the at least one teacher computing device and the at least one student computing device.

43. The method according to claim 40, which further comprises the steps of:

associating by the computerized system first identifying informational data with the teacher math notation input entered by the at least one respective teacher on the at least one teacher computing device;

associating by the computerized system second identifying informational data with the student math notation input entered by the at least one respective student on the at least one student computing device, the second identifying informational data being different from the first identifying informational data; and playing back by the computerized system the at least portion of the digital recording of the digital input data corresponding to at least one of 1) the teacher math notation input of the at least one respective teacher with the first identifying informational data associated therewith and the generated mathematical representation thereof and 2) the student math notation input of the at least one respective student with the second identifying informational data associated therewith and the generated mathematical representation thereof.

44. The method according to claim 43, wherein the first identifying informational data includes a first color; and wherein the second identifying informational data includes a second color, the second color being different from the first color.

45. The method according to claim 43, wherein the second identifying informational data includes the name of the at least one respective student.

46. The method according to claim 40, wherein the at least one respective student includes at least a first respective student and a second respective student, and wherein the at least one student computing device of the computerized system includes a first student computing device and a second student computing device, the method further comprising the steps of:

receiving a first student math notation input on the first student computing device entered by the first respective student;

associating by the computerized system first identifying informational data with the first student math notation input entered by the first respective student on the first student computing device;

receiving a second student math notation input on the second student computing device entered by the second respective student;

associating by the computerized system second identifying informational data with the second student math notation input entered by the second respective student on the second student computing device, the second identifying informational data being different from the first identifying informational data;

generating by the computerized system mathematical representations of the first student math notation input of the first respective student and the second student math notation input of the second respective student;

storing on the at least one computer-readable storage medium the generated mathematical representations of the first student math notation input of the first student and the second student math notation input of the second student, the generated mathematical representations of the first student math notation input and the second student math notation input forming part of the digital recording; and playing back by the computerized system the at least portion of the digital recording of the digital input data corresponding to the first student math notation input of the first respective student with the first identifying informational data associated therewith and the generated mathematical representation of the first student math notation input.

47. The method according to claim 46, which further comprises the step of:

playing back by the computerized system the at least portion of the digital recording of the digital input data corresponding to the second student math notation input of the second respective student with the second identifying informational data associated therewith and the generated mathematical representation of the second student math notation input.

48. The method according to claim 46, which further comprises the steps of:
associating by the computerized system third identifying informational data with the teacher math notation input entered by the at least one respective teacher on the at least one teacher computing device; and
playing back by the computerized system the at least portion of the digital recording of the digital input data corresponding to the teacher math notation input of the at least one respective teacher with the third identifying informational data associated therewith and the generated mathematical representation of the teacher math notation input.

49. The method according to claim 40, wherein the at least one respective student includes at least a first respective student and a second respective student, and wherein the at least one student computing device of the computerized system includes a first student computing device and a second student computing device, the method further comprising the steps of:
receiving a first student math notation input on the first student computing device entered by the first respective student; and
receiving a second student math notation input on the second student computing device entered by the second respective student;
generating by the computerized system mathematical representations of the first student math notation input of the first respective student and the second student math notation input of the second respective student;
storing on the at least one computer-readable storage medium the generated mathematical representations of the first student math notation input of the first student and the second student math notation input of the second student, the generated mathematical representations of the first student math notation input and the second student math notation input forming part of the digital recording; and
playing back by the computerized system the at least portion of the digital recording of the digital input data corresponding to at least one of 1) the first student math notation input entered by the first respective student on the first student computing device and the generated mathematical representation thereof and 2) the second student math notation input entered by the second respective student on the second student computing device and the generated mathematical representation thereof.

50. The method according to claim 49, which further comprises the steps of:
associating by the computerized system a first color with the first student math notation input entered by the first respective student on the first student computing device;
associating by the computerized system a second color with the second student math notation input entered by the second respective student on the second student computing device; and
playing back by the computerized system the at least portion of the digital recording of the digital input data corresponding to the first student math notation input of the first respective student in the first color associated therewith and the generated mathematical representation of the first student math notation input.

51. The method according to claim 50, which further comprises the step of:
playing back by the computerized system the at least portion of the digital recording of the digital input data corresponding to the second student math notation input of the second respective student in the second color associated therewith and the generated mathematical representation of the second student math notation input.

52. The method according to claim 50, which further comprises the steps of:
associating by the computerized system a third color with the teacher math notation input entered by the at least one respective teacher on the at least one teacher computing device, the third color being different from the first color and the second color; and
playing back by the computerized system the at least portion of the digital recording of the digital input data corresponding to the teacher math notation input of the at least one respective teacher in the third color associated therewith and the generated mathematical representation of the teacher math notation input.

53. The method according to claim 40, wherein each of the at least one teacher computing device and the at least one student computing device includes a digitizer for converting a handwritten math notation input to digital input data, the system reading and understanding the digital input data, and wherein the method further comprises the steps of:
receiving a teacher handwritten math notation input on the at least one teacher computing device entered by the at least one respective teacher;
converting the teacher handwritten math notation input by the digitizer of the at least one teacher computing device to the digital input data;
receiving a student handwritten math notation input on the at least one student computing device entered by the at least one respective student;
converting the student handwritten math notation input by the digitizer of the at least one student computing device to the digital input data; and
storing on the at least one computer-readable storage medium the digital input data corresponding to the teacher handwritten math notation input entered by the at least one respective teacher on the at least one teacher computing device and converted by the digitizer thereof and the student handwritten math notation input entered by the at least one respective student on the at least one student computing device and converted by the digitizer thereof to create stored digital input data corresponding to each of the teacher handwritten math notation input and the student handwritten math notation input, the stored digital input data defining the portion of the digital recording which is played back by the computerized system.

54. The method according to claim 53, which further comprises the steps of:
associating by the computerized system a first color with the teacher handwritten math notation input entered by the at least one respective teacher on the at least one teacher computing device;
associating by the computerized system a second color with the student handwritten math notation input entered by the at least one respective student on the at least one student computing device, the second color being different from the first color; and
displaying on the display screen of at least one of the at least one teacher computing device and the at least one student computing device at least one of the teacher handwritten math notation input of the at least one respective teacher in the first color associated therewith and the student handwritten math notation input of the at least one respective student in the second color associated therewith.

55. The method according to claim 40, wherein the at least one respective student includes at least a first respective student and a second respective student;
    wherein the at least one student computing device includes a first student computing device operable by the first respective student and a second student computing device operable by the second respective student, each of the at least one teacher computing device and the at least first student computing device and the second student computing device including a digitizer for converting a handwritten math notation input to digital input data, the system reading and understanding the digital input data, and wherein the method further comprising the steps of:
    receiving a teacher handwritten math notation input on the at least one teacher computing device entered by the at least one respective teacher;
    converting the teacher handwritten math notation input by the digitizer of the at least one teacher computing device to the digital input data;
    receiving a first student handwritten math notation input on the first student computing device entered by the first respective student;
    converting the first student handwritten math notation input by the digitizer of the first student computing device to the digital input data;
    receiving a second student handwritten math notation input on the second student computing device entered by the second respective student;
    converting the second student handwritten math notation input by the digitizer of the second student computing device to the digital input data;
    generating by the computerized system mathematical representations of the teacher handwritten math notation input of the at least one respective teacher, the first student handwritten math notation input of the first respective student and the second student handwritten math notation input of the second respective student;
    storing on the at least one computer-readable storage medium the digital input data corresponding to the teacher handwritten math notation input entered by the at least one respective teacher on the at least one teacher computing device and converted by the digitizer thereof, the first student handwritten math notation input entered by the first respective student on the first student computing device and converted by the digitizer thereof, and the second student handwritten math notation input entered by the second respective student on the second student computing device and converted by the digitizer thereof;
    associating by the computerized system a first color with the first student handwritten math notation input entered by the first respective student on the first student computing device;
    associating by the computerized system a second color with the second student handwritten math notation input entered by the second respective student on the second student computing device, the second color being different from the first color; and
    displaying on the display screen of at least one of the at least one teacher computing device, the first student computing device and the second student computing device at least one of the first student handwritten math notation input of the first respective student in the first color associated therewith and the second student handwritten math notation input of the second respective student in the second color associated therewith.

56. The method according to claim 40, wherein the at least portion of the digital recording of the digital input data is played back in the sequence in which the teacher math notation input and the student math notation input were respectively entered by the at least one respective teacher on the at least one teacher computing device and by the at least one respective student on the at least one student computing device.

57. A method using a computerized system for enabling teachers and students to collaborate in the solutions of STEM (science, technology, engineering and mathematics) problems, the computerized system including a communications network, at least one teacher computing device operable by at least one respective teacher, and at least one student computing device operable by at least one respective student, the at least one student computing device being operably connected to the at least one teacher computing device via the communications network, and at least one computer-readable storage medium operably connected to the communications network, each of the at least one teacher computing device and the at least one student computing device including an input device and a display screen for receiving math notation input via the input device, the math notation input or a corresponding digitized version thereof defining digital input data, the computerized system reading and understanding the digital input data, the method comprising the steps of:
    receiving a teacher math notation input on the at least one teacher computing device entered by the at least one respective teacher;
    receiving a student math notation input on the at least one student computing device entered by the at least one respective student;
    generating by the computerized system mathematical representations of the teacher math notation input of the at least one respective teacher and the student math notation input of the at least one respective student;
    storing on the at least one computer-readable storage medium the digital input data corresponding to the teacher math notation input entered by the at least one respective teacher on the at least one teacher computing device and the student math notation input entered by the at least one respective student on the at least one student computing device to create a digital recording thereof;
    playing back at least a portion of the digital recording so that the at least one respective teacher or the at least respective student may subsequently assess a collaborative solution of the STEM problem;
    associating by the computerized system a first color with the teacher math notation input entered by the at least one respective teacher on the at least one teacher computing device;
    associating by the computerized system a second color with the student math notation input entered by the at least one respective student on the at least one student computing device, the second color being different from the first color; and
    playing back by the computerized system the at least portion of the digital recording of the digital input data corresponding to at least one of the teacher math notation input of the at least one respective teacher in the first color associated therewith and the student math notation input of the at least one respective student in the second color associated therewith.

58. The method according to claim 57, which further comprises the step of:
    displaying by the computerized system on the display screen of the at least one teacher computing device a chart, the chart identifying the at least one respective student and the second color associated with the student math notation input entered by the at least one respective student on the at least one student computing device.

59. The method according to claim 58, wherein the chart identifies the first color associated with the teacher math notation input entered by the at least one respective teacher on the at least one teacher computing device.

60. A method using a computerized system for enabling teachers and students to collaborate in the solutions of STEM (science, technology, engineering and mathematics) problems, the computerized system including a communications network, at least one teacher computing device operable by at least one respective teacher, and at least one student computing device operable by at least one respective student, the at least one student computing device being operably connected to the at least one teacher computing device via the communications network, and at least one computer-readable storage medium operably connected to the communications network, each of the at least one teacher computing device and the at least one student computing device including an input device and a display screen for receiving math notation input via the input device, the math notation input or a corresponding digitized version thereof defining digital input data, the computerized system reading and understanding the digital input data, the method comprising the steps of:
    receiving a teacher math notation input on the at least one teacher computing device entered by the at least one respective teacher;
    receiving a student math notation input on the at least one student computing device entered by the at least one respective student;
    generating by the computerized system mathematical representations of the teacher math notation input of the at least one respective teacher and the student math notation input of the at least one respective student;
    storing on the at least one computer-readable storage medium the digital input data corresponding to the teacher math notation input entered by the at least one respective teacher on the at least one teacher computing device and the student math notation input entered by the at least one respective student on the at least one student computing device to create a digital recording thereof;
    playing back at least a portion of the digital recording so that the at least one respective teacher or the at least one respective student may subsequently assess a collaborative solution of the STEM problem;
    generating by the computerized system a timestamp associated with the time that at least one of 1) the teacher math notation input is entered by the at least one teacher on the at least one teacher computing device, and 2) the student math notation input is entered by the at least one student on the at least one student computing device;
    storing by the computerized system on the at least one computer-readable storage medium the timestamp, the timestamp forming part of the digital recording; and
    playing back by the computerized system the at least portion of the digital recording which includes the timestamp associated with at least one of the teacher math notation input entered by the at least one respective teacher on the at least one teacher computing device and the student math notation input entered by the at least one respective student on the at least one student computing device.

61. The method according to claim 60, which further comprises the step of:
    displaying the timestamp on the display screen of at least one of the at least one teacher computing device and the at least one student computing device.

\* \* \* \* \*